United States Patent
Kurokawa

(10) Patent No.: US 9,848,146 B2
(45) Date of Patent: Dec. 19, 2017

(54) IMAGING DEVICE AND ELECTRONIC DEVICE

(71) Applicant: Semiconductor Energy Laboratory Co., Ltd., Atsugi-shi, Kanagawa-ken (JP)

(72) Inventor: Yoshiyuki Kurokawa, Kanagawa (JP)

(73) Assignee: Semiconductor Energy Laboratory Co., Ltd., Atsugi-shi, Kanagawa-ken (JP)

(*) Notice: Subject to any disclaimer, the term of this patent is extended or adjusted under 35 U.S.C. 154(b) by 0 days.

(21) Appl. No.: 15/131,284

(22) Filed: Apr. 18, 2016

(65) Prior Publication Data
US 2016/0316160 A1    Oct. 27, 2016

(30) Foreign Application Priority Data
Apr. 23, 2015    (JP) ................................. 2015-088480

(51) Int. Cl.
| H04N 5/369 | (2011.01) |
| H04N 5/3745 | (2011.01) |
| H04N 5/376 | (2011.01) |
| H04N 5/232 | (2006.01) |

(52) U.S. Cl.
CPC ....... H04N 5/3698 (2013.01); H04N 5/23241 (2013.01); H04N 5/3765 (2013.01); H04N 5/37455 (2013.01)

(58) Field of Classification Search
CPC ............. H04N 5/3698; H04N 5/23241; H04N 5/3765; H04N 5/37455; H03M 1/66–1/68
See application file for complete search history.

(56) References Cited

U.S. PATENT DOCUMENTS

| 7,674,650 B2 | 3/2010 | Akimoto et al. |
| 7,732,819 B2 | 6/2010 | Akimoto et al. |
| 7,910,490 B2 | 3/2011 | Akimoto et al. |
| 7,932,521 B2 | 4/2011 | Akimoto et al. |
| 8,274,077 B2 | 9/2012 | Akimoto et al. |
| 8,378,391 B2 | 2/2013 | Koyama et al. |

(Continued)

FOREIGN PATENT DOCUMENTS

| JP | 2007-096055 A | 4/2007 |
| JP | 2007-123861 A | 5/2007 |

(Continued)

OTHER PUBLICATIONS

R. Funatsu et al., "133Mpixel 60fps CMOS Image Sensor with 32-Column Shared High-Speed Column-Parallel SAR ADCs", ISSCC 2015 (Digest of Technical Papers. IEEE International Solid-State Circuits Conference), pp. 112-113, Feb. 23, 2015.

(Continued)

*Primary Examiner* — Mekonnen Dagnew
(74) *Attorney, Agent, or Firm* — Fish & Richardson P.C.

(57) ABSTRACT

An imaging device with low power consumption is provided. The imaging device includes pixels and an A/D converter circuit. The pixels have a function of holding first imaging data and a function of obtaining differential data between the first imaging data and second imaging data. The A/D converter circuit includes a comparator circuit and a counter circuit. When the output of the pixels corresponds to the differential data, the supply of a clock signal to the counter circuit is stopped.

15 Claims, 44 Drawing Sheets

(56) References Cited

U.S. PATENT DOCUMENTS

| | | | |
|---|---|---|---|
| 8,466,463 | B2 | 6/2013 | Akimoto et al. |
| 8,629,069 | B2 | 1/2014 | Akimoto et al. |
| 8,669,550 | B2 | 3/2014 | Akimoto et al. |
| 8,790,959 | B2 | 7/2014 | Akimoto et al. |
| 8,796,069 | B2 | 8/2014 | Akimoto et al. |
| 8,836,626 | B2 | 9/2014 | Ikeda |
| 8,916,869 | B2 | 12/2014 | Koyama et al. |
| 9,099,562 | B2 | 8/2015 | Akimoto et al. |
| 9,111,824 | B2 | 8/2015 | Ikeda |
| 9,131,171 | B2 | 9/2015 | Aoki et al. |
| 9,455,287 | B2 | 9/2016 | Kurokawa |
| 9,659,983 | B2 | 5/2017 | Ikeda |
| 2011/0101351 | A1 | 5/2011 | Yamazaki |
| 2012/0290855 | A1* | 11/2012 | Aoyagi .............. G06F 1/3206 713/300 |
| 2014/0118333 | A1* | 5/2014 | Ishida .................. G09G 3/20 345/214 |
| 2014/0285413 | A1* | 9/2014 | Miyatake ............ G09G 3/3225 345/87 |
| 2015/0048366 | A1 | 2/2015 | Koyama et al. |
| 2015/0281619 | A1* | 10/2015 | Tanaka ................ H04N 5/335 348/322 |
| 2015/0332568 | A1 | 11/2015 | Kurokawa |
| 2015/0340513 | A1 | 11/2015 | Akimoto et al. |
| 2016/0021314 | A1 | 1/2016 | Kurokawa et al. |
| 2016/0037106 | A1 | 2/2016 | Ohmaru |
| 2016/0172410 | A1 | 6/2016 | Kurokawa |
| 2016/0329024 | A1* | 11/2016 | Maeda ................ G09G 3/3648 |
| 2017/0078608 | A1 | 3/2017 | Kurokawa |

FOREIGN PATENT DOCUMENTS

| | | |
|---|---|---|
| JP | 2011-119711 A | 6/2011 |
| JP | 2011-171702 A | 9/2011 |

OTHER PUBLICATIONS

Aslam-Siddiqi.A et al., "A 16×16 Nonvolatile Programmable Analog Vector-Matrix Multiplier", IEEE Journal of Solid-State Circuits, Oct. 1, 1998, vol. 33, No. 10, pp. 1502-1509.

R. Funatsu et al. "133Mpixel 60fps CMOS Image Sensor with 32-Column Shared High-Speed Column-Parallel SAR ADCs", ISSCC 2015 (Digest of Technical Papers. IEEE International Solid-State Circuits Conference), pp. 112-113.

* cited by examiner

FIG. 25A1
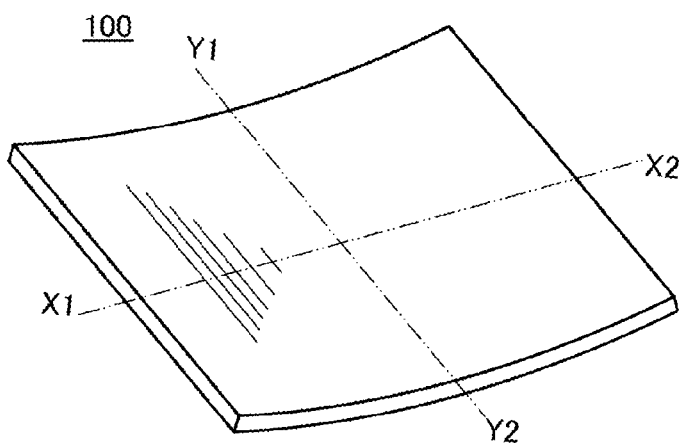
FIG. 25A2
FIG. 25A3
FIG. 25B1
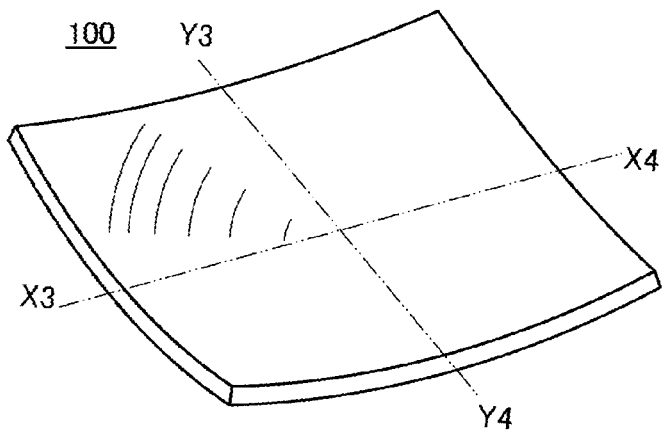
FIG. 25B2
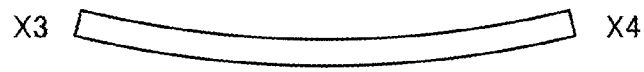
FIG. 25B3
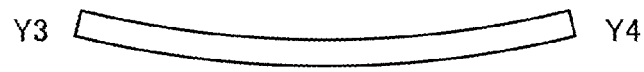

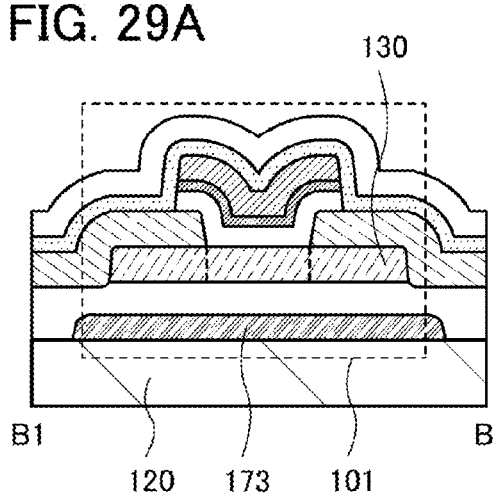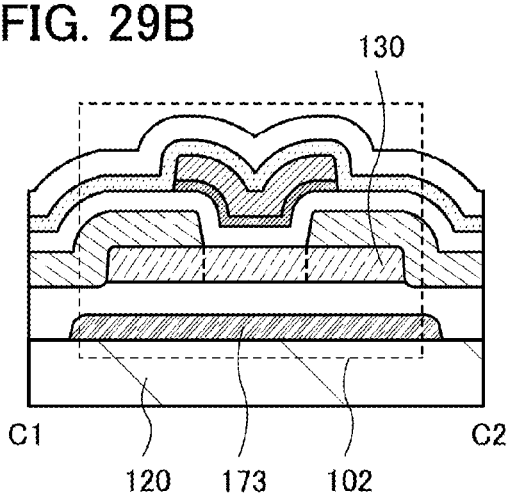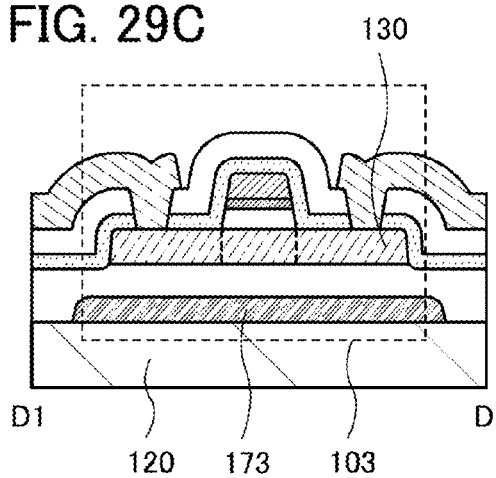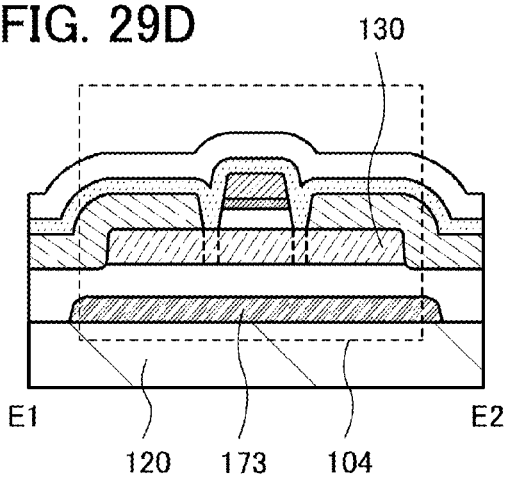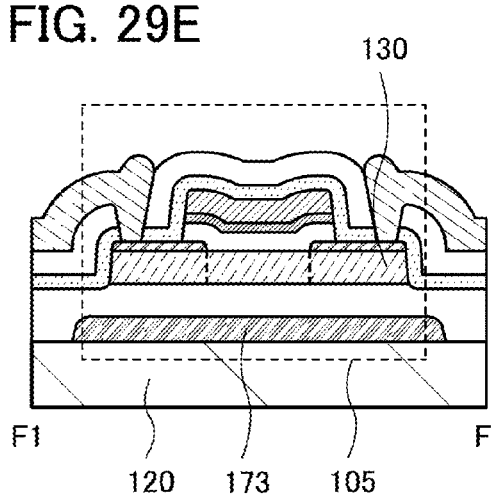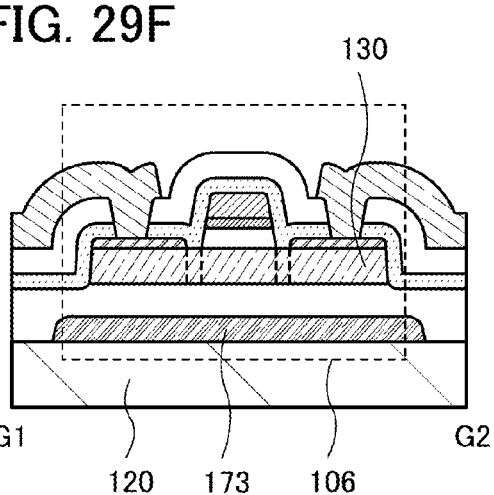

FIG. 43A
FIG. 43B
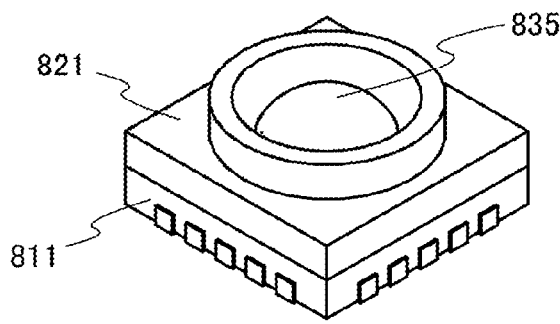
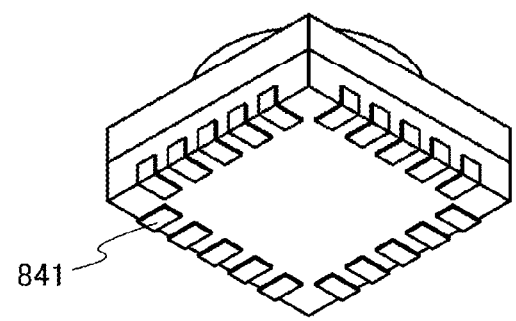
FIG. 43C
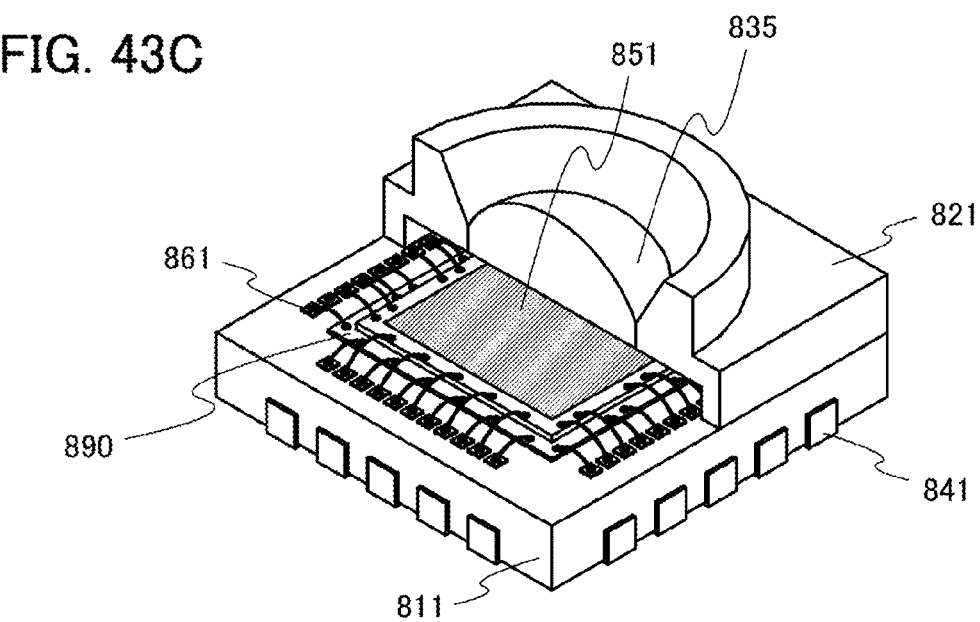
FIG. 43D
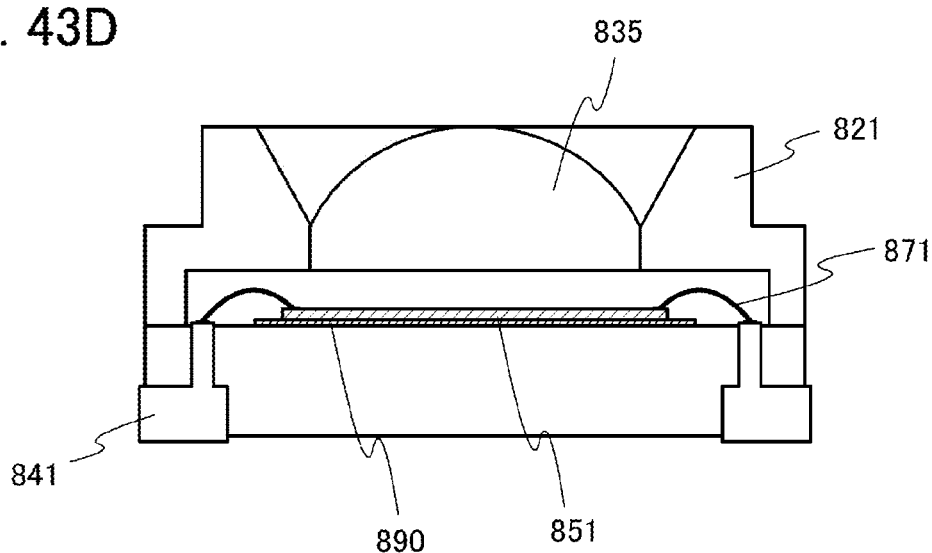

IMAGING DEVICE AND ELECTRONIC DEVICE

BACKGROUND OF THE INVENTION

1. Field of the Invention

One embodiment of the present invention relates to an imaging device.

Note that one embodiment of the present invention is not limited to the above technical field. The technical field of one embodiment of the invention disclosed in this specification and the like relates to an object, a method, or a manufacturing method. In addition, one embodiment of the present invention relates to a process, a machine, manufacture, or a composition of matter. Specifically, examples of the technical field of one embodiment of the present invention disclosed in this specification include a semiconductor device, a display device, a liquid crystal display device, a light-emitting device, a lighting device, a power storage device, a memory device, an imaging device, a method for driving any of them, and a method for manufacturing any of them.

In this specification and the like, a semiconductor device generally means a device that can function by utilizing semiconductor characteristics. A transistor and a semiconductor circuit are embodiments of semiconductor devices. In some cases, a memory device, a display device, an imaging device, or an electronic device includes a semiconductor device.

2. Description of the Related Art

As a semiconductor material applicable to a transistor, an oxide semiconductor has been attracting attention. For example, a technique for forming a transistor using zinc oxide or an In—Ga—Zn-based oxide semiconductor as an oxide semiconductor is disclosed (see Patent Documents 1 and 2).

Patent Document 3 discloses an imaging device in which a transistor including an oxide semiconductor is used in part of a pixel circuit.

Non-Patent Document 1 discloses a technique relating to a complementary metal oxide semiconductor (CMOS) image sensor with one hundred and thirty-three million pixels corresponding to 8K4K imaging.

REFERENCES

Patent Documents

[Patent Document 1] Japanese Published Patent Application No. 2007-123861
[Patent Document 2] Japanese Published Patent Application No. 2007-096055
[Patent Document 3] Japanese Published Patent Application No. 2011-119711

Non-Patent Document

[Non-Patent Document 1] R. Funatsu, et al., 133*Mpixel 60 fps CMOS Image Sensor with 32-Column Shared High-Speed Column Parallel SAR ADCs*, IEEE ISSCC Dig. Tech. Papers, 2015

SUMMARY OF THE INVENTION

In the case where data obtained in an imaging device is transmitted, it is compressed so that the volume of data transmission can be reduced. As an example of a compression method of a moving image, a method can be given in which a reference frame is provided every several frames, and a difference between imaging data of the reference frame and imaging data of the present frame is obtained.

In an imaging device with pixels arranged in a matrix, output data of the pixels is not changed between consecutive frames in many cases. That is, differential data in one pixel between the consecutive frames is "0" in many cases. Therefore, a net data volume can be reduced by an encoding process for efficiently expressing "0".

The load in data transmission is reduced by the compression of data obtained in an imaging device; however, digital image processing that is needed for the compression of data consumes a large amount of power. For example, A/D conversion of data output from pixels in the imaging device, output of data obtained by the A/D conversion, storing of data in frame memories, differential processing, and the like need to be performed. In particular, A/D conversion of data output from pixels in an imaging device and differential processing consume a larger amount of power.

In view of the above, an object of one embodiment of the present invention is to provide an imaging device with low power consumption. Another object is to provide an imaging device that consumes less power in A/D conversion processing. Another object is to provide an imaging device in which differential data between consecutive frames is obtained. Another object is to provide an imaging device that is suitable for high-speed operation. Another object is to provide an imaging device with high resolution. Another object is to provide a highly integrated imaging device. Another object is to provide an imaging device capable of imaging under a low illuminance condition. Another object is to provide an imaging device with a wide dynamic range. Another object is to provide an imaging device that can be used in a wide temperature range. Another object is to provide an imaging device with a high aperture ratio. Another object is to provide an imaging device with high reliability. Another object is to provide a novel imaging device or the like. Another object is to provide a method for driving any of the imaging devices. Another object is to provide a novel semiconductor device or the like.

Note that the descriptions of these objects do not disturb the existence of other objects. In one embodiment of the present invention, there is no need to achieve all the objects. Other objects will be apparent from and can be derived from the description of the specification, the drawings, the claims, and the like.

One embodiment of the present invention relates to an imaging device that outputs differential data between imaging data of a reference frame and imaging data of the present frame.

One embodiment of the present invention is an imaging device including pixels arranged in a matrix and an A/D converter circuit. The A/D converter circuit includes a first circuit, a second circuit, a third circuit, and a fourth circuit. The pixels are electrically connected to the first circuit. The first circuit, the second circuit, the third circuit, and the fourth circuit are each configured to receive and send a high-level potential signal or a low-level potential signal. The first circuit is configured to stop operating in response to a first signal. The first circuit is configured to make a comparison between a second signal output from one of the pixels and a third signal serving as a reference potential signal and then output a fourth signal. The second circuit is configured to output a seventh signal determined by a combination of the fourth signal, a fifth signal for controlling the fourth circuit, and a sixth signal for controlling the second circuit. The third circuit is configured to stop outputting a clock signal in response to the seventh signal. The fourth circuit is configured to perform counting in response to the clock signal and output data of the counting.

The first circuit can be a comparator circuit. The fourth circuit can be a counter circuit.

The pixels can each be configured to hold first imaging data and to obtain differential data between the first imaging data and second imaging data.

The first circuit can operate when the first signal has a high-level potential, and the first circuit can stop operating when the first signal has a low-level potential.

The fourth signal output from the first circuit can have a high-level potential when the first signal has the high-level potential and the second signal has a higher potential than the third signal. The fourth signal output from the first circuit can have a low-level potential when the first signal has the high-level potential and the second signal has a lower potential than the third signal. The fourth signal output from the first circuit can have the low-level potential when the first signal has the low-level potential.

The seventh signal output from the second circuit can have a high-level potential when the sixth signal has a high-level potential and the fifth signal and the fourth signal each have a high-level potential or each have a low-level potential. The seventh signal output from the second circuit can have a low-level potential when the sixth signal has the high-level potential, one of the fifth signal and the fourth signal has the high-level potential, and the other of the fifth signal and the fourth signal has the low-level potential. The seventh signal output from the second circuit can have the low-level potential when the sixth signal has a low-level potential.

The sixth signal can have the low-level potential when the first signal has the low-level potential.

The third circuit can be configured to output the clock signal when the seventh signal has the high-level potential. The third circuit can be configured to stop outputting the clock signal when the seventh signal has the low-level potential.

The fourth circuit can perform an addition operation when the fifth signal has the high-level potential. The fourth circuit can perform a subtraction operation when the fifth signal has the low-level potential.

Each of the pixels can include a first transistor, a second transistor, a third transistor, a fourth transistor, a fifth transistor, a first capacitor, a second capacitor, and a photoelectric conversion element. One of electrodes of the photoelectric conversion element is electrically connected to one of a source electrode and a drain electrode of the first transistor. The other of the source electrode and the drain electrode of the first transistor is electrically connected to one of a source electrode and a drain electrode of the second transistor. The other of the source electrode and the drain electrode of the first transistor is electrically connected to one of electrodes of the first capacitor. The other of the electrodes of the first capacitor is electrically connected to one of a source electrode and a drain electrode of the third transistor. The other of the electrodes of the first capacitor is electrically connected to a gate electrode of the fourth transistor. The other of the electrodes of the first capacitor is electrically connected to one of electrodes of the second capacitor. One of a source electrode and a drain electrode of the fourth transistor is electrically connected to one of a source electrode and a drain electrode of the fifth transistor. The other of the source electrode and the drain electrode of the fifth transistor is electrically connected to the first circuit.

As each of the first transistor, the second transistor, the third transistor, the fourth transistor, the fifth transistor, and the sixth transistor, a transistor including an oxide semiconductor in its active layer can be used. The oxide semiconductor preferably contains In, Zn, and M (M is Al, Ti, Ga, Sn, Y, Zr, La, Ce, Nd, or Hf).

In the photoelectric conversion element, selenium or a compound containing selenium can be used for a photoelectric conversion layer. As selenium, for example, amorphous selenium or crystalline selenium can be used.

According to one embodiment of the present invention, an imaging device with low power consumption can be provided. According to one embodiment of the present invention, an imaging device that consumes less power in A/D conversion processing can be provided. According to one embodiment of the present invention, an imaging device in which differential data between consecutive frames is obtained can be provided. According to one embodiment of the present invention, an imaging device that is suitable for high-speed operation can be provided. According to one embodiment of the present invention, an imaging device with high resolution can be provided. According to one embodiment of the present invention, a highly integrated imaging device can be provided. According to one embodiment of the present invention, an imaging device capable of imaging under a low illuminance condition can be provided. According to one embodiment of the present invention, an imaging device with a wide dynamic range can be provided. According to one embodiment of the present invention, an imaging device that can be used in a wide temperature range can be provided. According to one embodiment of the present invention, an imaging device with a high aperture ratio can be provided. According to one embodiment of the present invention, an imaging device with high reliability can be provided. According to one embodiment of the present invention, a novel imaging device or the like can be provided. According to one embodiment of the present invention, a method for driving any of the imaging devices can be provided. According to one embodiment of the present invention, a novel semiconductor device or the like can be provided.

Note that one embodiment of the present invention is not limited to these effects. For example, depending on circumstances or conditions, one embodiment of the present invention might produce another effect. Furthermore, depending on circumstances or conditions, one embodiment of the present invention might not produce the above effects.

BRIEF DESCRIPTION OF THE DRAWINGS

FIGS. 25A1, 25A2, 25A3, 25B1, 25B2, and 25B3 illustrate bent imaging devices.

FIGS. 29A to 29F each illustrate a cross section of a transistor in a channel length direction.

FIGS. 43A to 43D are perspective views and a cross-sectional view of a package including an imaging device.

DETAILED DESCRIPTION OF THE INVENTION

Figure 1:
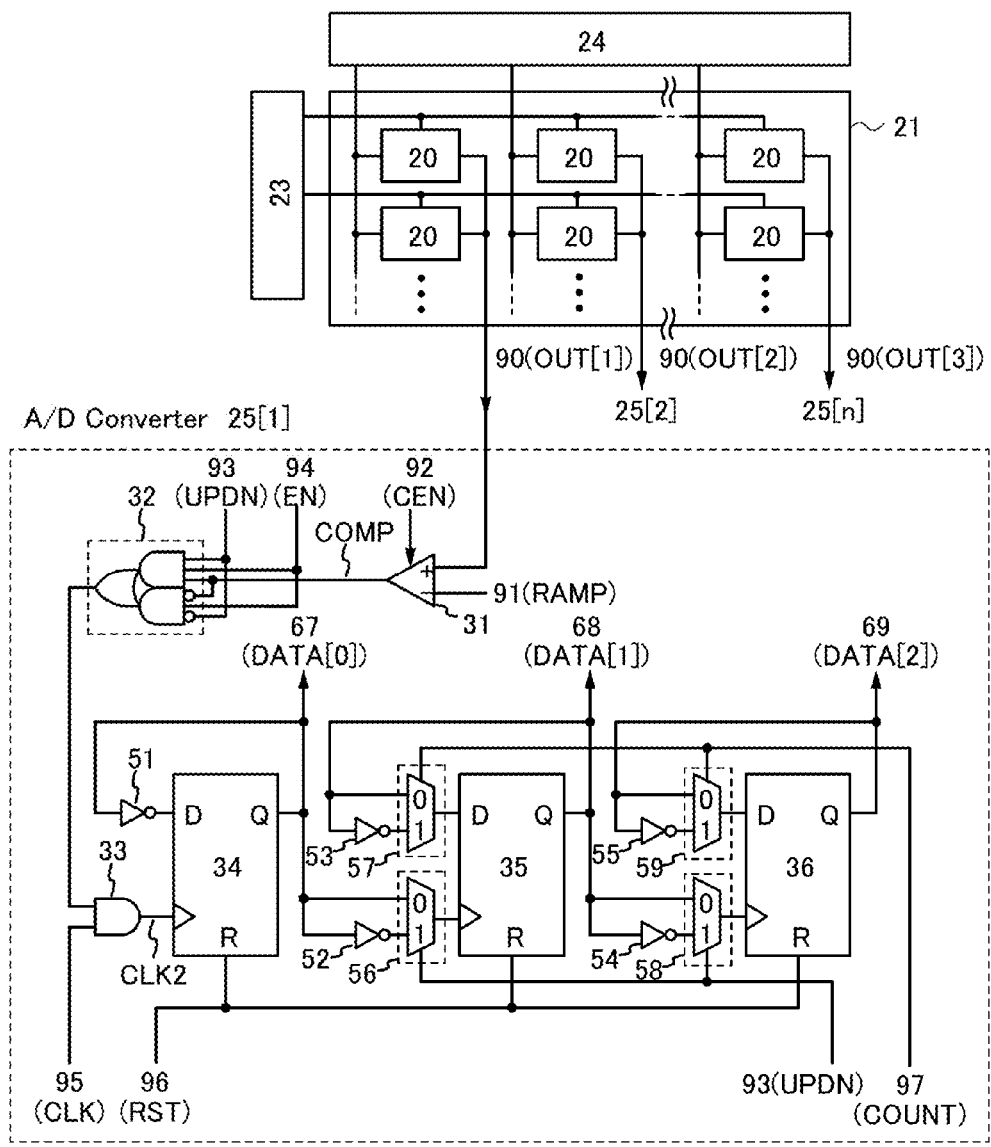
FIG. 1 is a block diagram and a circuit diagram illustrating an imaging device.

Embodiments will be described in detail with reference to drawings. Note that the present invention is not limited to the following description and it will be readily appreciated by those skilled in the art that modes and details can be modified in various ways without departing from the spirit and the scope of the present invention. Therefore, the present invention should not be construed as being limited to the description of the embodiments below. Note that in structures of the invention described below, the same portions or portions having similar functions are denoted by the same reference numerals in different drawings, and description thereof is not repeated in some cases. The same components are denoted by different hatching patterns in different drawings, or the hatching patterns are omitted in some cases.

For example, in this specification and the like, an explicit description "X and Y are connected" means that X and Y are electrically connected, X and Y are functionally connected, and X and Y are directly connected. Accordingly, without being limited to a predetermined connection relation, for example, a connection relation shown in drawings or text, another connection relation is included in the drawings or the text.

Here, X and Y each denote an object (e.g., a device, an element, a circuit, a wiring, an electrode, a terminal, a conductive film, or a layer).

Examples of the case where X and Y are directly connected include the case where an element that enables electrical connection between X and Y (e.g., a switch, a transistor, a capacitor, an inductor, a resistor, a diode, a display element, a light-emitting element, or a load) is not connected between X and Y, and the case where X and Y are connected without the element that enables electrical connection between X and Y provided therebetween.

For example, in the case where X and Y are electrically connected, one or more elements that enable electrical connection between X and Y (e.g., a switch, a transistor, a capacitor, an inductor, a resistor, a diode, a display element, a light-emitting element, or a load) can be connected between X and Y. Note that the switch is controlled to be turned on or off. That is, a switch is conducting or not conducting (is turned on or off) to determine whether current flows therethrough or not. Alternatively, the switch has a function of selecting and changing a current path. Note that the case where X and Y are electrically connected includes the case where X and Y are directly connected.

For example, in the case where X and Y are functionally connected, one or more circuits that enable functional connection between X and Y (e.g., a logic circuit such as an inverter, a NAND circuit, or a NOR circuit; a signal converter circuit such as a DA converter circuit, an AD converter circuit, or a gamma correction circuit; a potential level converter circuit such as a power supply circuit (e.g., a step-up circuit or a step-down circuit) or a level shifter circuit for changing the potential level of a signal; a voltage source; a current source; a switching circuit; an amplifier circuit such as a circuit capable of increasing signal amplitude, the amount of current, or the like, an operational amplifier, a differential amplifier circuit, a source follower circuit, or a buffer circuit; a signal generation circuit; a memory circuit; and/or a control circuit) can be connected between X and Y. For example, in the case where a signal output from X is transmitted to Y even when another circuit is placed between X and Y, X and Y are functionally connected. Note that the case where X and Y are functionally connected includes the case where X and Y are directly connected and the case where X and Y are electrically connected.

Note that in this specification and the like, an explicit description "X and Y are electrically connected" means that X and Y are electrically connected (i.e., the case where X and Y are connected with another element or another circuit provided therebetween), X and Y are functionally connected (i.e., the case where X and Y are functionally connected with another circuit provided therebetween), and X and Y are directly connected (i.e., the case where X and Y are connected without another element or another circuit provided therebetween). That is, in this specification and the like, the explicit description "X and Y are electrically connected" is the same as the description "X and Y are connected".

For example, any of the following expressions can be used for the case where a source (or a first terminal or the like) of a transistor is electrically connected to X through (or not through) Z1 and a drain (or a second terminal or the like) of the transistor is electrically connected to Y through (or not through) Z2, or the case where a source (or a first terminal or the like) of a transistor is directly connected to one part of Z1 and another part of Z1 is directly connected to X while a drain (or a second terminal or the like) of the transistor is directly connected to one part of Z2 and another part of Z2 is directly connected to Y.

Examples of the expressions include, "X, Y, a source (or a first terminal or the like) of a transistor, and a drain (or a second terminal or the like) of the transistor are electrically connected to each other, and X, the source (or the first terminal or the like) of the transistor, the drain (or the second terminal or the like) of the transistor, and Y are electrically connected to each other in this order", "a source (or a first terminal or the like) of a transistor is electrically connected to X, a drain (or a second terminal or the like) of the transistor is electrically connected to Y, and X, the source (or the first terminal or the like) of the transistor, the drain (or the second terminal or the like) of the transistor, and Y are electrically connected to each other in this order", and "X is electrically connected to Y through a source (or a first terminal or the like) and a drain (or a second terminal or the like) of a transistor, and X, the source (or the first terminal or the like) of the transistor, the drain (or the second terminal or the like) of the transistor, and Y are provided to be connected in this order". When the connection order in a circuit structure is defined by an expression similar to the above examples, a source (or a first terminal or the like) and a drain (or a second terminal or the like) of a transistor can be distinguished from each other to specify the technical scope.

Other examples of the expressions include, "a source (or a first terminal or the like) of a transistor is electrically connected to X through at least a first connection path, the first connection path does not include a second connection path, the second connection path is a path between the source (or the first terminal or the like) of the transistor and a drain (or a second terminal or the like) of the transistor, Z1 is on the first connection path, the drain (or the second terminal or the like) of the transistor is electrically connected to Y through at least a third connection path, the third connection path does not include the second connection path, and Z2 is on the third connection path". Another example of the expression is "a source (or a first terminal or the like) of a transistor is electrically connected to X at least with a first connection path through Z1, the first connection path does not include a second connection path, the second connection path includes a connection path through which the transistor is provided, a drain (or a second terminal or the like) of the transistor is electrically connected to Y at least with a third connection path through Z2, and the third connection path does not include the second connection path". Still another example of the expression is "a source (or a first terminal or the like) of a transistor is electrically connected to X through at least Z1 on a first electrical path, the first electrical path does not include a second electrical path, the second electrical path is an electrical path from the source (or the first terminal or the like) of the transistor to a drain (or a second terminal or the like) of the transistor, the drain (or the second terminal or the like) of the transistor is electrically connected to Y through at least Z2 on a third electrical path, the third electrical path does not include a fourth electrical path, and the fourth electrical path is an electrical path from the drain (or the second terminal or the like) of the transistor to the source (or the first terminal or the like) of the transistor". When the connection path in a circuit structure is defined by an expression similar to the above examples, a source (or a first terminal or the like) and a drain (or a second terminal or the like) of a transistor can be distinguished from each other to specify the technical scope.

Note that these expressions are examples and there is no limitation on the expressions. Here, X, Y, Z1, and Z2 each denote an object (e.g., a device, an element, a circuit, a wiring, an electrode, a terminal, a conductive film, and a layer).

Even when independent components are electrically connected to each other in a circuit diagram, one component has functions of a plurality of components in some cases. For example, when part of a wiring also functions as an electrode, one conductive film functions as the wiring and the electrode. Thus, "electrical connection" in this specification includes in its category such a case where one conductive film has functions of a plurality of components.

Note that the terms "film" and "layer" can be interchanged with each other depending on the case or circumstances. For example, the term "conductive layer" can be changed into the term "conductive film" in some cases. Also, the term "insulating film" can be changed into the term "insulating layer" in some cases.

Note that in general, a potential (voltage) is relative and is determined depending on the amount relative to a certain potential. Therefore, even when the expression "ground", "GND", or the like is used, the potential is not necessarily 0 V. For example, the "ground potential" or "GND" may be defined using the lowest potential in a circuit as a reference. Alternatively, the "ground potential" or "GND" may be defined using an intermediate potential in a circuit as a reference. In those cases, a positive potential and a negative potential are set using the potential as a reference.

Embodiment 1

In this embodiment, an imaging device that is one embodiment of the present invention will be described with reference to drawings.

An imaging device of one embodiment of the present invention includes a plurality of pixels and an A/D converter circuit. The pixels have a function of holding first imaging data and a function of obtaining differential data between the first imaging data and second imaging data.

The A/D converter circuit includes a comparator circuit and a counter circuit. The comparator circuit has a function of comparing the output potential of a pixel with a reference potential. The counter circuit has a function of counting depending on the output from the comparator circuit.

When the output from the pixel corresponds to the above differential data, a first period during which the reference potential is increased from a first reference potential and a second period during which the reference potential is decreased from a second reference potential are provided. In the first period and the second period, the supply of a clock signal to the counter circuit is stopped at the time when the output from the comparator circuit is inverted.

FIG. 1 illustrates an imaging device of one embodiment of the present invention. The imaging device includes pixels 20 arranged in a matrix and circuits 23 and 24 for driving the pixels. The imaging device further includes circuits 25 (A/D converter circuits) to which signals output from the pixels 20 are input.

The circuits 25 each have a function of converting an analog signal output from the pixel 20 into a digital signal; a specific circuit diagram of the circuit 25 is illustrated in FIG. 1. In FIG. 1, the connection between a wiring 90 (OUT[1]) to which the pixels 20 in the first column are connected and a circuit 25[1] is shown. Similarly, a wiring 90 (OUT[2]) to which the pixels 20 in the second column are connected is connected to a circuit 25[2], and a wiring 90 (OUT[n]) to which the pixels 20 in the n-th column are connected is connected to a circuit 25[n]. Alternatively, a plurality of wirings 90 (OUT) may be electrically connected to one circuit 25 so as to perform processing by sequentially switching the wirings 90 (OUT).

The circuit 25 includes a comparison circuit, a determination circuit, and a counter circuit. In this embodiment, the structure in which the circuit 25 has a 3-bit counter circuit and its operation are shown as one example; however, the number of bits of the counter circuit may be four or more.

As the comparison circuit, a comparator circuit 31 can be used. A signal output from the pixel 20 can be input to a first input terminal (+) of the comparator circuit 31 through the wiring 90 (OUT). A reference potential signal can be input to a second input terminal (−) of the comparator circuit 31 through a wiring 91 (RAMP).

When the potential of the reference potential signal is lower than the potential of the signal output from the pixel 20, an output signal COMP output from an output terminal of the comparator circuit 31 is set at "H"; when the potential of the reference potential signal is higher than the potential of the signal output from the pixel 20, the output signal COMP is set at "L". When "H" is input to the comparator circuit 31 through a wiring 92 (CEN) connected to a third input terminal of the comparator circuit 31, the comparator circuit 31 is brought into an operating state; when "L" is input thereto, the comparator circuit 31 is brought into a non-operating state (the output signal COMP is set at "L"). In the description of the signals, "H" represents a high-potential signal, and can also be expressed as "1" or a signal with a high-level potential. Furthermore, "L" represents a low-potential signal, and can also be expressed as "0" or a signal with a low-level potential.

The determination circuit can be formed using circuits 32 and 33. The circuit 32 can output "H" when two input signals are each "H" or each "L". For example, the circuit 32 can have a configuration illustrated in FIG. 1, but is not limited thereto.

One of the signals input to the circuit 32 is the output signal COMP of the comparator circuit 31, and the other is a signal input through a wiring 93 (UPDN). The signal input through the wiring 93 (UPDN) depends on the operation mode of the counter circuit. When the counter circuit is made to perform an addition operation as an up counter, "H" is input through the wiring 93 (UPDN); when it is made to perform a subtraction operation as a down counter, "L" is input therethrough.

A control signal EN is input to the circuit 32 through a wiring 94 (EN). When the control signal EN is "H", the circuit 32 can output "H" or "L" depending on the combination between the output signal COMP and the signal input through the wiring 93 (UPDN). In contrast, when the control signal EN is "L", the circuit 32 can output "L" regardless of whether the output signal COMP is "H" or "L".

The circuit 33 can output "H" when two input signals are each "H". One of the signals input to the circuit 33 is the output signal of the circuit 32, and the other is a clock signal (CLK1) input through a wiring 95 (CLK). Therefore, when the output signal of the circuit 32 is "H", a clock signal (CLK2) is output from the circuit 33. Here, the clock signal (CLK2) is utilized for the operation of the counter circuit.

The counter circuit can have a structure where flip-flop circuits 34, 35, and 36, inverter circuits 51, 52, 53, 54, and 55, and selector circuits 56, 57, 58, and 59 are provided. Note that these components are just examples, and other elements operating as in the following description can also be included as components of the counter circuit. Alternatively, other elements having functions of the above elements can also be included as components of the counter circuit.

The flip-flop circuits 34, 35, and 36 each have a clock signal input terminal, an input terminal (D), an output terminal (Q), and a reset terminal (R). Note that the reset terminals (R) of the flip-flop circuits 34, 35, and 36 are electrically connected to a wiring 96 (RST) through which a reset signal can be supplied.

To the clock signal input terminal of the flip-flop circuit 34, an output terminal of the circuit 33 is electrically connected. To the input terminal (D) of the flip-flop circuit 34, an output terminal of the inverter circuit 51 is electrically connected. The output terminal (Q) of the flip-flop circuit 34 is electrically connected to a wiring 67 (DATA[0]). The output terminal (Q) of the flip-flop circuit 34 is also electrically connected to an input terminal of the inverter circuit 51.

To the clock signal input terminal of the flip-flop circuit 35, an output terminal of the selector circuit 56 is electrically connected. To a first input terminal of the selector circuit 56, an output terminal of the inverter circuit 52 is electrically connected. To a second input terminal of the selector circuit 56 and an input terminal of the inverter circuit 52, the output terminal (Q) of the flip-flop circuit 34 is electrically connected. A selection control signal terminal of the selector circuit 56 is electrically connected to the wiring 93 (UPDN).

When a signal input to the selector circuit 56 through the wiring 93 (UPDN) is "H", a signal input through the first input terminal serves as an output signal of the selector circuit 56. When a signal input to the selector circuit 56 through the wiring 93 (UPDN) is "L", a signal input through the second input terminal serves as an output signal of the selector circuit 56.

To the input terminal (D) of the flip-flop circuit 35, an output terminal of the selector circuit 57 is electrically connected. To a first input terminal of the selector circuit 57, an output terminal of the inverter circuit 53 is electrically connected. To a second input terminal of the selector circuit 57 and an input terminal of the inverter circuit 53, the output terminal (Q) of the flip-flop circuit 35 is electrically connected. A selection control signal terminal of the selector circuit 57 is electrically connected to a wiring 97 (COUNT).

When a signal input through the wiring 97 (COUNT) is "H", a signal input to the selector circuit 57 through the first input terminal serves as an output signal of the selector circuit 57. When a signal input through the wiring 97 (COUNT) is "L", a signal input to the selector circuit 57 through the second input terminal serves as an output signal of the selector circuit 57 and the counter circuit does not perform counting.

The output terminal (Q) of the flip-flop circuit 35 is electrically connected to a wiring 68 (DATA[1]).

To the clock signal input terminal of the flip-flop circuit 36, an output terminal of the selector circuit 58 is electrically connected. To a first input terminal of the selector circuit 58, an output terminal of the inverter circuit 54 is electrically connected. To a second input terminal of the selector circuit 58 and an input terminal of the inverter circuit 54, the output terminal (Q) of the flip-flop circuit 35 is electrically connected. A selection control signal terminal of the selector circuit 58 is electrically connected to the wiring 93 (UPDN). Note that the selector circuit 58 can operate similarly to the selector circuit 56.

To the input terminal (D) of the flip-flop circuit 36, an output terminal of the selector circuit 59 is electrically connected. To a first input terminal of the selector circuit 59, an output terminal of the inverter circuit 55 is electrically connected. To a second input terminal of the selector circuit 59 and an input terminal of the inverter circuit 55, the output terminal (Q) of the flip-flop circuit 36 is electrically connected. A selection control signal terminal of the selector circuit 59 is electrically connected to the wiring 97 (COUNT). Note that the selector circuit 59 can operate similarly to the selector circuit 57.

The output terminal (Q) of the flip-flop circuit 36 is electrically connected to a wiring 69 (DATA[2]).

A signal output to the wiring 67 (DATA[0]), the wiring 68 (DATA[1]), and the wiring 69 (DATA[2]) corresponds to an output value (DATA[2:0]) of the counter circuit. When the wiring 96 (RST) is set at "H", the counter circuit is reset and the output value DATA[2:0] of the counter circuit is set at "000".

Figure 2:
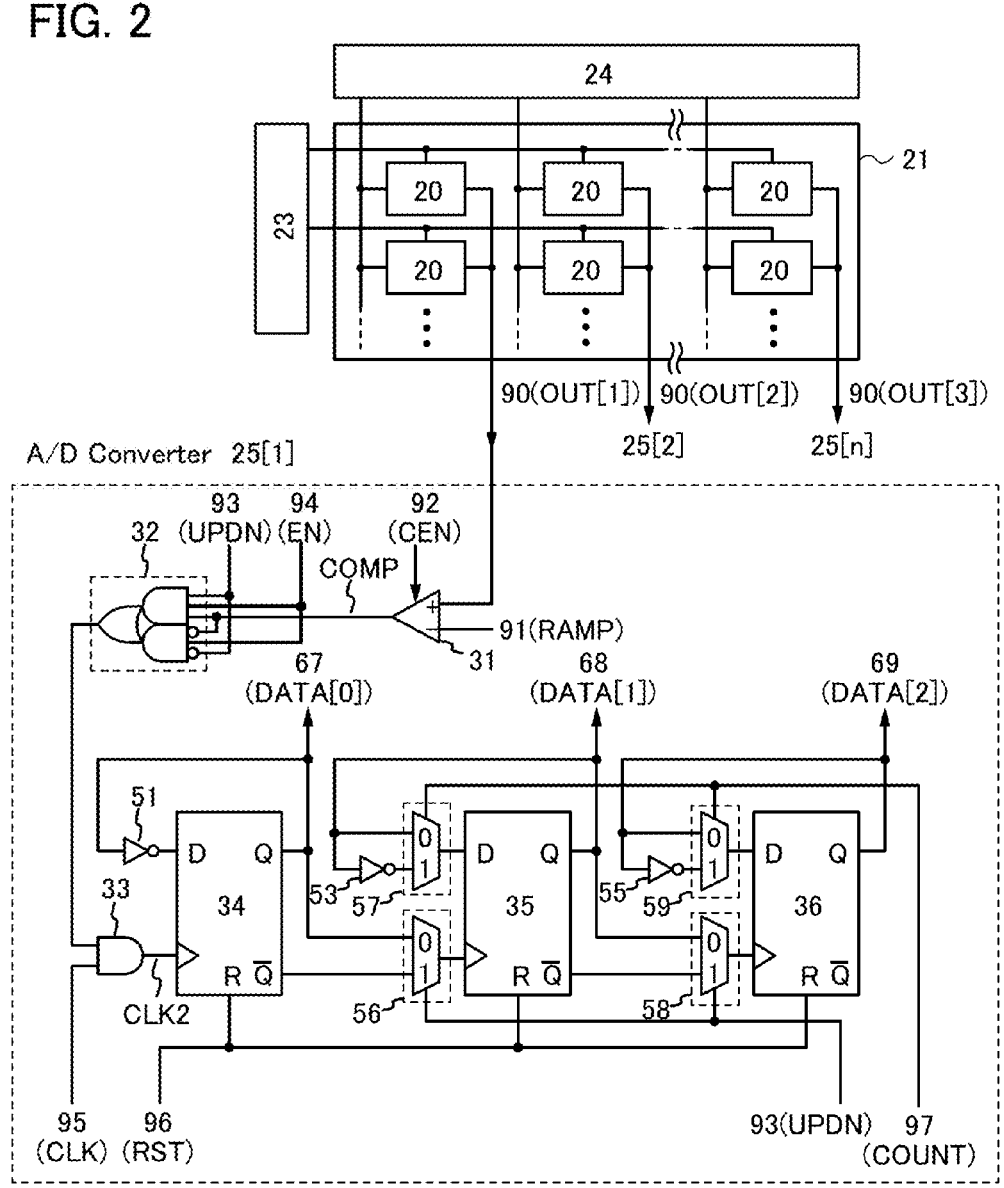
FIG. 2 is a block diagram and a circuit diagram illustrating an imaging device.

In the case where a circuit including an inversion output terminal (Q bar) is used as each of the flip-flop circuits 34, 35, and 36, the inverter circuits 52 and 54 can be omitted as illustrated in FIG. 2.

The pixel 20 used in the imaging device of one embodiment of the present invention preferably has a function of holding imaging data (first imaging data) of a reference frame, which has been obtained in advance, and a function of outputting a difference between the first imaging data and imaging data (second imaging data) of the present frame.

Figure 3:
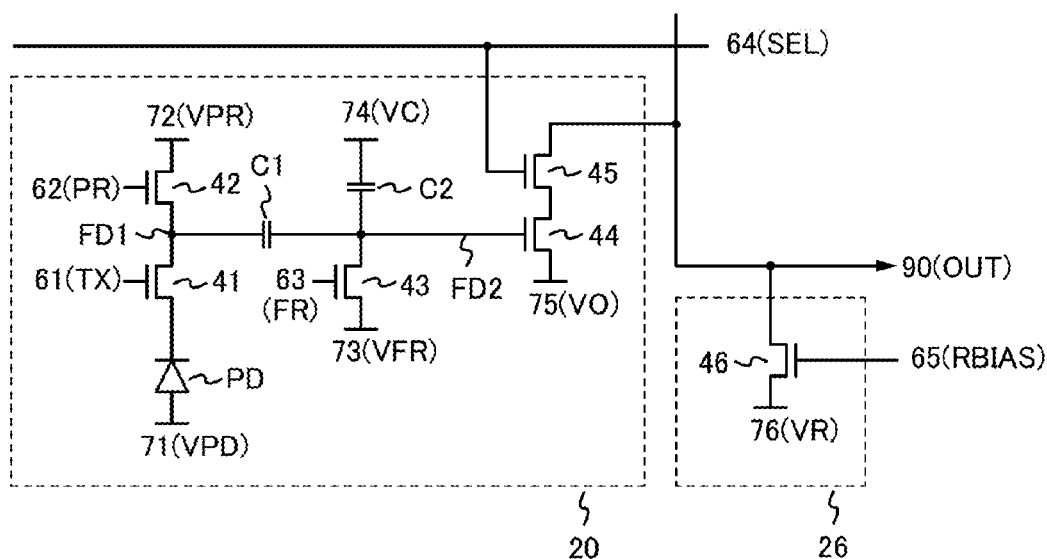
FIG. 3 is a circuit diagram illustrating a pixel and a reading circuit.

The pixel 20 can have a configuration of the circuit diagram illustrated in FIG. 3, for example. The pixel 20 includes a photoelectric conversion element PD, transistors 41 to 45, and capacitors C1 and C2. The capacitance value of the capacitor C1 is preferably larger than that of the capacitor C2. In the configuration illustrated in FIG. 3, a reading circuit 26 includes a current source using a transistor 46. Note that the reading circuit 26 may include a sample-and-hold circuit.

One of electrodes of the photoelectric conversion element PD (photodiode) is electrically connected to one of a source electrode and a drain electrode of the transistor 41. The other of the source electrode and the drain electrode of the transistor 41 is electrically connected to one of a source electrode and a drain electrode of the transistor 42 and one of electrodes of the capacitor C1. The other electrode of the capacitor C1 is electrically connected to one of a source electrode and a drain electrode of the transistor 43, a gate electrode of the transistor 44, and one of electrodes of the capacitor C2. One of a source electrode and a drain electrode of the transistor 44 is electrically connected to one of a source electrode and a drain electrode of the transistor 45. The other of the source electrode and the drain electrode of the transistor 45 is electrically connected to one of a source electrode and a drain electrode of the transistor 46.

The other electrode of the photoelectric conversion element PD is electrically connected to a wiring 71 (VPD). The other of the source electrode and the drain electrode of the transistor 42 is electrically connected to a wiring 72 (VPR). The other of the source electrode and the drain electrode of the transistor 43 is electrically connected to a wiring 73 (VFR). The other electrode of the capacitor C2 is electrically connected to a wiring 74 (VC). The other of the source electrode and the drain electrode of the transistor 44 is electrically connected to a wiring 75 (VO). The other of the source electrode and the drain electrode of the transistor 46 is electrically connected to a wiring 76 (VR).

Here, the wiring 71 (VPD), the wiring 72 (VPR), the wiring 73 (VFR), the wiring 74 (VC), the wiring 75 (VO), and the wiring 76 (VR) can function as power supply lines. For example, the wiring 71 (VPD), the wiring 74 (VC), and the wiring 76 (VR) can function as low power supply potential lines, and the wiring 72 (VPR), the wiring 73 (VFR), and the wiring 75 (VO) can function as high power supply potential lines.

A gate electrode of the transistor 41 is electrically connected to a wiring 61 (TX). A gate electrode of the transistor 42 is electrically connected to a wiring 62 (PR). A gate electrode of the transistor 43 is electrically connected to a wiring 63 (FR). A gate electrode of the transistor 45 is electrically connected to a wiring 64 (SEL). A gate electrode of the transistor 46 is electrically connected to a wiring 65 (RBIAS).

Here, the wiring 61 (TX), the wiring 62 (PR), the wiring 63 (FR), the wiring 64 (SEL), and the wiring 65 (RBIAS) can each function as a signal line that controls the on/off states of the transistor.

The transistor 41 functions as a transfer transistor for controlling the potential of a charge holding portion (FD1) in response to the output of the photoelectric conversion element PD. The transistor 42 functions as a reset transistor for initializing the potential of the charge holding portion (FD1). The transistor 43 functions as a reset transistor for initializing the potential of a charge detection portion (FD2). The transistor 44 functions as an amplifying transistor for outputting a signal corresponding to the potential of the charge detection portion (FD2). The transistor 45 functions as a selection transistor for selecting the pixel 20. The transistor 46 functions as a current source transistor for supplying an appropriate signal potential to the wiring 90 (OUT) electrically connected to the one of the source electrode and the drain electrode of the transistor 46.

Note that the above structures of the circuit 25, the pixel 20, and the reading circuit 26 are just examples, and some of the circuits, some of the transistors, some of the capacitors, some of the wirings, or the like might not be included. Alternatively, a circuit, a transistor, a capacitor, a wiring, or the like that is not included in the above structure might be included. Alternatively, connection between some wirings might be different from the above connection.

Figure 4:
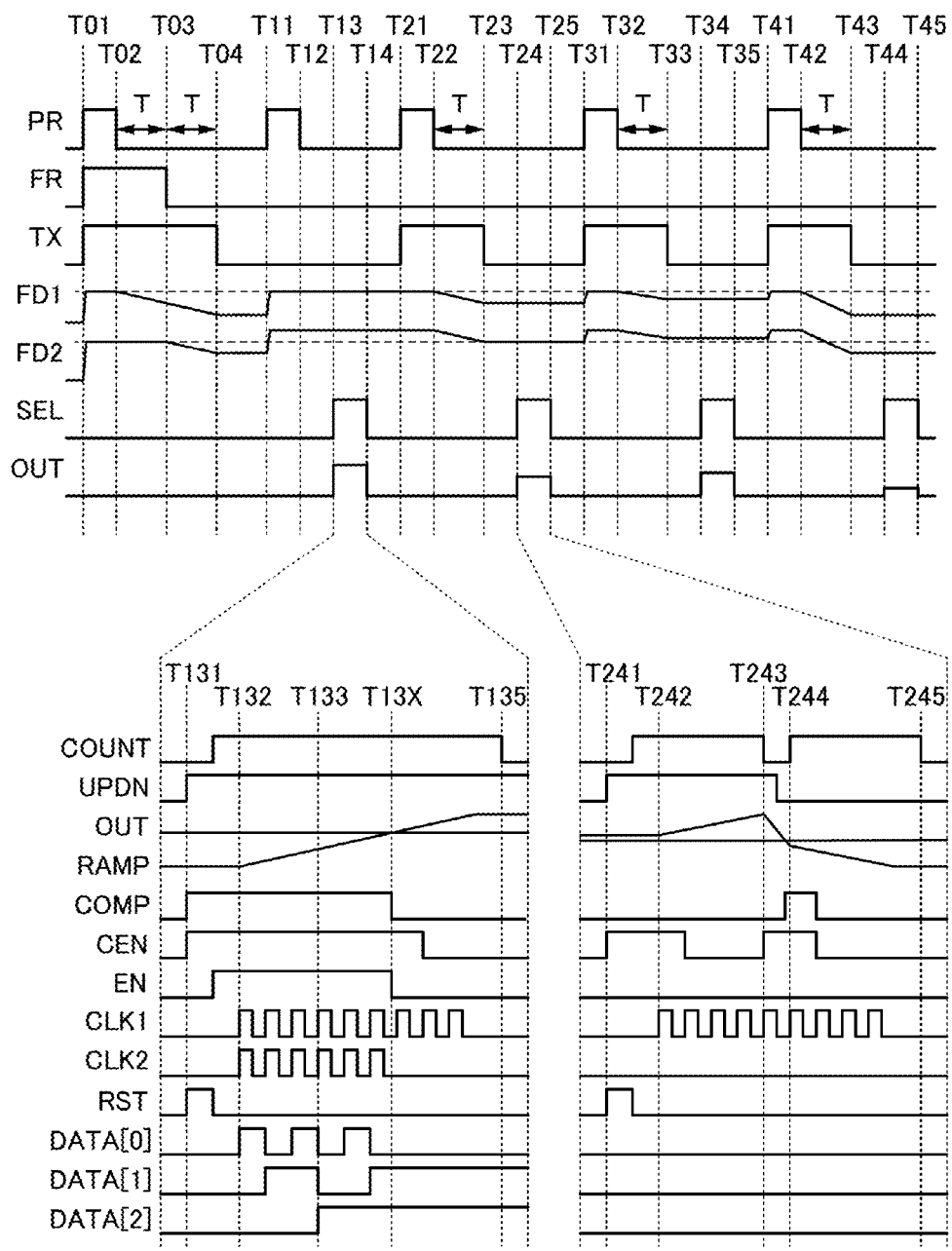
FIG. 4 is a timing chart illustrating operations of imaging and A/D conversion processing.
Figure 5:
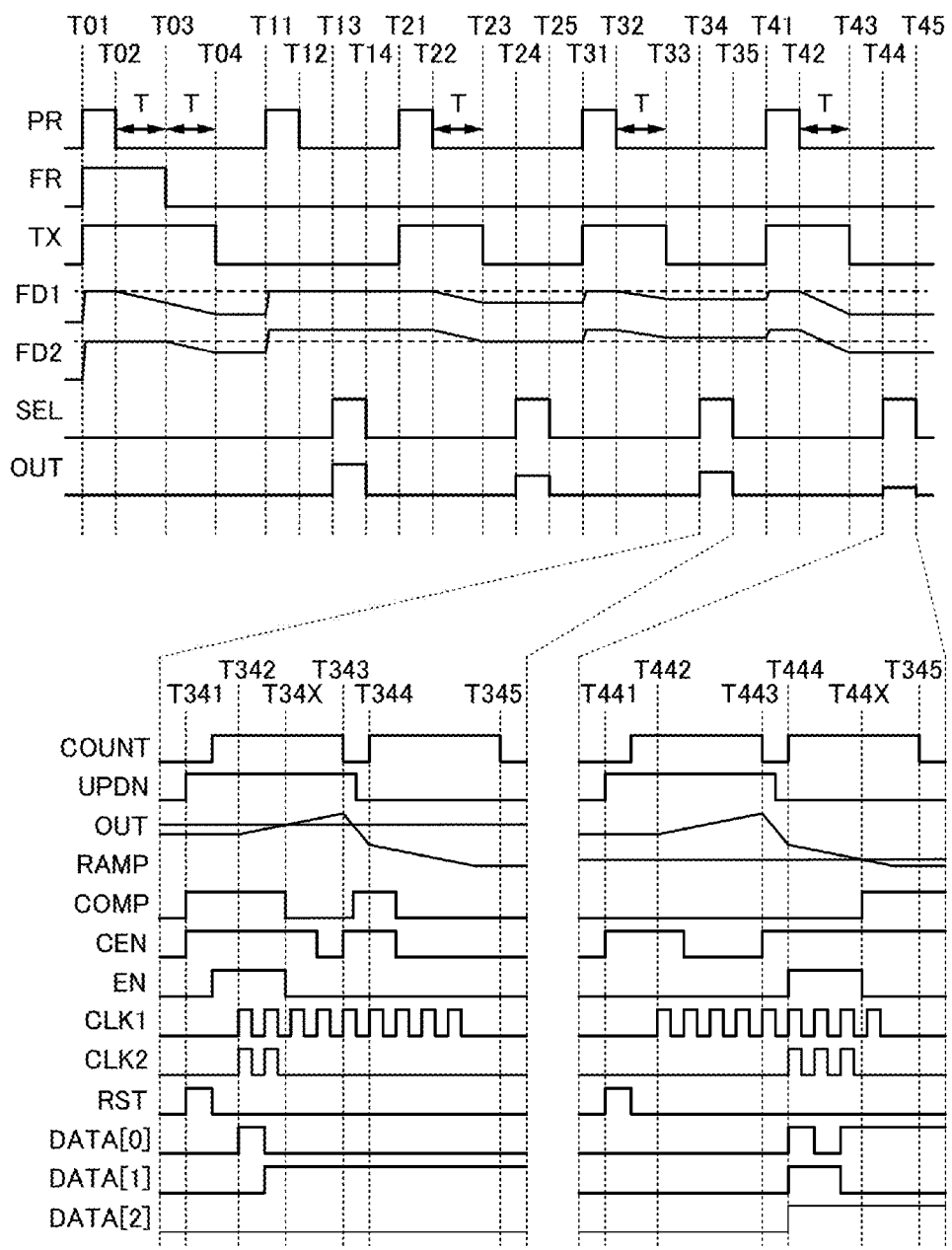
FIG. 5 is a timing chart illustrating operations of imaging and A/D conversion processing.

Next, the operations of the pixel 20 and the circuit 25 described above will be described with reference to timing charts shown in FIG. 4 and FIG. 5. Note that the wiring 71 (VPD), the wiring 74 (VC), and the wiring 76 (VR) are each set at a low potential, and the wiring 72 (VPR), the wiring 73 (VFR), and the wiring 75 (VO) are each set at a high potential.

In a period from Time T01 to Time T04 and in a period from Time T11 to Time T14, imaging data of a reference frame is obtained.

In a period from Time T01 to Time T02, the wiring 62 (PR) is set at "H", the wiring 63 (FR) is set at "H", and the wiring 61 (TX) is set at "H". At this time, the potential of the charge detection portion FD2 is set to the potential VFR of the wiring 73 (VFR), and the potential of the charge holding portion FD1 is set to the potential VPR of the wiring 72 (VPR).

In a period from Time T02 to Time T03, the wiring 62 (PR) is set at "L", the wiring 63 (FR) is set at "H", and the wiring 61 (TX) is set at "H". At this time, the potential of the charge holding portion FD1 is decreased by VP' to be VPR−VP' according to the intensity of light with which the photoelectric conversion element PD is irradiated. The higher the intensity of light with which the photoelectric conversion element PD is irradiated is, the lower the potential of the charge holding portion FD1 becomes. Note that the potential of the charge detection portion FD2 is kept at the potential VFR.

In a period from Time T03 to Time T04, the wiring 62 (PR) is set at "L", the wiring 63 (FR) is set at "L", and the wiring 61 (TX) is set at "H". At this time, the potential of the charge holding portion FD1 is further decreased by VP' to be VPR−2VP' according to the intensity of light with which the photoelectric conversion element PD is irradiated. The potential of the charge detection portion FD2 is decreased by VP to be VFR−VP owing to capacitive coupling between the capacitor C1 and the capacitor C2. The higher the intensity of light with which the photoelectric conversion element PD is irradiated is, the lower the potentials of the charge holding portion FD1 and the charge detection portion FD2 become.

In the above operation, the length of the period from Time T02 to Time T03 and the length of the period from Time T03 to Time T04 are each defined as T, and are equal to each other. Furthermore, the amount of light with which the photoelectric conversion element PD is irradiated in the period from Time T02 to Time T03 can be regarded as equal to that in the period from Time T03 to Time T04.

In a period from Time T11 to Time T12, the wiring 62 (PR) is set at "H", the wiring 63 (FR) is set at "L", and the wiring 61 (TX) is set at "H". At this time, the potential of the charge holding portion FD1 is increased from VPR−2VP' to VPR, which is the potential of the wiring 72 (VPR). In other words, the potential of the charge holding portion FD1 is increased by 2VP', which corresponds to a voltage drop in a period from Time T02 to Time T04. Meanwhile, the potential of the charge detection portion FD2 is increased from VFR−VP by 2VP owing to capacitive coupling between the capacitor C1 and the capacitor C2. In other words, the potential of the charge detection portion FD2 becomes VFR+VP, which is the result of VFR corresponding to the potential of the wiring 73 (VFR) minus VP corresponding to a voltage drop in the period from Time T03 to Time T04 plus 2VP.

In a period from Time T13 to Time T14, the wiring 64 (SEL) is set at "H". At this time, an appropriate potential is applied to the wiring 65 (RBIAS), whereby the wiring 90 (OUT) is supplied with a voltage corresponding to imaging data in accordance with VFR+VP, which is the potential of the charge detection portion FD2.

At Time T131, the wiring 96 (RST) is set at "H". At this time, the counter circuit in the circuit 25 is reset, and DATA [2:0] to be output to the wiring 69 (DATA[2]), the wiring 68 (DATA[1]), and the wiring 67 (DATA[0]) becomes "000".

Then, before Time T132, the wiring 97 (COUNT) and the wiring 93 (UPDN) are each set at "H" so that the counter circuit is made to operate as an up counter, and the wiring 92 (CEN) is set at "H" so that the comparator circuit 31 is made to operate. In the initial state, the potential of the wiring 91 (RAMP) is a low potential and is lower than the potential of the wiring 90 (OUT); thus, the output signal COMP of the comparator circuit 31 is set at "H".

The wiring 94 (EN) is set at "H" when the wiring 97 (COUNT), the wiring 93 (UPDN), and the output signal COMP of the comparator circuit 31 are each set at "H", or when the wiring 97 (COUNT) is set at "H" and the wiring 93 (UPDN) and the output signal COMP of the comparator circuit 31 are each set at "L". The above condition is satisfied in a period from Time T131 to Time T132, and the potential of the wiring 94 (EN), i.e., the control signal EN is set at "H" so that the circuit 32 can output a signal set at "H".

The control signal EN is set at "L" when the wiring 97 (COUNT) and the wiring 93 (UPDN) are each set at "H" and the output signal COMP of the comparator circuit 31 is set at "L", or when the wiring 97 (COUNT) and the output signal COMP of the comparator circuit 31 are each set at "H" and the wiring 93 (UPDN) is set at "L". Note that the control signal EN is set at "L" when the wiring 92 (CEN) is set at "L". When the wiring 92 (CEN) is set at "L", the output signal COMP of the comparator circuit 31 is set at "L". To the wiring 94 (EN), a circuit for generating the control signal EN that is set in a manner shown in the following table in response to the potentials of the wirings may be connected.

TABLE 1

|  | 1 | 2 | 3 | 4 | 5 |
|---|---|---|---|---|---|
| COUNT |  |  | "H" |  |  |
| CEN |  | "H" |  |  | "L" |
| UPDN | "H" | "L" | "H" | "L" | "H" or "L" |
| COMP | "H" | "L" | "L" | "H" | "L" |
| EN | "H" | "H" | "L" | "L" | "L" |

At Time T132, the potential of the wiring 91 (RAMP) starts to be increased. The clock signal CLK1 is supplied from the wiring 95 (CLK) to the circuit 33. At Time T132, the output signal of the circuit 32 is "H", and thus the clock signal CLK2 having the same waveform as the clock signal CLK1 is output from the circuit 33 and the counter circuit performs counting.

Just after Time T13X, the potential of the wiring 91 (RAMP) becomes higher than that of the wiring 90 (OUT), and the output signal COMP of the comparator circuit 31 is set at "L". At this time, the clock signal CLK2 is set at "L", and the counter circuit stops counting. After the counter circuit stops counting, it is effective to stop the operation of the comparator circuit 31 by setting the signal line CEN at "L". When the potential of the wiring 91 (RAMP) reaches the maximum value, the supply of the clock signal CLK1 is preferably stopped at once. With such a structure, power consumption can be reduced. Note that at Time T13X, DATA[2:0] is "110".

In a period from Time T21 to Time T25, imaging data of a first frame is obtained and differential data between the imaging data of the first frame and imaging data of the reference frame is obtained. In the example shown here, the imaging data of the reference frame and that of the first frame are the same; that is, the differential data is 0.

In a period from Time T21 to Time T22, the wiring 62 (PR) is set at "H", the wiring 63 (FR) is set at "L", and the wiring 61 (TX) is set at "H". At this time, the potential of the charge holding portion FD1 is set to the potential VPR of the wiring 72 (VPR), and the potential of the charge detection portion FD2 is set to VFR+VP.

In a period from Time T22 to Time T23, the wiring 62 (PR) is set at "L", the wiring 63 (FR) is set at "L", and the wiring 61 (TX) is set at "H". At this time, the potential of the charge holding portion FD1 is decreased according to the intensity of light with which the photoelectric conversion element PD is irradiated. The potential of the charge detection portion FD2 is also decreased owing to capacitive coupling between the capacitor C1 and the capacitor C2.

In the above operation, the length of the period from Time T22 to Time T23 is equal to T, which is the length of the above period from Time T02 to Time T03 or from Time T03 to Time T04. The amount of light with which the photoelectric conversion element PD is irradiated in the period from Time T22 to Time T23 can be regarded as equal to that in the period from Time T02 to Time T03 or from Time T03 to Time T04.

At this time, a potential VP2' corresponding to a voltage drop in the charge holding portion FD1 is equivalent to the potential VP' corresponding to the voltage drop in the period from Time T02 to Time T03 or from Time T03 to Time T04. Furthermore, a potential VP2 corresponding to a voltage drop in the charge detection portion FD2 is equivalent to the potential VP corresponding to the voltage drop in the period from Time T03 to Time T04. Therefore, VFR+VP−VP2, which is the potential of the charge detection portion FD2, is equivalent to the potential of the wiring 73 (VFR). This corresponds to the case where a difference between imaging data of the reference frame and imaging data of the first frame is 0.

In a period from Time T24 to Time T25, the wiring 64 (SEL) is set at "H". At this time, an appropriate potential is applied to the wiring 65 (RBIAS), whereby the wiring 90 (OUT) is supplied with a voltage corresponding to imaging data in accordance with VFR+VP−VP2 (=VFR), which is the potential of the charge detection portion FD2.

At Time T241, the wiring 96 (RST) is set at "H". At this time, the counter circuit in the circuit 25 is reset, and DATA [2:0] to be output to the wiring 69 (DATA[2]), the wiring 68 (DATA[1]), and the wiring 67 (DATA[0]) becomes "000".

Then, before Time T242, the wiring 97 (COUNT) and the wiring 93 (UPDN) are each set at "H" so that the counter circuit is made to operate as an up counter, and the wiring 92 (CEN) is set at "H" so that the comparator circuit 31 is made to operate.

At Time T242, the potential of the wiring 91 (RAMP) is set to the first reference potential, and then the potential of the wiring 91 (RAMP) is gradually increased. The wiring 95 (CLK) is supplied with the clock signal CLK1.

Note that the first reference potential is much higher than the potential of the wiring 90 (OUT) when the potential of the charge detection portion FD2 is VFR. Specifically, the first reference potential is the lowest potential that can be regarded as higher than the potential of the wiring 90 (OUT) by the comparator circuit 31 when the potential of the charge detection portion FD2 is VFR.

At Time T242, the potential of the wiring 91 (RAMP) is higher than that of the wiring 90 (OUT), and the output signal COMP of the comparator circuit 31 is set at "L". Since the wiring 94 (EN) and the clock signal CLK2 are each set at "L" here, the counter circuit does not perform counting. Since the counter circuit does not perform counting, the structure of stopping the operation of the comparator circuit 31 by setting the wiring 92 (CEN) at "L" is effective. With such a structure, power consumption can be reduced.

In a period from Time T243 to Time T244, the wiring 97 (COUNT) is set at "L". After that, the wiring 93 (UPDN) is set at "L" before Time T244, and then the wiring 97 (COUNT) is set at "H" so that the counter circuit is made to operate as a down counter. The wiring 92 (CEN) is set at "H" so that the comparator circuit 31 is made to operate.

At Time T244, the potential of the wiring 91 (RAMP) is set to the second reference potential, and then the potential of the wiring 91 (RAMP) is gradually decreased and the wiring 95 (CLK) is supplied with the clock signal CLK1.

Note that the second reference potential is much lower than the potential of the wiring 90 (OUT) when the potential of the charge detection portion FD2 is VFR. Specifically, the second reference potential is the highest potential that can be regarded as lower than the potential of the wiring 90 (OUT) by the comparator circuit 31 when the potential of the charge detection portion FD2 is VFR.

During this period, when the potential of the wiring 91 (RAMP) is lower than that of the wiring 90 (OUT), the output signal COMP of the comparator circuit 31 is set at "H".

Since the wiring 94 (EN) and the clock signal CLK2 are each set at "L" here, the counter circuit does not perform counting. Since the counter circuit does not perform counting, the structure of stopping the operation of the comparator circuit 31 by setting the wiring 92 (CEN) at "L" is effective. When the potential of the wiring 91 (RAMP) reaches the minimum value, the supply of the clock signal CLK1 is preferably stopped at once. With such a structure, power consumption can be reduced. Here, DATA[2:0], which is the output of the circuit 25, is "000".

In a period from Time T31 to Time T35, imaging data of a second frame is obtained and differential data between the imaging data of the second frame and imaging data of the reference frame is obtained. In the example shown here, a difference between the reference frame and the second frame is finite (a positive value). Note that the imaging data of the second frame can be obtained by excluding differential data from the imaging data of the reference frame.

In a period from Time T31 to Time T32, the wiring 62 (PR) is set at "H", the wiring 63 (FR) is set at "L", and the wiring 61 (TX) is set at "H". At this time, the potential of the charge holding portion FD1 is set to the potential VPR of the wiring 72 (VPR), and the potential of the charge detection portion FD2 is set to VFR+VP.

In a period from Time T32 to Time T33, the wiring 62 (PR) is set at "L", the wiring 63 (FR) is set at "L", and the wiring 61 (TX) is set at "H". At this time, the potential of the charge holding portion FD1 is decreased according to the intensity of light with which the photoelectric conversion element PD is irradiated. The potential of the charge detection portion FD2 is also decreased owing to capacitive coupling between the capacitor C1 and the capacitor C2.

In the above operation, the length of the period from Time T32 to Time T33 is equal to T, which is the length of the above period from Time T02 to Time T03 or from Time T03 to Time T04. The amount of light with which the photoelectric conversion element PD is irradiated in the period from Time T32 to Time T33 is smaller than that in the period from Time T02 to Time T03 or from Time T03 to Time T04.

At this time, a potential VP3' corresponding to a voltage drop in the charge holding portion FD1 is lower than the potential VP' corresponding to the voltage drop in the period from Time T02 to Time T03 or from Time T03 to Time T04. Furthermore, a potential VP3 corresponding to a voltage drop in the charge detection portion FD2 is lower than VP corresponding to the voltage drop in the period from Time T03 to Time T04. Therefore, VFR+VP−VP3, which is the potential of the charge detection portion FD2, is higher than the potential of the wiring 73 (VFR). This corresponds to the case where a difference between imaging data of the reference frame and imaging data of the second frame is finite (a positive value).

In a period from Time T34 to Time T35, the wiring 64 (SEL) is set at "H". At this time, an appropriate potential is applied to the wiring 65 (RBIAS), whereby the wiring 90 (OUT) is supplied with a voltage corresponding to imaging data in accordance with VFR+VP−VP3 (>VFR), which is the potential of the charge detection portion FD2.

At Time T341, the wiring 96 (RST) is set at "H". At this time, the counter circuit in the circuit 25 is reset, and DATA [2:0] to be output to the wiring 69 (DATA[2]), the wiring 68 (DATA[1]), and the wiring 67 (DATA[0]) becomes "000".

Then, before Time T342, the wiring 97 (COUNT), the wiring 93 (UPDN), and the wiring 94 (EN) are each set at "H" so that the counter circuit is made to operate as an up counter, and the wiring 92 (CEN) is set at "H" so that the comparator circuit 31 is made to operate.

At Time T342, the potential of the wiring 91 (RAMP) is set to the first reference potential, and then the potential of the wiring 91 (RAMP) is gradually increased. The wiring 95 (CLK) is supplied with the clock signal CLK1.

Before Time T342, the potential of the wiring 91 (RAMP) is lower than that of the wiring 90 (OUT), and thus the output signal COMP of the comparator circuit 31 is set at "H". The clock signal CLK2 and the clock signal CLK1 have the same waveform here, and the counter circuit performs counting.

Just after Time T34X, the potential of the wiring 91 (RAMP) becomes higher than that of the wiring 90 (OUT), and the output signal COMP of the comparator circuit 31 is set at "L". At this time, the wiring 94 (EN) and the clock signal CLK2 are each set at "L", and the counter circuit stops counting. After the counter circuit stops counting, it is effective to stop the operation of the comparator circuit 31 by setting the wiring 92 (CEN) at "L". With such a structure, power consumption can be reduced.

In a period from Time T343 to Time T344, the wiring 97 (COUNT) is set at "L". After that, the wiring 93 (UPDN) is set at "L" before Time T344, and then the wiring 97 (COUNT) is set at "H" so that the counter circuit is made to operate as a down counter. The wiring 92 (CEN) is set at "H" so that the comparator circuit 31 is made to operate.

Before Time T344, the potential of the wiring 91 (RAMP) is gradually decreased to the second reference potential or lower. The wiring 95 (CLK) is supplied with the clock signal CLK1. During this period, when the potential of the wiring 91 (RAMP) is lower than that of the wiring 90 (OUT), the output signal COMP of the comparator circuit 31 is set at "H".

Since the wiring 94 (EN) and the clock signal CLK2 are each set at "L" here, the counter circuit does not perform counting. Since the counter circuit does not perform counting, the structure of stopping the operation of the comparator circuit 31 by setting the wiring 92 (CEN) at "L" is effective.

When the potential of the wiring 91 (RAMP) reaches the minimum value, the supply of the clock signal CLK1 is preferably stopped at once. With such a structure, power consumption can be reduced. Here, at Time T34X, DATA [2:0] is "010".

In a period from Time T41 to Time T45, imaging data of a third frame is obtained and differential data between the imaging data of the third frame and imaging data of the reference frame is obtained. In the example shown here, a difference between the reference frame and the third frame is finite (a negative value). Note that the imaging data of the third frame can be obtained by excluding differential data from the imaging data of the reference frame.

In a period from Time T41 to Time T42, the wiring 62 (PR) is set at "H", the wiring 63 (FR) is set at "L", and the wiring 61 (TX) is set at "H". At this time, the potential of the charge holding portion FD1 is set to the potential VPR of the wiring 72 (VPR), and the potential of the charge detection portion FD2 is set to VFR+VP.

In a period from Time T42 to Time T43, the wiring 62 (PR) is set at "L", the wiring 63 (FR) is set at "L", and the wiring 61 (TX) is set at "H". At this time, the potential of the charge holding portion FD1 is decreased according to the intensity of light with which the photoelectric conversion element PD is irradiated. The potential of the charge detection portion FD2 is also decreased owing to capacitive coupling between the capacitor C1 and the capacitor C2.

In the above operation, the length of the period from Time T42 to Time T43 is equal to T, which is the length of the above period from Time T02 to Time T03 or from Time T03 to Time T04. The amount of light with which the photoelectric conversion element PD is irradiated in the period from Time T42 to Time T43 is larger than that in the period from Time T02 to Time T03 or from Time T03 to Time T04.

At this time, a potential VP4' corresponding to a voltage drop in the charge holding portion FD1 is higher than the potential VP' corresponding to the voltage drop in the period from Time T02 to Time T03 or from Time T03 to Time T04. Furthermore, a potential VP4 corresponding to a voltage drop in the charge detection portion FD2 is higher than VP corresponding to the voltage drop in the period from Time T03 to Time T04. Therefore, VFR+VP−VP4, which is the potential of the charge detection portion FD2, is lower than the potential of the wiring 73 (VFR). This corresponds to the case where a difference between imaging data of the reference frame and imaging data of the third frame is finite (a negative value).

In a period from Time T44 to Time T45, the wiring 64 (SEL) is set at "H". At this time, an appropriate potential is applied to the wiring 65 (RBIAS), whereby the wiring 90 (OUT) is supplied with a voltage corresponding to imaging data in accordance with VFR+VP−VP4 (<VFR), which is the potential of the charge detection portion FD2.

At Time T441, the wiring 96 (RST) is set at "H". At this time, the counter circuit in the circuit 25 is reset, and DATA [2:0] to be output to the wiring 69 (DATA[2]), the wiring 68 (DATA[1]), and the wiring 67 (DATA[0]) becomes "000".

Then, before Time T442, the wiring 97 (COUNT) and the wiring 93 (UPDN) are each set at "H" so that the counter circuit is made to operate as an up counter, and the wiring 92 (CEN) is set at "H" so that the comparator circuit 31 is made to operate.

At Time T442, the potential of the wiring 91 (RAMP) is set to the first reference potential, and then the potential of the wiring 91 (RAMP) is gradually increased. The wiring 95 (CLK) is supplied with the clock signal CLK1.

At Time T442, the potential of the wiring 91 (RAMP) is higher than that of the wiring 90 (OUT), and the output signal COMP of the comparator circuit 31 is set at "L". Since the wiring 94 (EN) and the clock signal CLK2 are each set at "L" here, the counter circuit does not perform counting. Since the counter circuit does not perform counting, the structure of stopping the operation of the comparator circuit 31 by setting the wiring 92 (CEN) at "L" is effective. With such a structure, power consumption can be reduced.

In a period from Time T443 to Time T444, the wiring 97 (COUNT) is set at "L". After that, the wiring 93 (UPDN) is set at "L" before Time T444, and then the wiring 97 (COUNT) and the wiring 94 (EN) are each set at "H" so that the counter circuit is made to operate as a down counter. The wiring 92 (CEN) is set at "H" so that the comparator circuit 31 is made to operate.

The potential of the wiring 91 (RAMP) is changed to be the second reference potential at Time T444. After that, the potential of the wiring 91 (RAMP) is gradually decreased and the wiring 95 (CLK) is supplied with the clock signal CLK1.

At Time T444, the potential of the wiring 91 (RAMP) is higher than that of the wiring 90 (OUT), and thus the output signal COMP of the comparator circuit 31 is set at "L". Therefore, the clock signal CLK2 and the clock signal CLK1 have the same waveform, and the counter circuit performs counting.

When the potential of the wiring 91 (RAMP) is further decreased after Time T444, the potential of the wiring 91 (RAMP) becomes lower than that of the wiring 90 (OUT) just after Time T44X and the output signal COMP of the comparator circuit 31 is set at "H".

Since the signal line EN and the clock signal CLK2 are each set at "L" here, the counter circuit does not perform counting. Since the counter circuit does not perform counting, the structure of stopping the operation of the comparator circuit 31 by setting the wiring 92 (CEN) at "L" is effective. When the potential of the wiring 91 (RAMP) reaches the minimum value, the supply of the clock signal CLK1 is preferably stopped at once. With such a structure, power consumption can be reduced. Here, at Time T44X, DATA [2:0] is "101".

The above circuit configuration and operation make it possible to reduce the power consumption of the A/D conversion processing in which imaging data and differential data are converted into digital data. Thus, an imaging device capable of data compression with low power consumption can be provided.

Figure 6A:
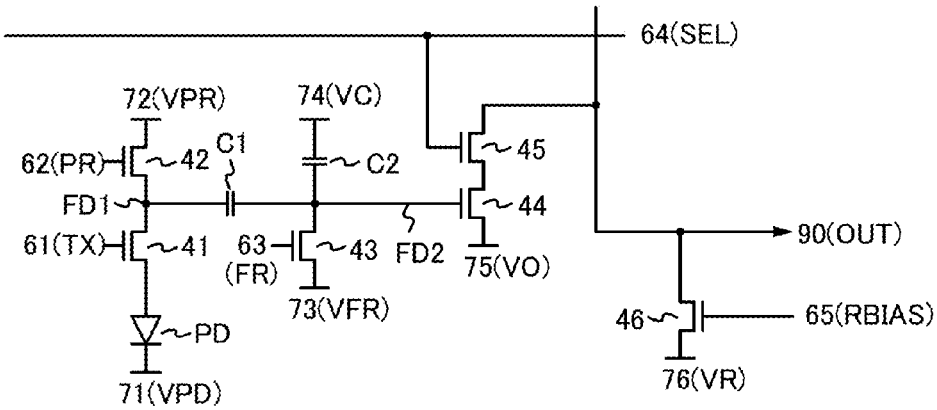
FIGS. 6A to 6C are each a circuit diagram illustrating a pixel and a reading circuit.
Figure 6B:
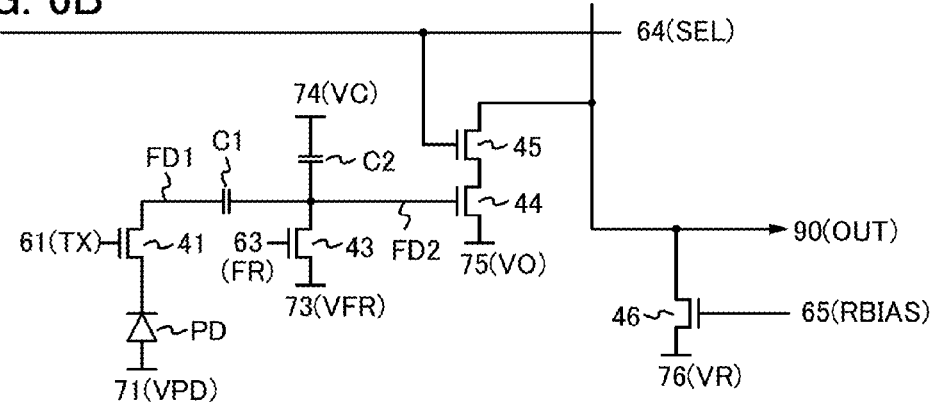
Figure 6C:
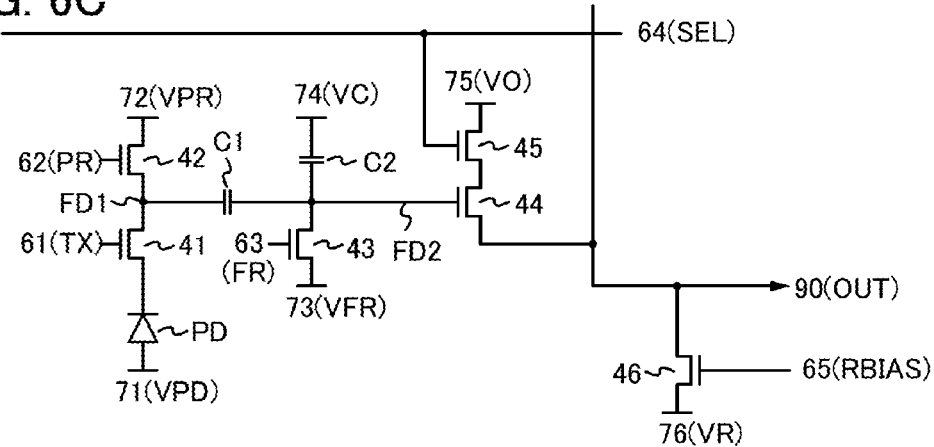

Note that the configuration of the circuit of the pixel 20 is not limited to that illustrated in FIG. 3, and may be any of the ones illustrated in FIGS. 6A to 6C. The connection direction of the photoelectric conversion element PD in FIG. 6A is opposite to that in FIG. 3. In this configuration, operation can be performed in such a manner that the wiring 71 (VPD) is set at a high potential and the wiring 72 (VPR) and the wiring 73 (VFR) are set at a low potential. In the configuration of FIG. 6B, the transistor 42 is not provided. In this configuration, the wiring 71 (VPD) is set at a high potential, whereby the charge holding portion FD1 can be reset. In the configuration of FIG. 6C, the other of the source electrode and the drain electrode of the transistor 44 is connected to the wiring 90 (OUT).

Figure 7A:
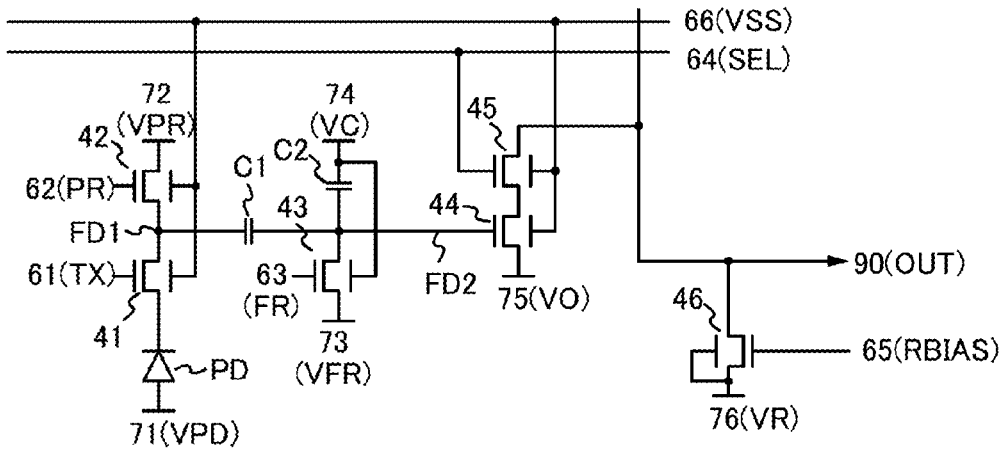
FIGS. 7A to 7C are each a circuit diagram illustrating a pixel and a reading circuit.
Figure 7B:
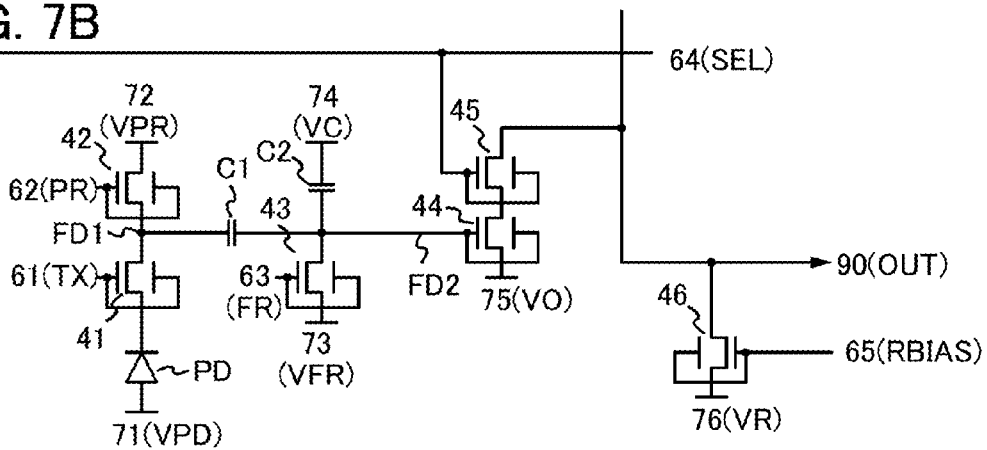
Figure 7C:
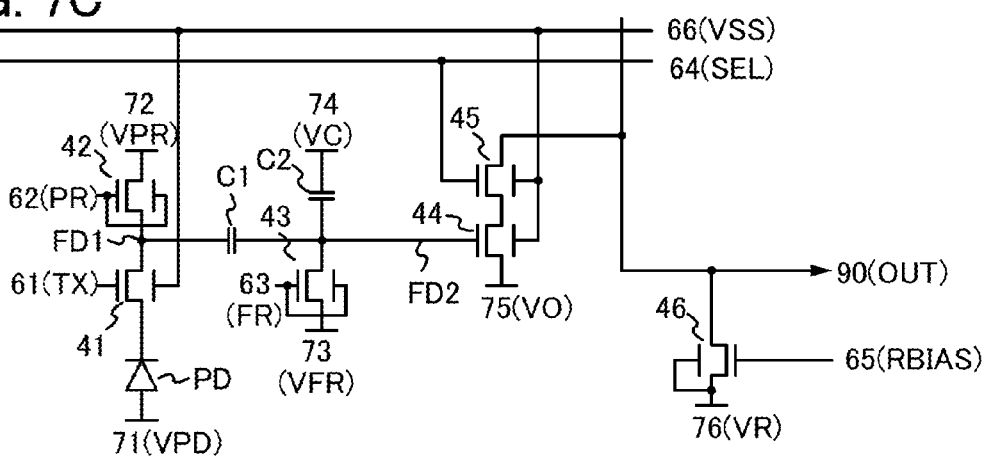

The transistors 41 to 46 in the pixel circuit may each have a back gate as illustrated in FIGS. 7A to 7C. FIG. 7A illustrates a configuration in which a constant potential is applied to the back gates, which enables control of the threshold voltages. The back gates are each connected to the wiring 66 (VSS), the wiring 74 (VC), or the source side of the transistor in the example of FIG. 7A, but they may be connected to one of them. FIG. 7B illustrates a configuration in which the same potential is applied to the front gate and the back gate, which enables an increase in on-state current. The configuration of FIG. 7C is obtained by combining the configurations of FIGS. 7A and 7B such that desired transistors can have appropriate electrical characteristics. The configuration of FIG. 7C is just an example. Note that any of the configurations of FIG. 3 and FIGS. 6A to 6C can be combined with any of the configurations of FIGS. 7A to 7C as necessary.

Figure 8:
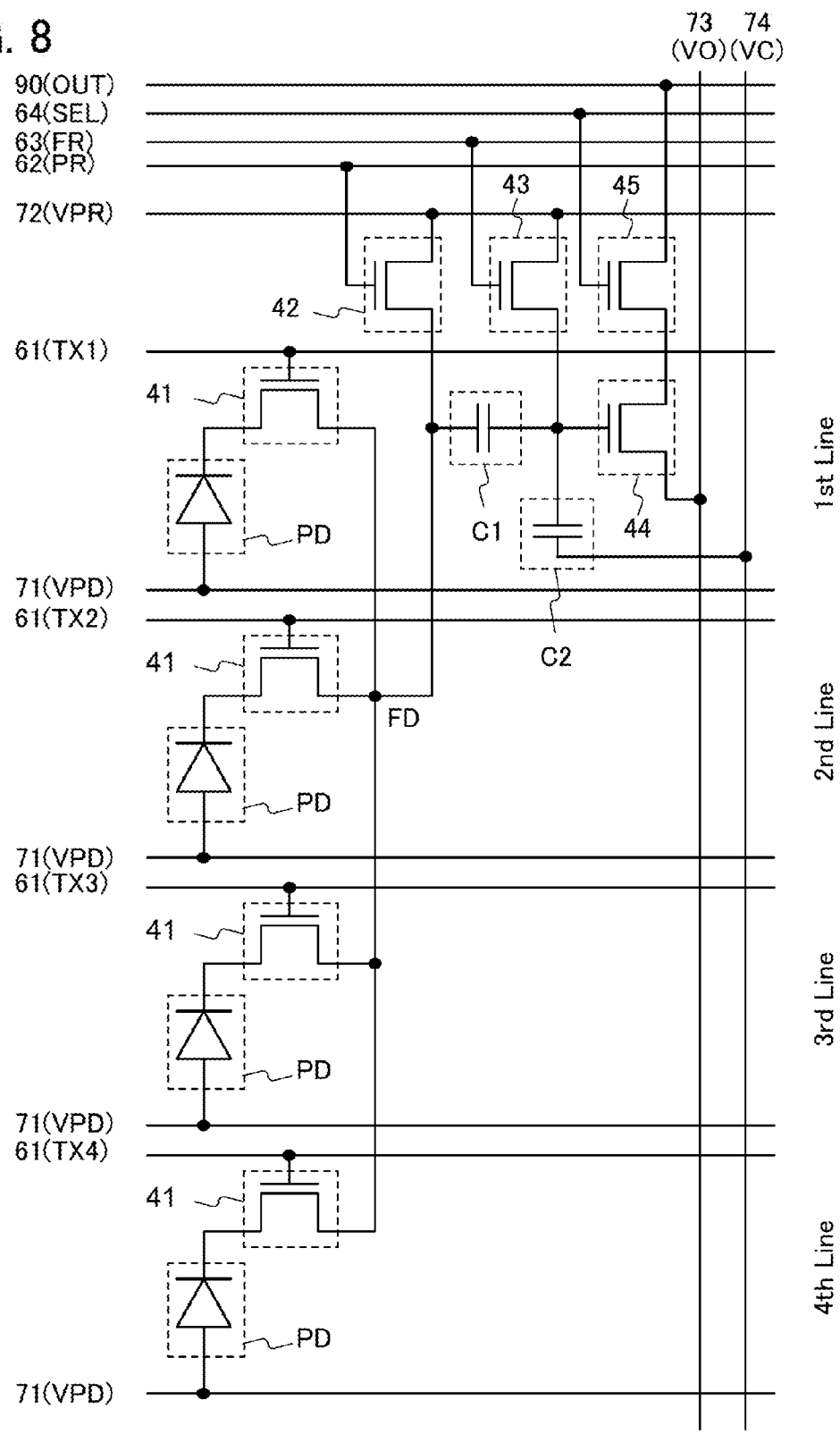
FIG. 8 is a circuit diagram illustrating pixels.

Note that the circuit of the pixel 20 may have a configuration in which the transistors 42 to 45 are shared among a plurality of pixels as illustrated in FIG. 8. FIG. 8 illustrates a configuration in which the transistors 42 to 45 are shared among a plurality of pixels in the perpendicular direction; however, the transistors 42 to 45 may be shared among a plurality of pixels in the horizontal direction or in the horizontal and perpendicular direction. With such a configuration, the number of transistors included in one pixel can be reduced. The other of the source electrode and the drain electrode of the transistor 43 is connected to the wiring 72 (VPR) in the example of FIG. 8, but may be connected to a wiring 73 (VFR), which is newly provided. Furthermore, the other electrode of the capacitor C1 is connected to the wiring 74 (VC) in the example of FIG. 8, but may be connected to the wiring 71 (VPD).

Although FIG. 8 illustrates a configuration in which the transistors 42 to 45 are shared among four pixels, the transistors 42 to 45 may be shared among two pixels, three pixels, or five or more pixels. Note that this configuration can be optionally combined with any of the configurations in FIGS. 6A to 6C and FIGS. 7A to 7C.

Figure 9A:
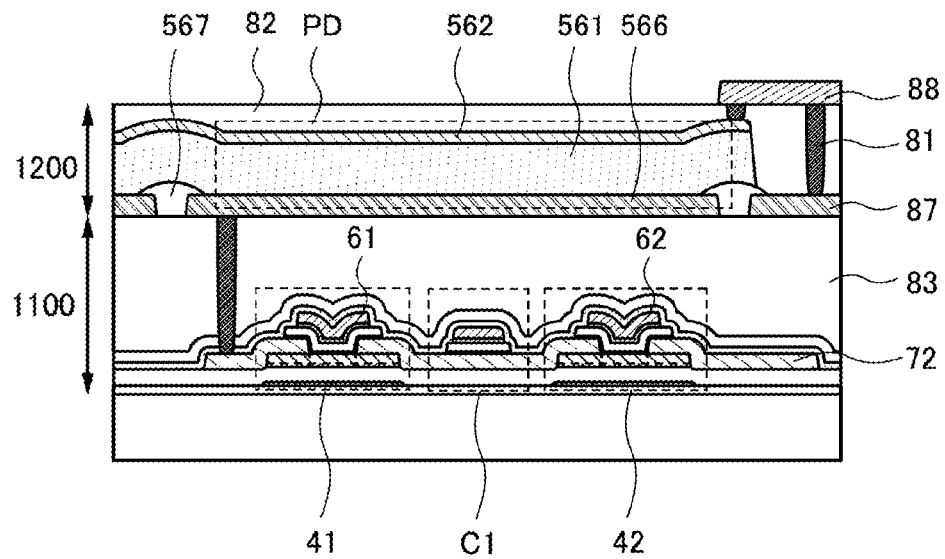
FIGS. 9A to 9C are cross-sectional views each illustrating the structure of an imaging device.

Next, specific structure examples of an imaging device of one embodiment of the present invention are described below with reference to drawings. FIG. 9A illustrates an example of specific connection between the photoelectric conversion element PD, the transistors 41 and 42, and the capacitor C1 which are included in the pixel 20 in FIG. 3. Note that the transistors 43 to 45 are not illustrated in FIG. 9A. The pixel 20 includes a layer 1100 including the transistors 41 to 45 and the capacitor C1 and a layer 1200 including the photoelectric conversion element PD.

Although the wirings, the electrodes, and conductors 81 are illustrated as independent components in cross-sectional views in this embodiment, some of them are provided as one component in some cases when they are electrically connected to each other. In addition, a structure in which a gate electrode, a source electrode, or a drain electrode of the transistor is connected to the wirings through the conductor 81 is only an example, and the gate electrode, the source electrode, and the drain electrode of the transistor might each function as a wiring.

In addition, insulating layers 82 and 83 and the like that function as protective films, interlayer insulating films, or planarization films are provided over the components. For example, an inorganic insulating film such as a silicon oxide film or a silicon oxynitride film can be used as each of the insulating layers 82 and 83 and the like. Alternatively, an organic insulating film such as an acrylic resin film or a polyimide resin film may be used. Top surfaces of the insulating layers 82 and 83 and the like are preferably planarized by chemical mechanical polishing (CMP) or the like as necessary.

In some cases, one or more of the wirings and the like illustrated in the drawing are not provided or a wiring, a transistor, or the like that is not illustrated in the drawing is included in each layer. In addition, a layer that is not illustrated in the drawing might be included. Furthermore, one or more of the layers illustrated in the drawing are not included in some cases.

It is particularly preferable to use transistors including an oxide semiconductor (hereinafter referred to as OS transistors) as the transistors 41 to 45.

Extremely low off-state current of the OS transistor can widen the dynamic range of imaging. In the circuit configuration of the pixel 20 illustrated in FIG. 3, an increase in the intensity of light entering the photoelectric conversion element PD reduces the potential of the charge holding portion FD1. Since the OS transistor has extremely low off-state current, a current based on a gate potential can be accurately output even when the gate potential is extremely low. Thus, it is possible to widen the detection range of illuminance, i.e., the dynamic range.

A period during which charge can be held in the charge holding portion FD1 and the charge detection portion FD2 can be extremely long owing to the low off-state current of the transistors 41 to 43. Therefore, a global shutter system in which accumulation operation is performed in all the pixels at the same time can be used without a complicated circuit structure and operation method.

Figure 10A:
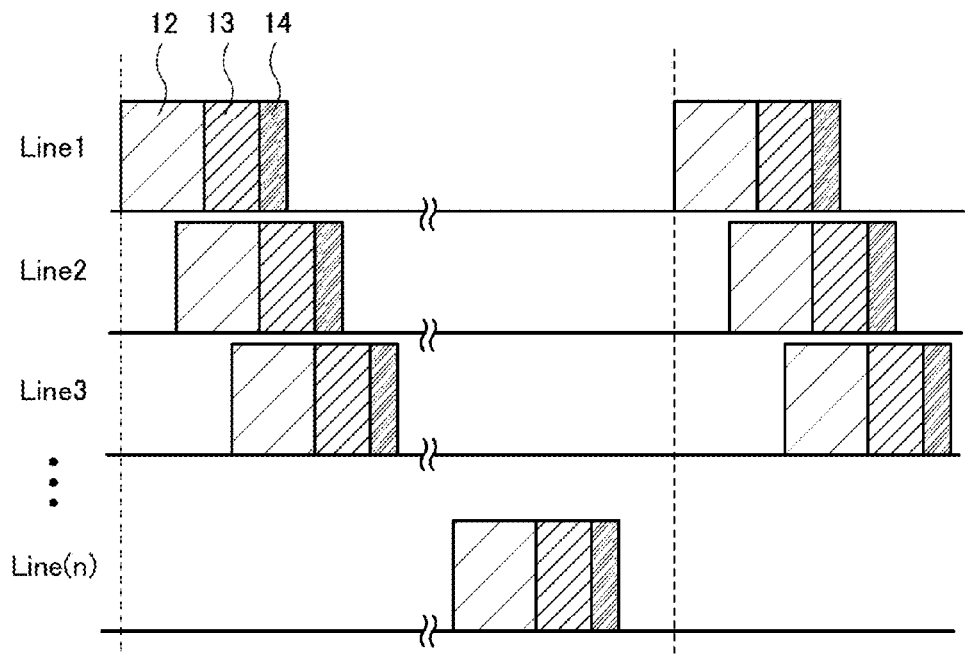
FIGS. 10A and 10B show operations of a rolling shutter system and a global shutter system, respectively.

In general, in an imaging device where pixels are arranged in a matrix, a rolling shutter system is employed in which imaging operation 12, retention operation 13, and read operation 14 are performed row by row as illustrated in FIG. 10A. In the case of employing the rolling shutter system, simultaneousness of imaging is lost. Therefore, when an object moves, an image is distorted.

Figure 10B:
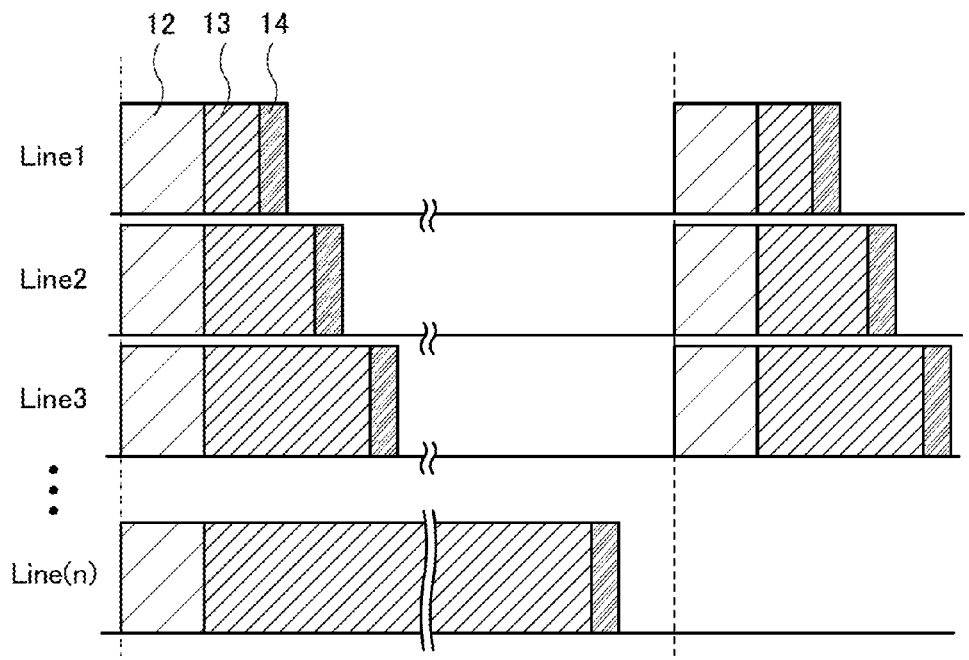

As a result, in one embodiment of the present invention, it is preferable to employ a global shutter system in which the imaging operation 12 and the retention operation 13 can be performed simultaneously in all the rows and the read operation 14 can be sequentially performed row by row as illustrated in FIG. 10B. By employing the global shutter system, simultaneousness of imaging in all the pixels in the imaging device can be secured, and an image with little distortion can be easily obtained even when an object moves.

In addition, the OS transistor has lower temperature dependence of change in electrical characteristics than a transistor including silicon in an active region or an active layer (hereinafter referred to as a Si transistor), and thus can be used in an extremely wide range of temperatures. Therefore, an imaging device and a semiconductor device that include OS transistors are suitable for use in automobiles, aircrafts, and spacecrafts.

Moreover, the OS transistor has higher drain breakdown voltage than the Si transistor. In a photoelectric conversion element including a selenium-based material in a photoelectric conversion layer, a relatively high voltage (e.g., 10 V or more) is preferably applied to easily cause an avalanche phenomenon. Therefore, by combination of the OS transistor and the photoelectric conversion element including a selenium-based material in the photoelectric conversion layer, a highly reliable imaging device can be obtained.

Figure 9B:
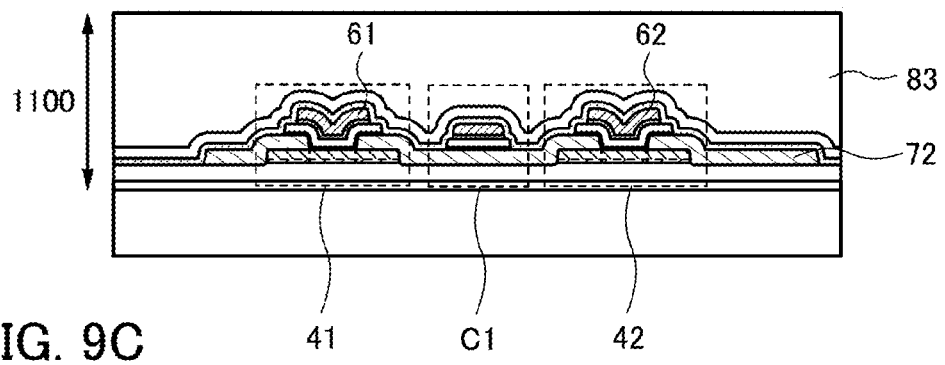
Figure 9C:
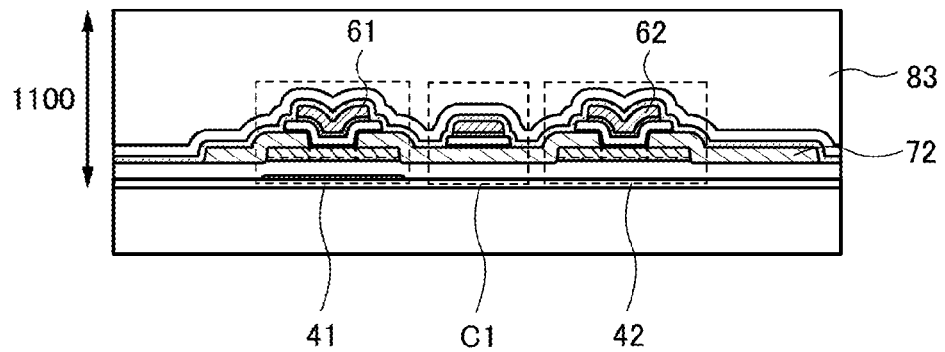

Note that although each transistor includes a back gate in FIG. 9A, each transistor does not necessarily include a back gate as illustrated in FIG. 9B. Alternatively, as illustrated in FIG. 9C, one or more transistors, for example, only the transistor 41 may include a back gate. The back gate might be electrically connected to a front gate of the transistor, which is provided to face the back gate. Alternatively, different fixed potentials might be supplied to the back gate and the front gate. Note that the presence or absence of the back gate can also be applied to another pixel described in this embodiment.

A variety of elements can be used as the photoelectric conversion element PD provided in the layer 1200. FIG. 9A illustrates the photoelectric conversion element PD including a selenium-based material for a photoelectric conversion layer 561. The photoelectric conversion element PD including a selenium-based material has high external quantum efficiency with respect to visible light. Furthermore, the selenium-based material has a high light-absorption coefficient, making the photoelectric conversion layer 561 thin easily. The photoelectric conversion element PD including a selenium-based material can be a highly sensitive sensor in which the amount of amplification of electrons with respect to the amount of incident light is large because of an avalanche phenomenon. In other words, the use of a selenium-based material for the photoelectric conversion layer 561 allows a sufficient amount of photocurrent to be obtained even when the pixel area is reduced. Moreover, the photoelectric conversion element PD including a selenium-based material is also suitable for image-capturing in a low-illuminance environment.

Amorphous selenium or crystalline selenium can be used as the selenium-based material. Crystalline selenium can be obtained by, for example, depositing amorphous selenium and then performing heat treatment. When the crystal grain size of crystalline selenium is smaller than a pixel pitch, variation in characteristics between pixels can be reduced. Moreover, crystalline selenium has higher spectral sensitivity to and a higher absorption coefficient for visible light than amorphous selenium.

Although the photoelectric conversion layer 561 is illustrated as a single layer, gallium oxide, cerium oxide, or the like as a hole-blocking layer may be provided on the light reception side of the selenium-based material, and nickel oxide, antimony sulfide, or the like as an electron-blocking layer may be provided on the electrode 566 side.

Furthermore, the photoelectric conversion layer 561 may be a layer including a compound of copper, indium, and selenium (CIS). Alternatively, a layer including a compound of copper, indium, gallium, and selenium (CIGS) may be used. A photoelectric conversion element including the CIS layer or the CIGS layer can also utilize an avalanche phenomenon like the photoelectric conversion element including selenium alone.

In the photoelectric conversion element PD using the selenium-based material, for example, the photoelectric conversion layer 561 can be provided between a light-transmitting conductive layer 562 and the electrode 566 formed using a metal material or the like. Furthermore, CIS and CIGS are p-type semiconductors, and an n-type semiconductor such as cadmium sulfide or zinc sulfide may be provided in contact with the p-type semiconductor in order to form a junction.

It is preferable to apply a relatively high voltage (e.g., 10 V or higher) to the photoelectric conversion element in order to cause the avalanche phenomenon. Since the OS transistor has higher drain breakdown voltage than the Si transistor, the application of a relatively high voltage to the photoelectric conversion element is easy. Thus, by combination of the OS transistor having high drain breakdown voltage and the photoelectric conversion element including the selenium-based material in the photoelectric conversion layer, a highly sensitive and highly reliable imaging device can be obtained.

Figure 11A:
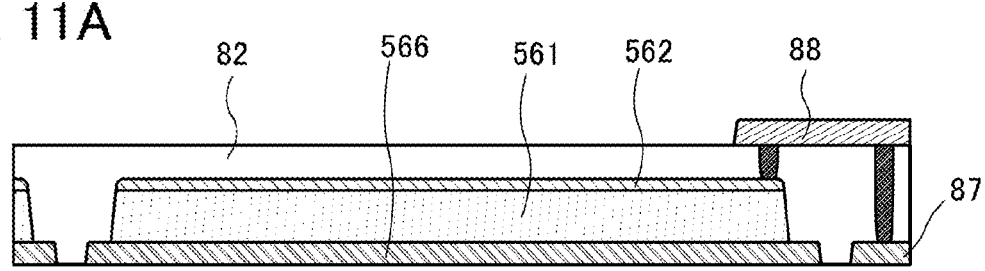
FIGS. 11A to 11D are cross-sectional views each illustrating connection of a photoelectric conversion element.
Figure 11B:
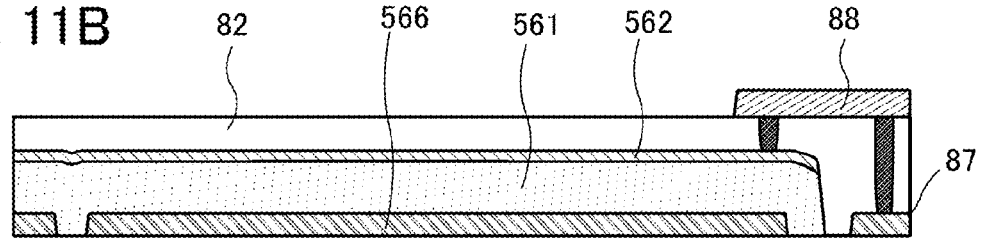
Figure 11C:
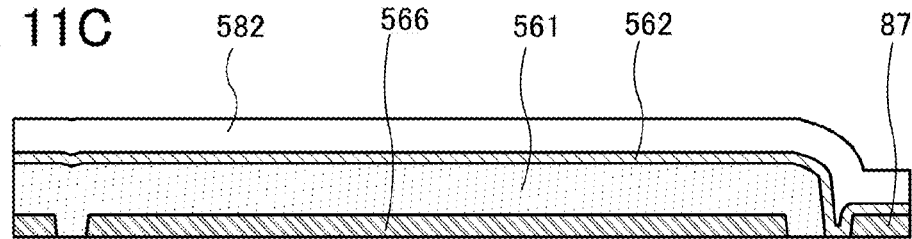
Figure 11D:
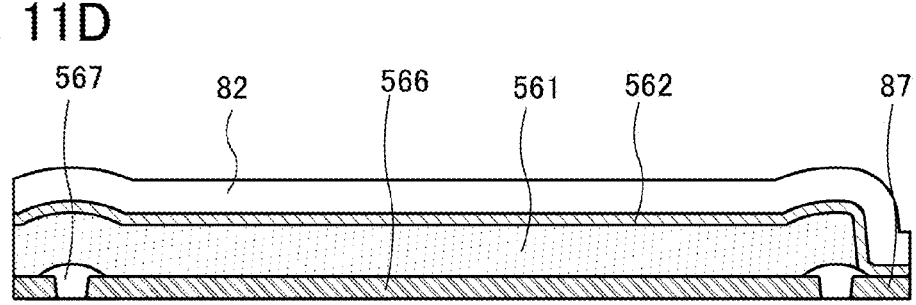

Although the photoelectric conversion layer 561 and the light-transmitting conductive layer 562 are not divided between pixel circuits in FIG. 9A, they may be divided between circuits as illustrated in FIG. 11A. In a region between pixels where the electrode 566 is not provided, a partition wall 567 formed of an insulator is preferably provided, thereby preventing generation of a crack in the photoelectric conversion layer 561 and the light-transmitting conductive layer 562. However, the partition wall 567 is not necessarily provided as illustrated in FIG. 11B. Although the light-transmitting conductive layer 562 and a wiring 87 are connected to each other through a wiring 88 and the conductor 81 in FIG. 9A, the light-transmitting conductive layer 562 and the wiring 87 may be in direct contact with each other as in FIGS. 11C and 11D.

Figure 12A:
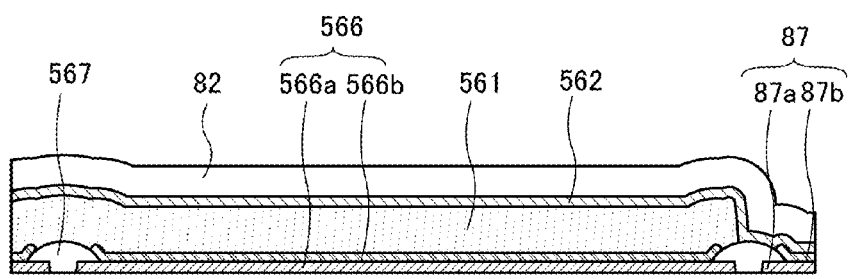
FIGS. 12A and 12B are cross-sectional views each illustrating connection of a photoelectric conversion element.

The electrode 566, the wiring 87, and the like may each be a multilayer. For example, as illustrated in FIG. 12A, the electrode 566 can include two conductive layers 566*a* and 566*b* and the wiring 87 can include two conductive layers 87*a* and 87*b*. In the structure in FIG. 12A, for example, the conductive layers 566*a* and 87*a* may be made of a low-resistance metal or the like, and the conductive layers 566*b* and 87*b* may be made of a metal or the like that exhibits an excellent contact property with the photoelectric conversion layer 561. Such a structure improves the electrical properties of the photoelectric conversion element PD. Furthermore, even when the conductive layer 87*a* contains a metal that causes electrolytic corrosion, which occurs when some kinds of metal are in contact with the light-transmitting conductive layer 562, the electrolytic corrosion can be prevented because the conductive layer 87*b* is between the conductive layer 87*a* and the light-transmitting conductive layer 562.

The conductive layers 566*b* and 87*b* can be formed using, for example, molybdenum, tungsten, or the like. The conductive layers 566*a* and 87*a* can be formed using, for example, aluminum, titanium, or a stack of titanium, aluminum, and titanium that are layered in that order.

Figure 12B:
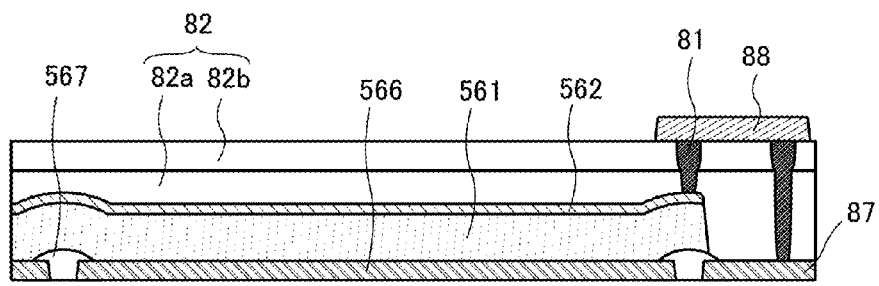

The insulating layer 82 and the like may each be a multilayer. For example, as illustrated in FIG. 12B, the conductor 81 has a difference in level in the case where the insulating layer 82 includes insulating layers 82*a* and 82*b* that have different etching rates. In the case where another insulating layer used as an interlayer insulating film or a planarization film is a multilayer, the conductor 81 also has a difference in level. Although the insulating layer 82 is formed using two layers here, the insulating layer 82 and another insulating layer may each be formed using three or more layers.

Note that the partition wall 567 can be formed using an inorganic insulator, an insulating organic resin, or the like. The partition wall 567 may be colored black or the like in order to shield the transistors and the like from light and/or to determine the area of a light-receiving portion in each pixel.

Alternatively, a PIN diode element formed using an amorphous silicon film, a microcrystalline silicon film, or the like may be used as the photoelectric conversion element PD.

Figure 13:
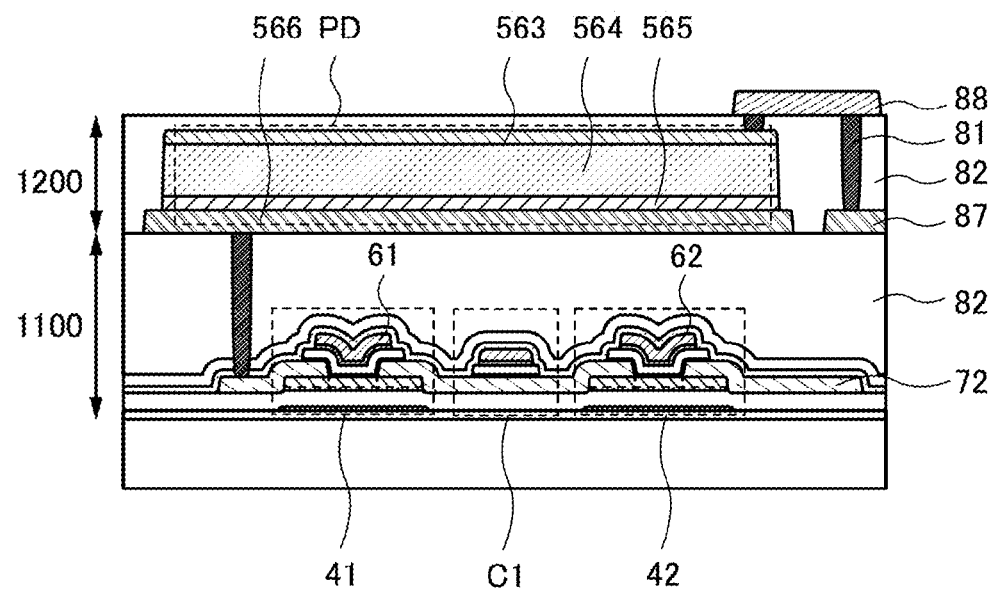
FIG. 13 is a cross-sectional view illustrating an imaging device.

FIG. 13 illustrates an example in which a thin film PIN photodiode is used as the photoelectric conversion element PD. In the photodiode, an n-type semiconductor layer 565, an i-type semiconductor layer 564, and a p-type semiconductor layer 563 are stacked in that order. The i-type semiconductor layer 564 is preferably formed using amorphous silicon. The p-type semiconductor layer 563 and the n-type semiconductor layer 565 can each be formed using amorphous silicon, microcrystalline silicon, or the like that includes a dopant imparting the corresponding conductivity type. A photodiode in which a photoelectric conversion layer is formed using amorphous silicon has high sensitivity in a visible light wavelength region, and therefore can easily sense weak visible light.

In the photoelectric conversion element PD in FIG. 13, the n-type semiconductor layer 565 functioning as a cathode is electrically connected to the electrode 566 that is electrically connected to the transistor 41. Furthermore, the p-type semiconductor layer 563 functioning as an anode is electrically connected to the wiring 87 through the conductor 81.

Note that as illustrated in FIG. 6A, the photoelectric conversion element PD may be connected in a manner opposite to that illustrated in FIG. 3. Therefore, in FIG. 13, the anode and the cathode of the photoelectric conversion element PD are connected to the electrode layer and the wiring in a manner opposite to that in FIG. 3 in some cases.

In any case, the photoelectric conversion element PD is preferably formed so that the p-type semiconductor layer 563 serves as a light-receiving surface. When the p-type semiconductor layer 563 serves as a light-receiving surface, the output current of the photoelectric conversion element PD can be increased.

FIGS. 14A to 14F show other examples of the structure of the photoelectric conversion element PD having a configuration of a PIN thin film photodiode and the connection between the photoelectric conversion element PD and the wirings. Note that the structure of the photoelectric conversion element PD and the connection between the photoelectric conversion element PD and the wirings are not limited thereto, and other configurations may be applied.

Figure 14A:
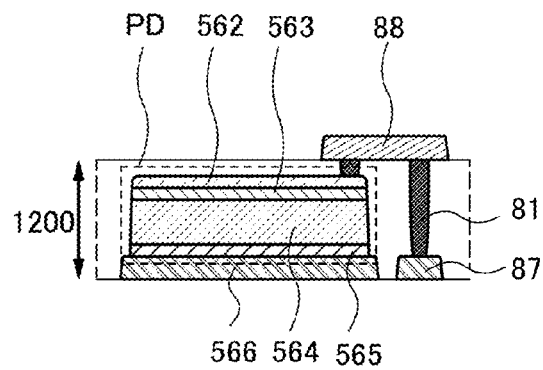
FIGS. 14A to 14F are cross-sectional views each illustrating connection of a photoelectric conversion element.

FIG. 14A illustrates a structure of the photoelectric conversion element PD that includes the light-transmitting conductive layer 562 in contact with the p-type semiconductor layer 563. The light-transmitting conductive layer 562 serves as an electrode and can increase the output current of the photoelectric conversion element PD.

For the light-transmitting conductive layer 562, the following can be used: indium tin oxide; indium tin oxide containing silicon; indium oxide containing zinc; zinc oxide; zinc oxide containing gallium; zinc oxide containing aluminum; tin oxide; tin oxide containing fluorine; tin oxide containing antimony; graphene; or the like. The light-transmitting conductive layer 562 is not limited to a single layer, and may be a stacked layer of different films.

Figure 14B:
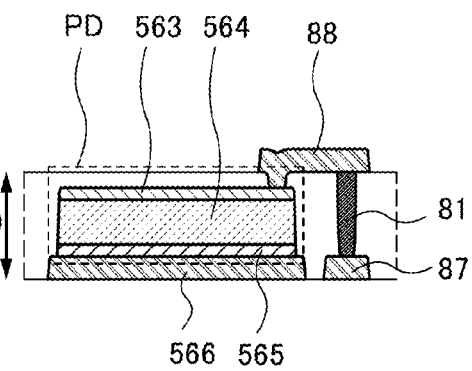

FIG. 14B illustrates a structure of the photoelectric conversion element PD in which the p-type semiconductor layer 563 is electrically connected directly to the wiring 88.

Figure 14C:
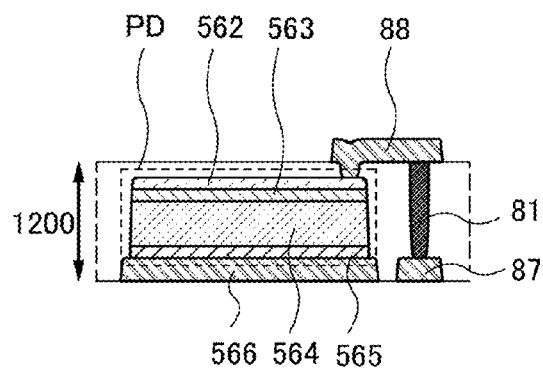

FIG. 14C illustrates a structure of the photoelectric conversion element PD which includes the light-transmitting conductive layer 562 in contact with the p-type semiconductor layer 563 and in which the wiring 87 is electrically connected to the light-transmitting conductive layer 562.

Figure 14D:
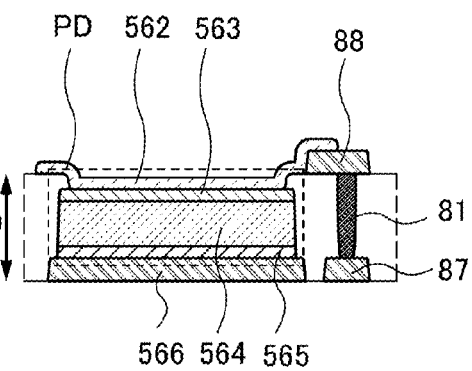

FIG. 14D illustrates a structure in which an opening exposing the p-type semiconductor layer 563 is provided in an insulating layer covering the photoelectric conversion element PD, and the light-transmitting conductive layer 562 that covers the opening is electrically connected to the wiring 88.

Figure 14E:
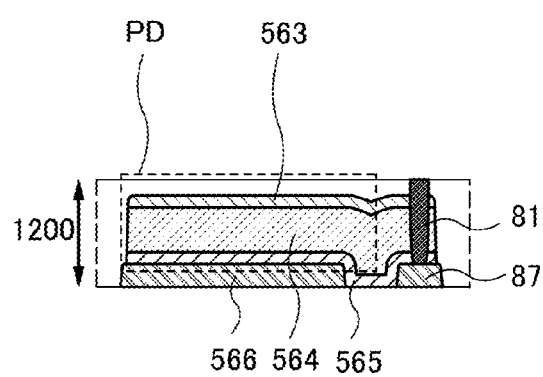

FIG. 14E illustrates a structure including the conductor 81 which penetrates the photoelectric conversion element PD. In the structure, the wiring 87 is electrically connected to the p-type semiconductor layer 563 through the conductor 81. Note that in the drawing, the wiring 87 appears to be electrically connected to the electrode 566 through the n-type semiconductor layer 565. However, because of a high resistance in the lateral direction of the n-type semiconductor layer 565, the resistance between the wiring 87 and the electrode 566 is extremely high when there is an appropriate distance therebetween. Thus, the photoelectric conversion element PD can have diode characteristics without a short circuit between the anode and the cathode. Note that two or more conductors 81 that are electrically connected to the p-type semiconductor layer 563 may be provided.

Figure 14F:
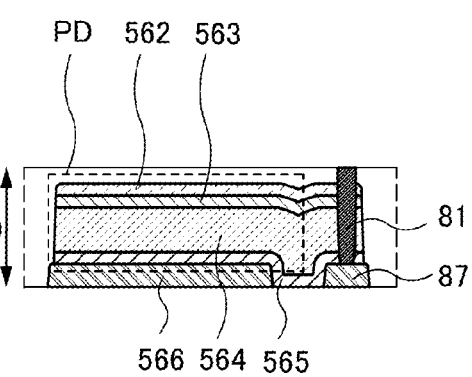

FIG. 14F illustrates a structure in which the photoelectric conversion element PD in FIG. 14E is provided with the light-transmitting conductive layer 562 in contact with the p-type semiconductor layer 563.

Note that each of the photoelectric conversion elements PD illustrated in FIGS. 14D to 14F has an advantage of having a large light-receiving area because wirings and the like do not overlap with a light-receiving region.

Figure 15:
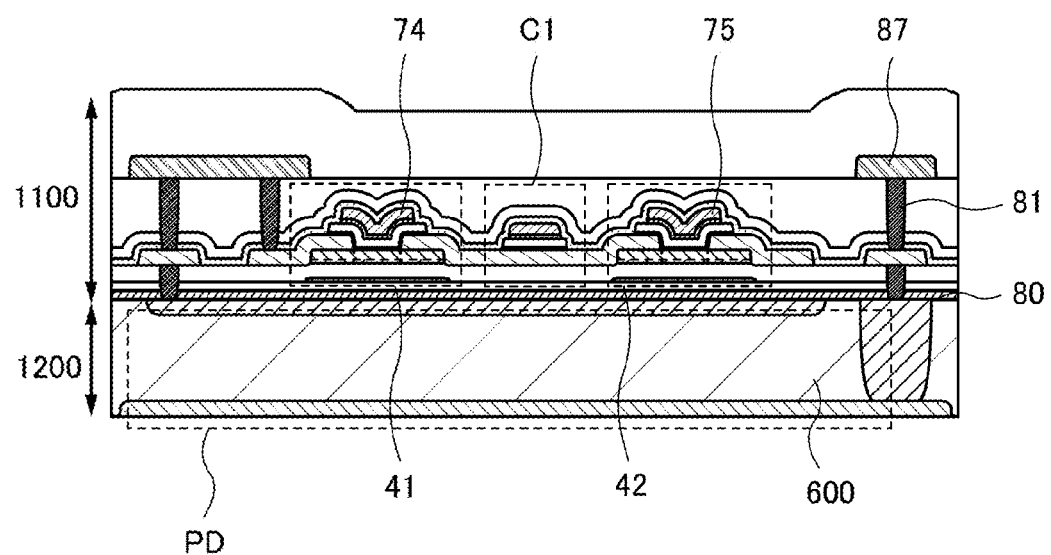
FIG. 15 is a cross-sectional view illustrating an imaging device.

Alternatively, as illustrated in FIG. 15, the photoelectric conversion element PD may be a photodiode including a silicon substrate 600 as a photoelectric conversion layer.

The photoelectric conversion element PD including the aforementioned selenium-based material, amorphous silicon, or the like can be formed through general semiconductor manufacturing processes such as a deposition process, a lithography process, and an etching process. In addition, because the resistance of the selenium-based material is high, the photoelectric conversion layer 561 does not need to be divided between circuits as illustrated in FIG. 9A. Therefore, the imaging device of one embodiment of the present invention can be manufactured with a high yield at low cost. In contrast, a photodiode including the silicon substrate 600 as the photoelectric conversion layer requires difficult processes such as a polishing process and a bonding process.

Figure 16A:
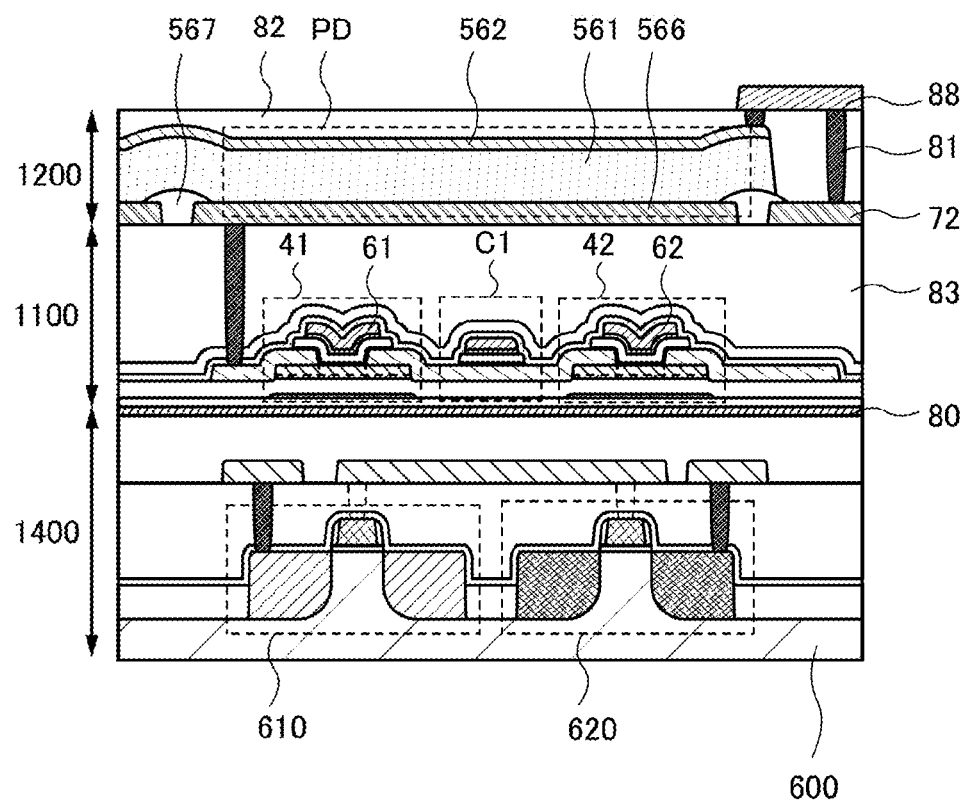
FIGS. 16A and 16B are cross-sectional views illustrating an imaging device.
Figure 16B:
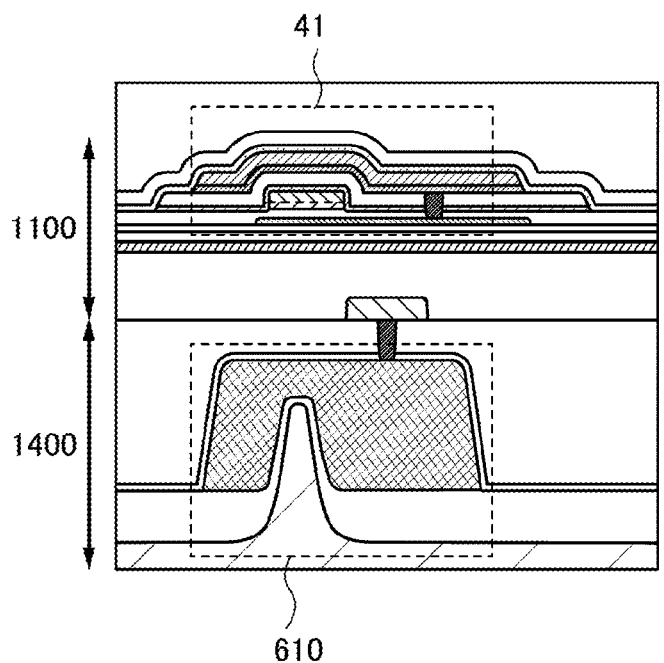

Furthermore, in the imaging device of one embodiment of the present invention, a stack including the silicon substrate 600 in which a circuit is formed may be used. For example, as illustrated in FIG. 16A, the pixel circuit may overlap with a layer 1400 that includes transistors 610 and 620 whose active regions are formed in the silicon substrate 600. FIG. 16B is a cross-sectional view illustrating the transistors in the channel width direction.

Figure 17A:
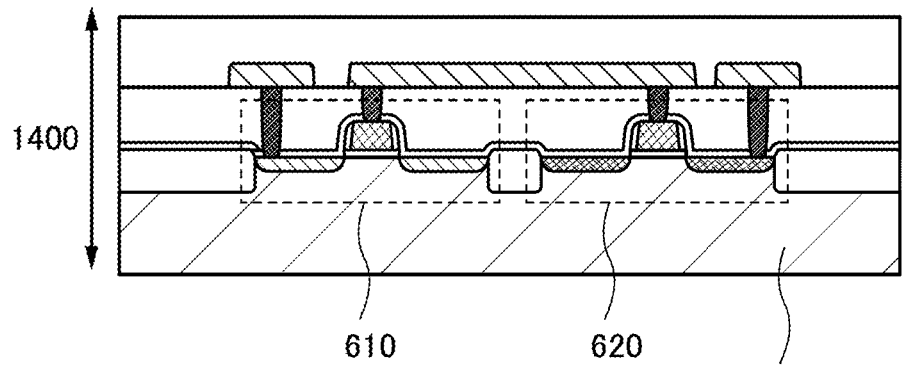
FIGS. 17A to 17C are cross-sectional views and a circuit diagram illustrating imaging devices.
Figure 17B:
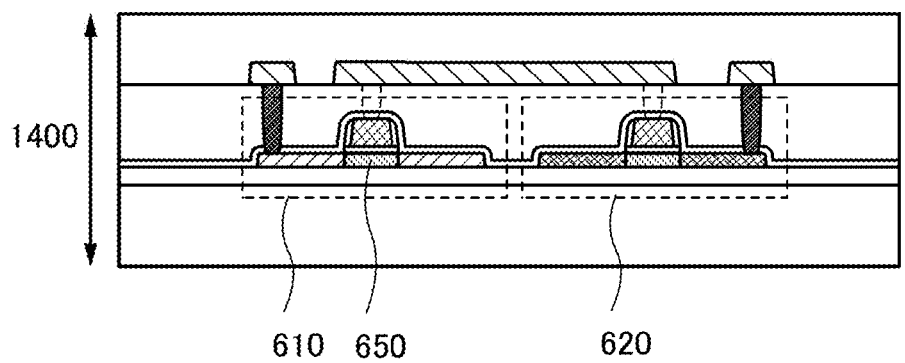

Although FIGS. 16A and 16B show the Si transistors of a fin type, the transistors may be of a planar type as illustrated in FIG. 17A. Alternatively, as illustrated in FIG. 17B, they may be transistors each including an active layer 650 formed using a silicon thin film. The active layer 650 can be formed using polycrystalline silicon or single crystal silicon of a silicon-on-insulator (SOI) structure.

Figure 17C:
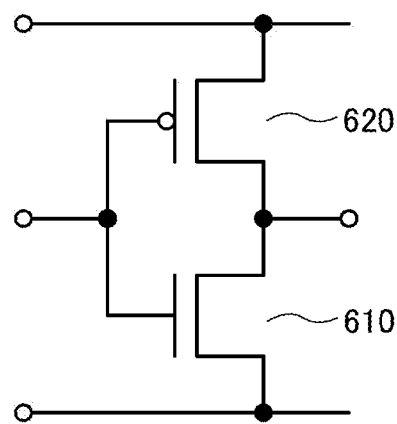

The circuit formed on the silicon substrate 600 is capable of reading a signal output from the pixel circuit and converting the signal; for example, the circuit may include a CMOS inverter as illustrated in the circuit diagram in FIG. 17C. A gate of the transistor 610 (n-channel transistor) is electrically connected to a gate of the transistor 620 (p-channel transistor). One of a source and a drain of one of the transistors 610 and 620 is electrically connected to one of a source and a drain of the other transistor. The other of the source and the drain of the one transistor is electrically connected to a wiring and the other of the source and the drain of the other transistor is electrically connected to another wiring.

Note that the circuit formed on the silicon substrate 600 corresponds to each of the circuits 23, 24, and 25 illustrated in FIG. 1, for example.

The silicon substrate 600 is not limited to a bulk silicon substrate and can be a substrate made of germanium, silicon germanium, silicon carbide, gallium arsenide, aluminum gallium arsenide, indium phosphide, gallium nitride, or an organic semiconductor.

Here, as illustrated in FIG. 15 and FIG. 16A, an insulating layer 80 is provided between a region including an oxide semiconductor transistor and a region including a Si device (a Si transistor or a Si photodiode).

Dangling bonds of silicon are terminated with hydrogen in insulating layers provided in the vicinities of the active regions of the transistors 610 and 620. Therefore, hydrogen has an effect of improving the reliability of the transistors 610 and 620. Meanwhile, hydrogen in insulating layers provided in the vicinity of the oxide semiconductor layer that is the active layer of the transistor 41 or the like causes generation of carriers in the oxide semiconductor layer, and therefore may reduce the reliability of the transistor 41 or the like. Thus, the insulating layer 80 having a function of preventing diffusion of hydrogen is preferably provided between one layer including the transistor using a silicon-based semiconductor material and another layer stacked thereon that includes the transistor using an oxide semiconductor. Hydrogen is confined in the one layer by the insulating layer 80, so that the reliability of the transistors 610 and 620 can be improved. Furthermore, diffusion of hydrogen from the one layer to the other layer is inhibited, so that the reliability of the transistor 41 or the like can also be improved.

The insulating layer 80 can be formed using, for example, aluminum oxide, aluminum oxynitride, gallium oxide, gallium oxynitride, yttrium oxide, yttrium oxynitride, hafnium oxide, hafnium oxynitride, or yttria-stabilized zirconia (YSZ).

Note that as illustrated in FIG. 16A, a circuit (e.g., a driver circuit) formed on the silicon substrate 600, the transistor 41 or the like, and the photoelectric conversion element PD can overlap with each other; thus, the integration degree of pixels can be increased. In other words, the resolution of the imaging device can be increased. Such a structure is suitable for an imaging device with, for example, 4K2K, 8K4K, or 16K8K pixels. Note that a structure may be employed in which a Si transistor is formed as the transistor 44 or the like included in the pixel 20 so as to overlap with the transistor 41, the transistor 42, the photoelectric conversion element PD, and the like.

Figure 18:
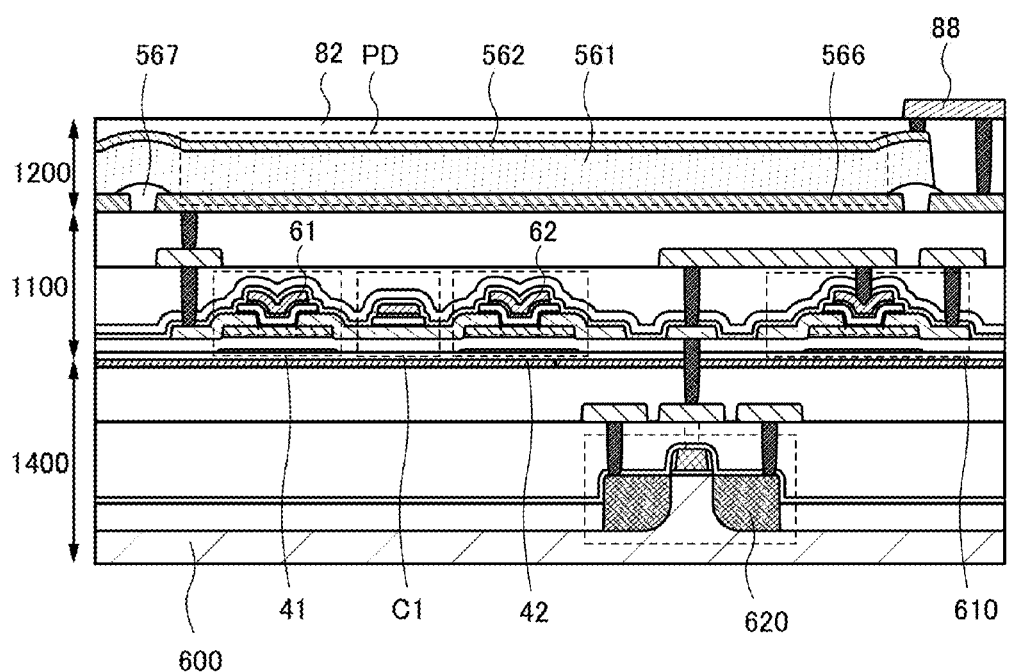
FIG. 18 is a cross-sectional view illustrating an imaging device.

An imaging device of one embodiment of the present invention can also have a structure in FIG. 18.

The imaging device in FIG. 18 is a modification example of the imaging device in FIG. 16A. A CMOS inverter is formed using an OS transistor and a Si transistor.

Here, the transistor 620 is a p-channel Si transistor provided in the layer 1400, and the transistor 610 is an n-channel OS transistor provided in the layer 1100. When only the p-channel transistor is provided on the silicon substrate 600, a step of forming a well, an n-type impurity layer, or the like can be skipped.

Although selenium is used for the photoelectric conversion element PD in the imaging device in FIG. 18, a PIN thin film photodiode may be used as in FIG. 13.

In the imaging device in FIG. 18, the transistor 610 can be formed through the same process as the transistors 41 and 42 formed in the layer 1100. Thus, the manufacturing process of the imaging device can be simplified.

Figure 19:
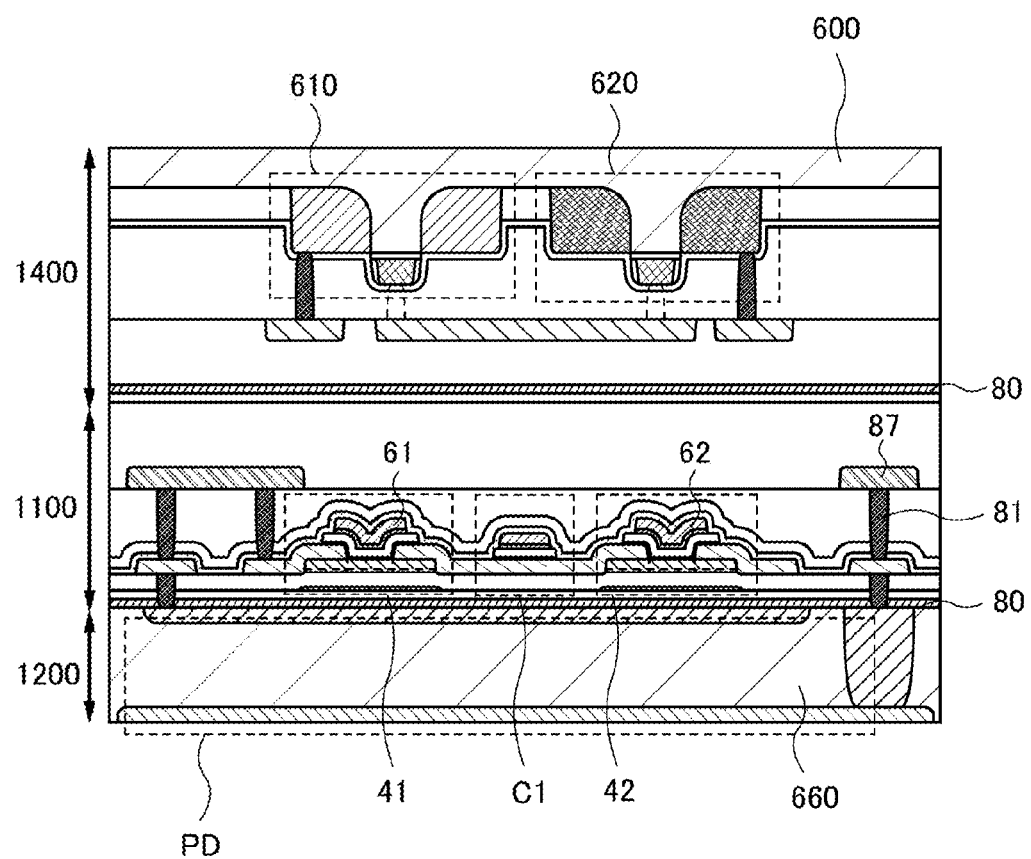
FIG. 19 is a cross-sectional view illustrating an imaging device.

As illustrated in FIG. 19, an imaging device of one embodiment of the present invention may have a structure where a pixel includes the photoelectric conversion element PD formed on a silicon substrate 660 and OS transistors formed over the photoelectric conversion element PD and the pixel and the silicon substrate 600 on which the circuit is formed are attached to each other. Such a structure is suitable for increasing the effective area of the photoelectric conversion element PD formed on the silicon substrate 660. Furthermore, the integration degree of the circuit formed on the silicon substrate 600 can be improved using miniaturized Si transistors; thus, a high-performance semiconductor device can be provided.

Figure 20:
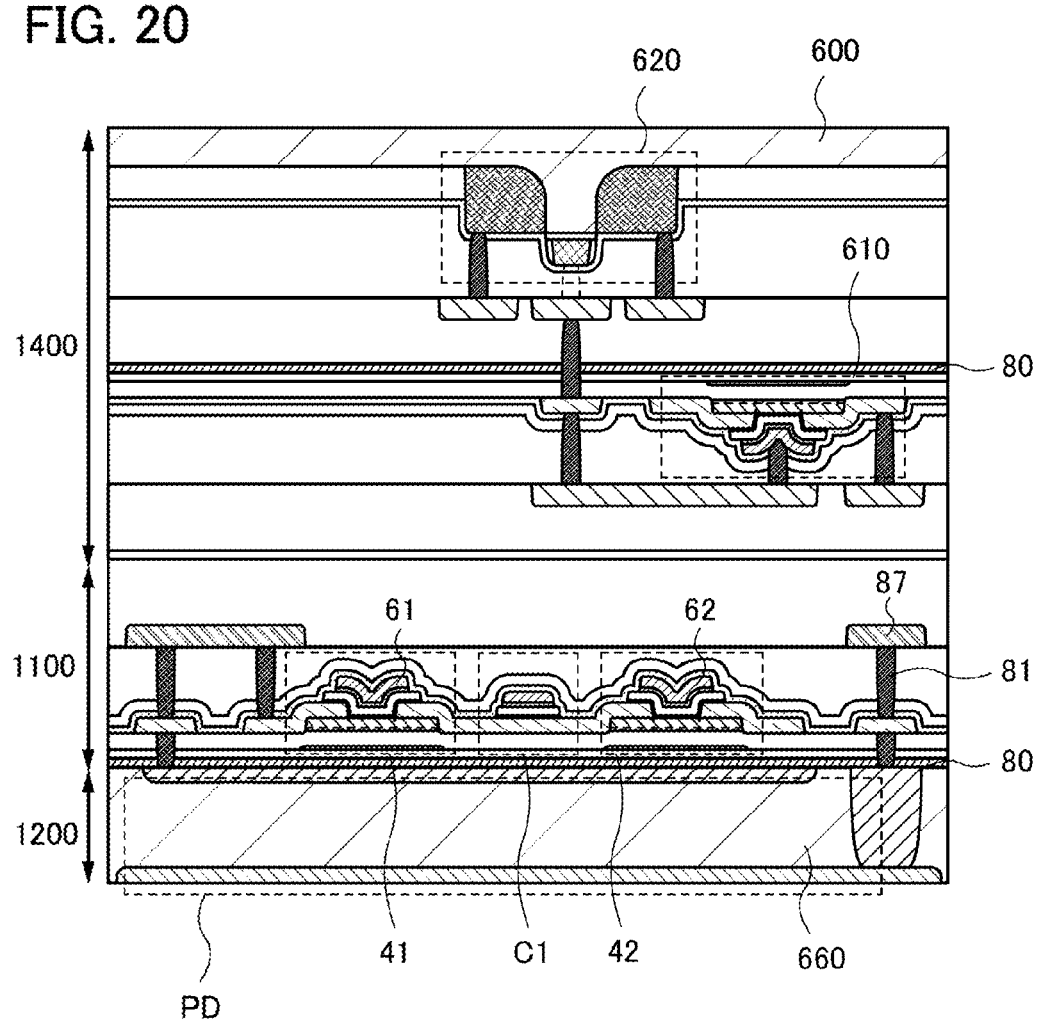
FIG. 20 is a cross-sectional view illustrating an imaging device.
Figure 21:
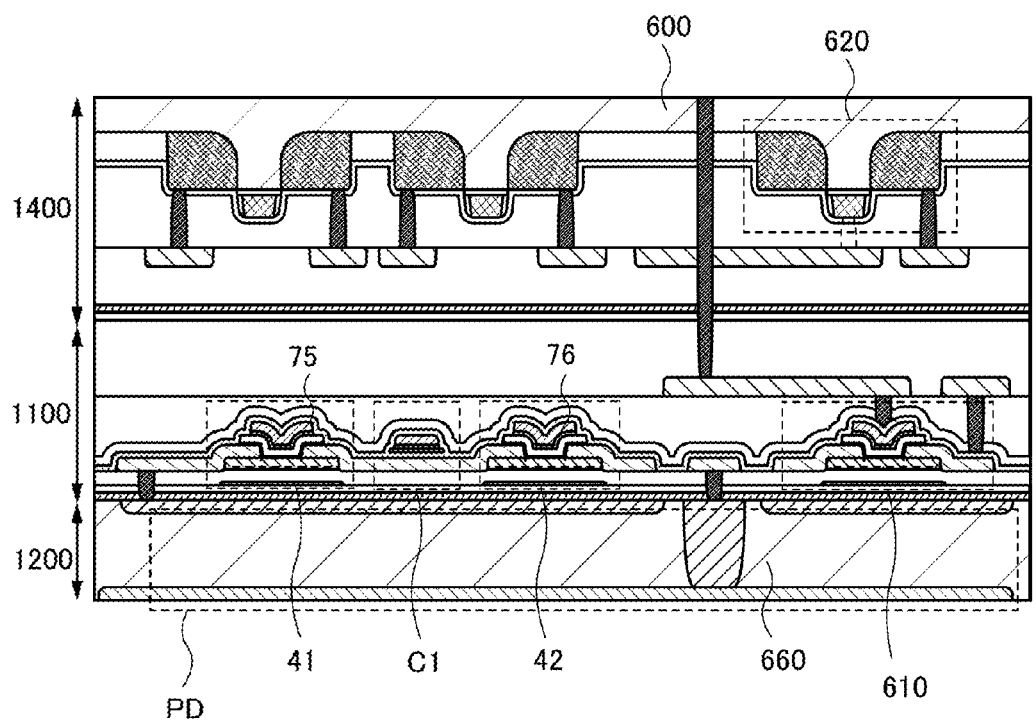
FIG. 21 is a cross-sectional view illustrating an imaging device.

FIG. 20 and FIG. 21 each show a modification example of FIG. 19, in which a circuit includes an OS transistor and a Si transistor. Such a structure is suitable for increasing the effective area of the photoelectric conversion element PD formed on the silicon substrate 660. Furthermore, the integration degree of the circuit formed on the silicon substrate 600 can be improved using miniaturized Si transistors; thus, a high-performance semiconductor device can be provided.

In the case of the structure illustrated in FIG. 20, a CMOS circuit can be formed using the OS transistor and the Si transistor on the silicon substrate 600. Since the off-state current of the OS transistor is extremely low, the static leakage current of the CMOS circuit can be extremely low.

In the case of the structure illustrated in FIG. 21, a CMOS circuit can be formed using the OS transistor over the silicon substrate 660 and the Si transistor on the silicon substrate 600.

Note that the structure of the transistor and the photoelectric conversion element included in each of the imaging devices described in this embodiment is only an example. Therefore, for example, one or more of the transistors 41 to 45 may include silicon or the like in an active region or an active layer. Furthermore, one of or both the transistors 610 and 620 may include an oxide semiconductor layer as an active layer.

Figure 22A:
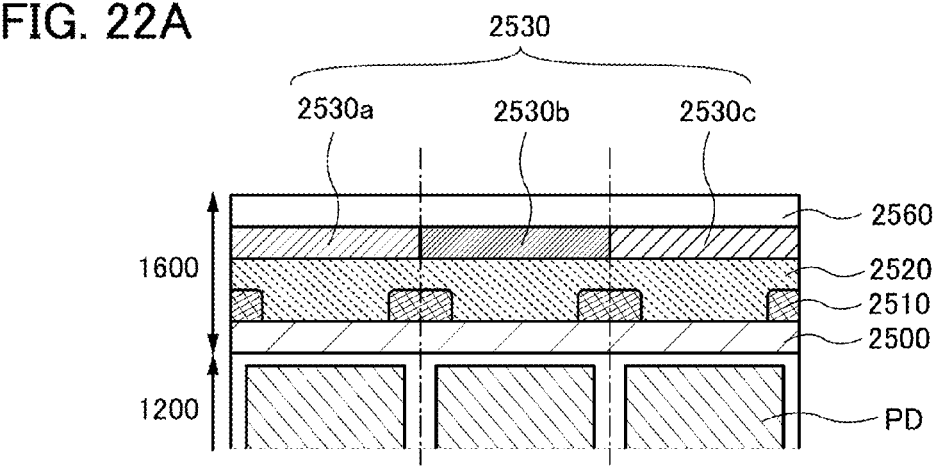
FIGS. 22A to 22C are cross-sectional views each illustrating the structure of an imaging device.

FIG. 22A is a cross-sectional view of an example of a mode in which a color filter and the like are added to the imaging device. The cross-sectional view illustrates part of a region including pixel circuits for three pixels. An insulating layer 2500 is formed over the layer 1200 where the photoelectric conversion element PD is formed. As the insulating layer 2500, for example, a silicon oxide film with a high visible-light transmitting property can be used. In addition, a silicon nitride film may be stacked as a passivation film. In addition, a dielectric film of hafnium oxide or the like may be stacked as an anti-reflection film.

A light-blocking layer 2510 may be formed over the insulating layer 2500. The light-blocking layer 2510 has a function of inhibiting color mixing of light passing through the color filter. The light-blocking layer 2510 can be formed of a metal layer of aluminum, tungsten, or the like, or a stack including the metal layer and a dielectric film functioning as an anti-reflection film.

An organic resin layer 2520 can be formed as a planarization film over the insulating layer 2500 and the light-blocking layer 2510. A color filter 2530 (a color filter 2530a, a color filter 2530b, and a color filter 2530c) is formed in each pixel. For example, the color filter 2530a, the color filter 2530b, and the color filter 2530c each have a color of red (R), green (G), blue (B), yellow (Y), cyan (C), magenta (M), or the like, so that a color image can be obtained.

A light-transmitting insulating layer 2560 or the like can be provided over the color filter 2530.

Figure 22B:
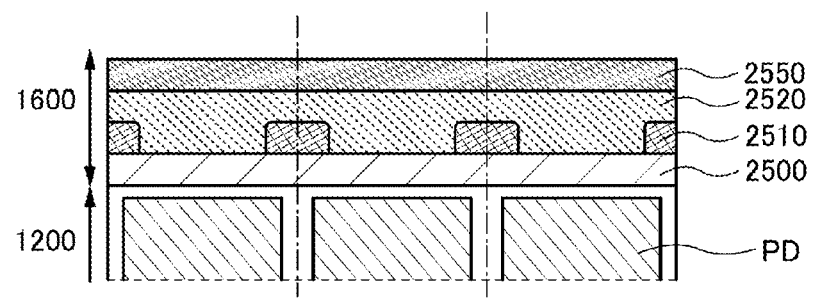

As illustrated in FIG. 22B, an optical conversion layer 2550 may be used instead of the color filter 2530. Such a structure enables the imaging device to take images in various wavelength regions.

For example, when a filter that blocks light having a wavelength shorter than or equal to that of visible light is used as the optical conversion layer 2550, an infrared imaging device can be obtained. When a filter that blocks light having a wavelength shorter than or equal to that of near infrared light is used as the optical conversion layer 2550, a far infrared imaging device can be obtained. When a filter that blocks light having a wavelength longer than or equal to that of visible light is used as the optical conversion layer 2550, an ultraviolet imaging device can be obtained.

Furthermore, when a scintillator is used as the optical conversion layer 2550, an imaging device that takes an image visualizing the intensity of radiation and is used for an X-ray imaging device or the like can be obtained. Radiation such as X-rays passes through a subject to enter a scintillator, and then is converted into light (fluorescence) such as visible light or ultraviolet light owing to a phenomenon known as photoluminescence. Then, the photoelectric conversion element PD detects the light to obtain image data. Furthermore, the imaging device having the structure may be used in a radiation detector or the like.

A scintillator is formed of a substance that, when irradiated with radiation such as X-rays or gamma-rays, absorbs energy of the radiation to emit visible light or ultraviolet light or a material containing the substance. For example, materials such as $Gd_2O_2S:Tb$, $Gd_2O_2S:Pr$, $Gd_2O_2S:Eu$, $BaFCl:Eu$, Na, CsI, $CaF_2$, $BaF_2$, $CeF_3$, LiF, LiI, and ZnO and a resin or ceramics in which any of the materials is dispersed can be used.

In the photoelectric conversion element PD using a selenium-based material, radiation such as X-rays can be directly converted into charge; thus, the scintillator is not necessarily used.

Figure 22C:
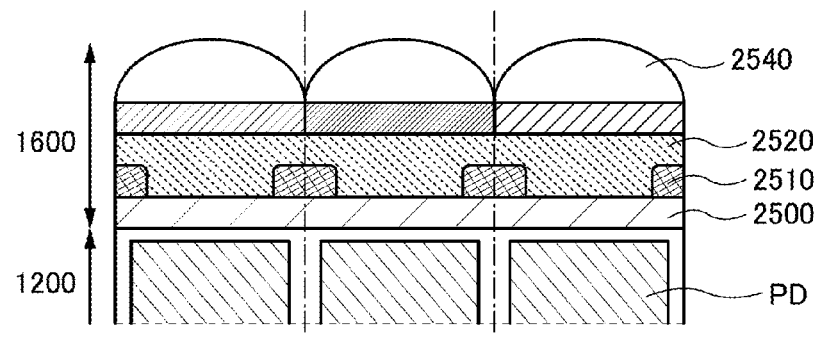

Alternatively, as illustrated in FIG. 22C, a microlens array 2540 may be provided over the color filters 2530a, 2530b, and 2530c. Light penetrating lenses included in the microlens array 2540 goes through the color filters positioned thereunder to reach the photoelectric conversion element PD. Note that a region other than the layer 1200 in FIGS. 22A to 22C is referred to as a layer 1600.

Figure 23:
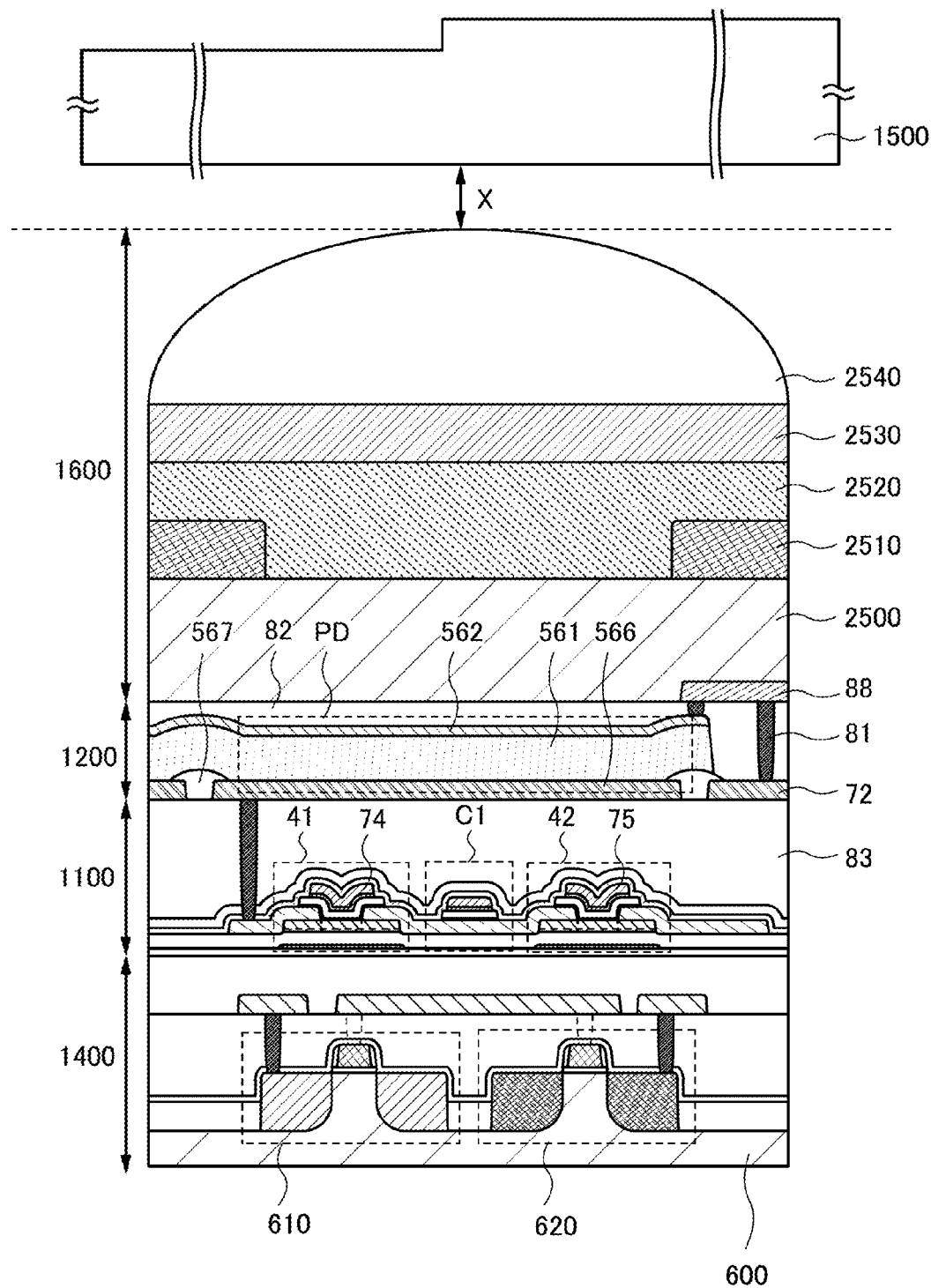
FIG. 23 is a cross-sectional view illustrating the structure of an imaging device.

FIG. 23 illustrates a specific example of a layered structure including the pixel 20 of one embodiment of the present invention, the microlens array 2540 illustrated in FIG. 22C, and the like. In the example illustrated in FIG. 23, the structure of the pixel illustrated in FIG. 16A is used. In the case of using the pixel 20 illustrated in FIG. 20, a structure illustrated in FIG. 24 is employed.

The photoelectric conversion element PD and the transistor or the capacitor that forms the circuit of the pixel 20 can be positioned so as to overlap with each other in this manner, leading to a reduction in the size of the imaging device.

Figure 24:
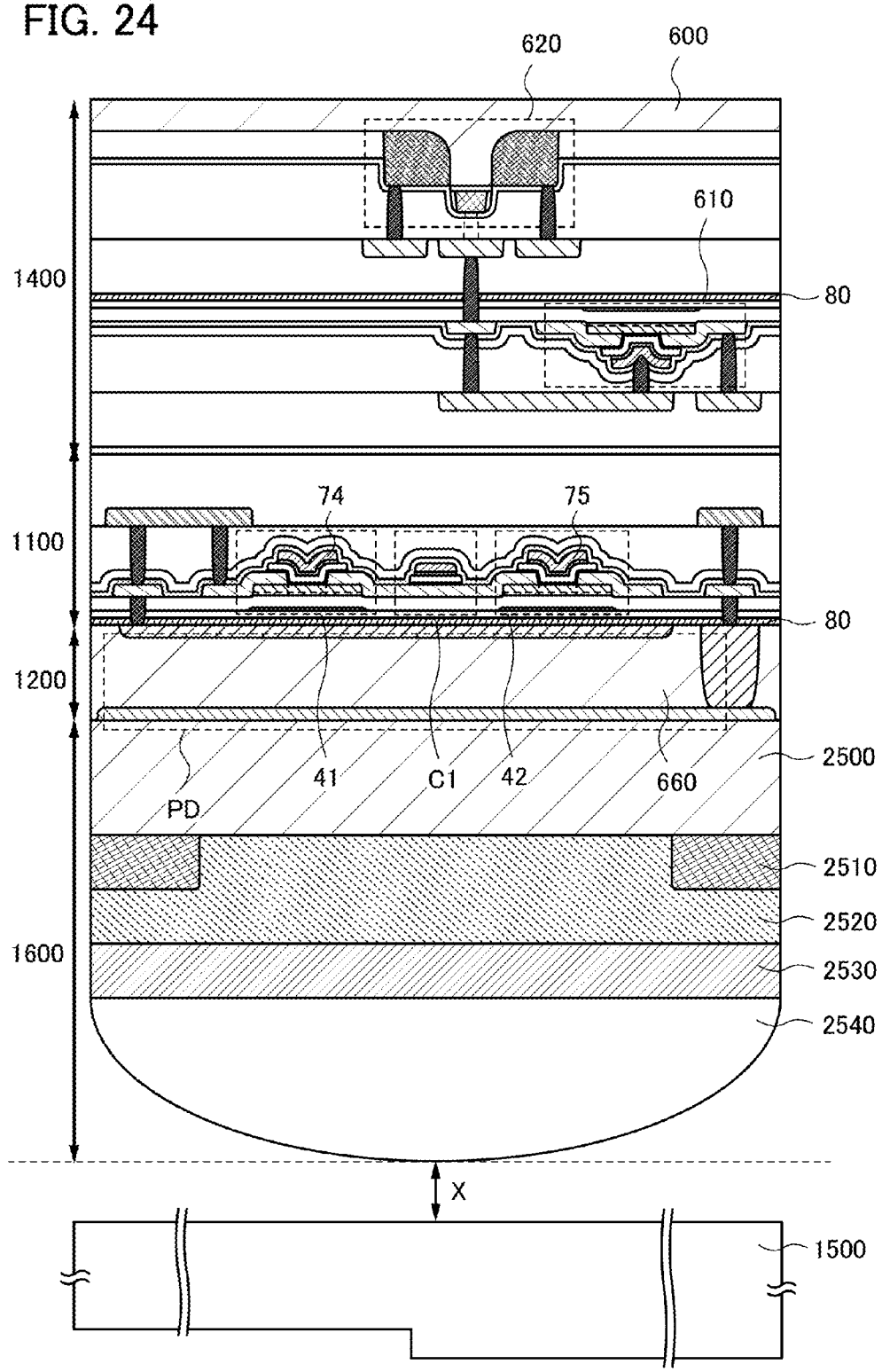
FIG. 24 is a cross-sectional view illustrating the structure of an imaging device.

As illustrated in FIG. 23 and FIG. 24, a diffraction grating 1500 may be provided above the microlens array 2540. An image of an object through the diffraction grating 1500 (i.e., a diffraction pattern) can be scanned into a pixel, and an input image (an object image) can be formed from a captured image in the pixel by arithmetic processing. In addition, the use of the diffraction grating 1500 instead of a lens can reduce the cost of the imaging device.

The diffraction grating 1500 can be formed using a light-transmitting material. An inorganic insulating film such as a silicon oxide film or a silicon oxynitride film can be used, for example. Alternatively, an organic insulating film such as an acrylic resin film or a polyimide resin film may be used. Alternatively, a stack of the inorganic insulating film and the organic insulating film may be used.

In addition, the diffraction grating 1500 can be formed by a lithography process using a photosensitive resin or the like.

Alternatively, the diffraction grating 1500 can be formed by a lithography process and an etching process. Alternatively, the diffraction grating 1500 can be formed by nanoimprint lithography, laser scribing, or the like.

Note that a space X may be provided between the diffraction grating 1500 and the microlens array 2540. The space X can be less than or equal to 1 mm, preferably less than or equal to 100 µm. The space may be an empty space or may be a sealing layer or an adhesion layer formed using a light-transmitting material. For example, an inert gas such as nitrogen or a rare gas can be sealed in the space. Alternatively, an acrylic resin, an epoxy resin, a polyimide resin, or the like may be provided in the space. Alternatively, a liquid such as silicone oil may be provided. Even in the case where the microlens array 2540 is not provided, the space X may be provided between the color filter 2530 and the diffraction grating 1500.

As illustrated in FIGS. 25A1 and 25B1, the imaging device may be bent. FIG. 25A1 illustrates a state in which the imaging device is bent in the direction of dashed-two dotted line X1-X2. FIG. 25A2 is a cross-sectional view illustrating a portion indicated by dashed-two dotted line X1-X2 in FIG. 25A1. FIG. 25A3 is a cross-sectional view illustrating a portion indicated by dashed-two dotted line Y1-Y2 in FIG. 25A1.

FIG. 25B1 illustrates a state where the imaging device is bent in the direction of dashed-two dotted line X3-X4 and the direction of dashed-two dotted line Y3-Y4. FIG. 25B2 is a cross-sectional view illustrating a portion indicated by dashed-two dotted line X3-X4 in FIG. 25B1. FIG. 25B3 is a cross-sectional view illustrating a portion indicated by dashed-two dotted line Y3-Y4 in FIG. 25B1.

Bending the imaging device can reduce field curvature and astigmatism. Thus, the optical design of lens and the like, which is used in combination of the imaging device, can be facilitated. For example, the number of lenses used for aberration correction can be reduced; accordingly, the size or weight of electronic devices including the imaging device can be easily reduced. In addition, the quality of a captured image can be improved.

In Embodiment 1, one embodiment of the present invention has been described. Other embodiments of the present invention will be described in Embodiments 2 to 6. Note that one embodiment of the present invention is not limited thereto. In other words, various embodiments of the invention are described in this embodiment and the other embodiments, and one embodiment of the present invention is not limited to a particular embodiment. Although an example in which one embodiment of the present invention is applied to an imaging device is described, one embodiment of the present invention is not limited thereto. Depending on circumstances or conditions, one embodiment of the present invention is not necessarily applied to an imaging device. One embodiment of the present invention may be applied to a semiconductor device with another function, for example. Although an example in which a channel formation region, a source region, a drain region, or the like of a transistor includes an oxide semiconductor is described as one embodiment of the present invention, one embodiment of the present invention is not limited thereto. Depending on circumstances or conditions, various transistors or a channel formation region, a source region, a drain region, or the like of a transistor in one embodiment of the present invention may include various semiconductors. Depending on circumstances or conditions, various transistors or a channel formation region, a source region, a drain region, or the like of a transistor in one embodiment of the present invention may include, for example, at least one of silicon, germanium, silicon germanium, silicon carbide, gallium arsenide, aluminum gallium arsenide, indium phosphide, gallium nitride, and an organic semiconductor. Alternatively, for example, depending on circumstances or conditions, various transistors or a channel formation region, a source region, a drain region, or the like of a transistor in one embodiment of the present invention does not necessarily include an oxide semiconductor.

This embodiment can be implemented in appropriate combination with any of the structures described in the other embodiments.

Embodiment 2

In this embodiment, a transistor including an oxide semiconductor that can be used in one embodiment of the present invention will be described with reference to drawings. In the drawings in this embodiment, some components are enlarged, reduced in size, or omitted for easy understanding.

Figure 26A:
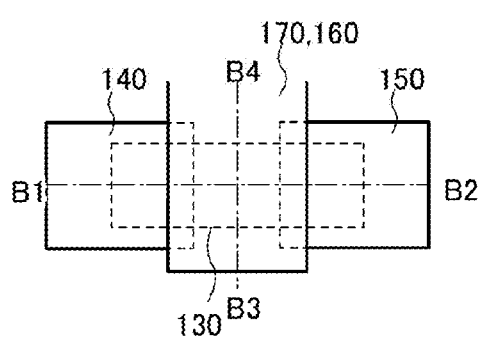
FIGS. 26A to 26F are top views and cross-sectional views illustrating transistors.
Figure 26B:
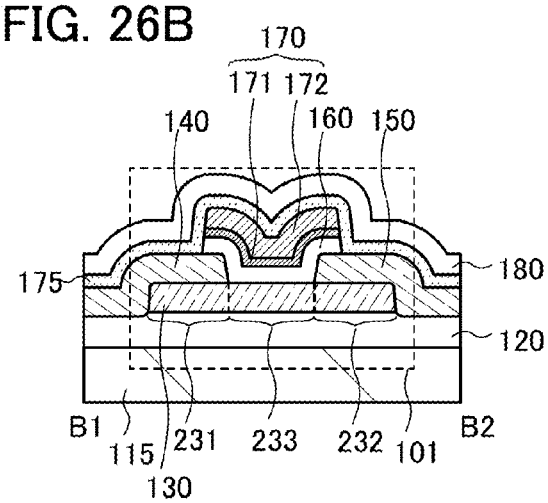
Figure 28A:
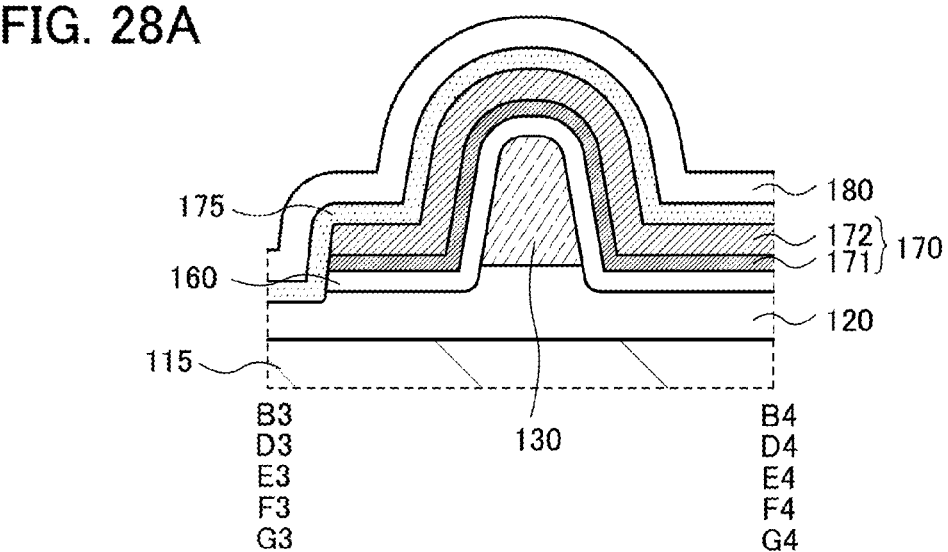
FIGS. 28A to 28D each illustrate a cross section of a transistor in a channel width direction.

FIGS. 26A and 26B are a top view and a cross-sectional view illustrating a transistor 101 of one embodiment of the present invention. FIG. 26A is the top view, and FIG. 26B illustrates a cross section taken along dashed-dotted line B1-B2 in FIG. 26A. A cross section in the direction of dashed-dotted line B3-B4 in FIG. 26A is illustrated in FIG. 28A. The direction of dashed-dotted line B1-B2 is referred to as a channel length direction, and the direction of dashed-dotted line B3-B4 is referred to as a channel width direction.

The transistor 101 includes an insulating layer 120 in contact with a substrate 115; an oxide semiconductor layer 130 in contact with the insulating layer 120; conductive layers 140 and 150 electrically connected to the oxide semiconductor layer 130; an insulating layer 160 in contact with the oxide semiconductor layer 130 and the conductive layers 140 and 150; a conductive layer 170 in contact with the insulating layer 160; an insulating layer 175 in contact with the conductive layers 140 and 150, the insulating layer 160, and the conductive layer 170; and an insulating layer 180 in contact with the insulating layer 175. The insulating layer 180 may function as a planarization film as necessary.

Here, the conductive layer 140, the conductive layer 150, the insulating layer 160, and the conductive layer 170 can function as a source electrode layer, a drain electrode layer, a gate insulating film, and a gate electrode layer, respectively.

A region 231, a region 232, and a region 233 in FIG. 26B can function as a source region, a drain region, and a channel formation region, respectively. The region 231 and the region 232 are in contact with the conductive layer 140 and the conductive layer 150, respectively. When a conductive material that is easily bonded to oxygen is used for the conductive layers 140 and 150, the resistance of the regions 231 and 232 can be reduced.

Specifically, since the oxide semiconductor layer 130 is in contact with the conductive layers 140 and 150, an oxygen vacancy is generated in the oxide semiconductor layer 130, and interaction between the oxygen vacancy and hydrogen that remains in the oxide semiconductor layer 130 or diffuses into the oxide semiconductor layer 130 from the outside changes the regions 231 and 232 to n-type regions with low resistance.

Note that functions of a "source" and a "drain" of a transistor are sometimes interchanged with each other when a transistor of an opposite conductivity type is used or when the direction of current flow is changed in circuit operation, for example. Therefore, the terms "source" and "drain" can be interchanged with each other in this specification. In addition, the term "electrode layer" can be replaced with the term "wiring".

The conductive layer 170 includes two layers, a conductive layer 171 and a conductive layer 172, in the drawing, but also may be a single layer or a stack of three or more layers. The same applies to other transistors described in this embodiment.

Each of the conductive layers 140 and 150 is a single layer in the drawing, but also may be a stack of two or more layers. The same applies to other transistors described in this embodiment.

Figure 26C:
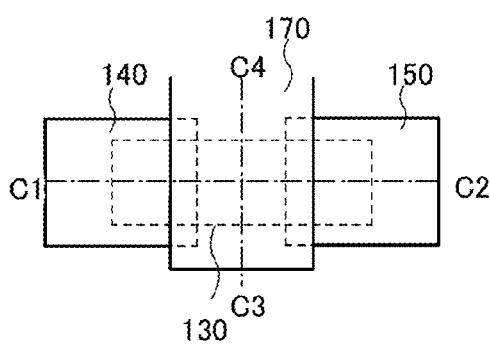
Figure 26D:
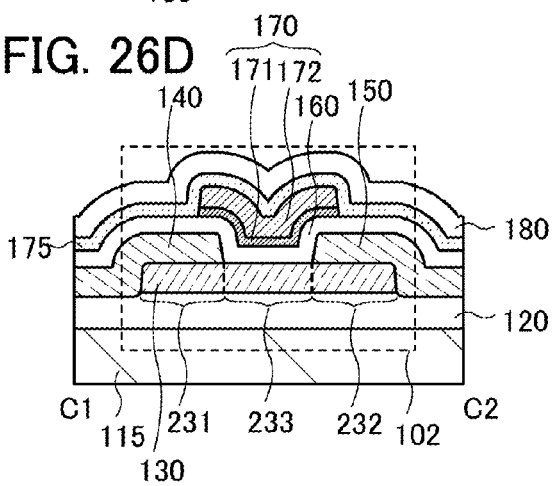
Figure 28B:
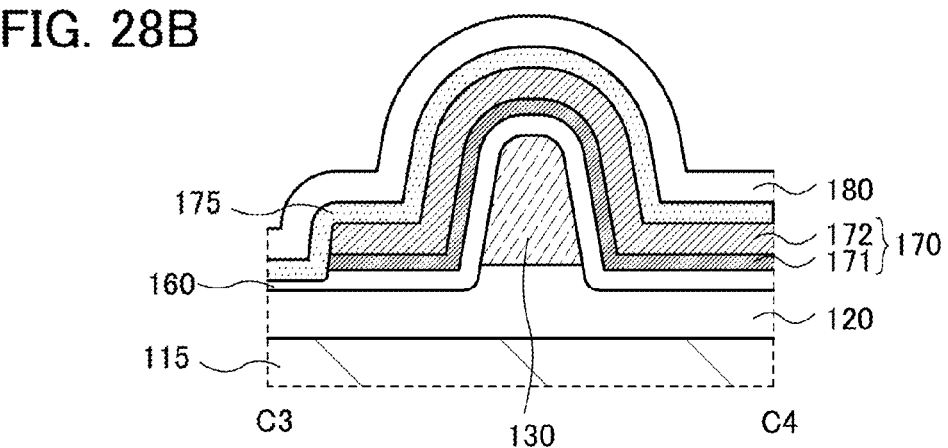

The transistor in one embodiment of the present invention may have a structure illustrated in FIGS. 26C and 26D. FIG. 26C is a top view of a transistor 102. A cross section in the direction of dashed-dotted line C1-C2 in FIG. 26C is illustrated in FIG. 26D. A cross section in the direction of dashed-dotted line C3-C4 in FIG. 26C is illustrated in FIG. 28B. The direction of dashed-dotted line C1-C2 is referred to as a channel length direction, and the direction of dashed-dotted line C3-C4 is referred to as a channel width direction.

The transistor 102 has the same structure as the transistor 101 except that an end portion of the insulating layer 160 functioning as a gate insulating film is not aligned with an end portion of the conductive layer 170 functioning as a gate electrode layer. In the transistor 102, wide areas of the conductive layers 140 and 150 are covered with the insulating layer 160 and accordingly the resistance between the conductive layer 170 and the conductive layers 140 and 150 is high; therefore, the transistor 102 has a feature of low gate leakage current.

The transistors 101 and 102 each have a top-gate structure including a region where the conductive layer 170 overlaps with the conductive layers 140 and 150. To reduce parasitic capacitance, the width of the region in the channel length direction is preferably greater than or equal to 3 nm and less than 300 nm. Since an offset region is not formed in the oxide semiconductor layer 130 in this structure, a transistor with a high on-state current can be easily formed.

Figure 26E:
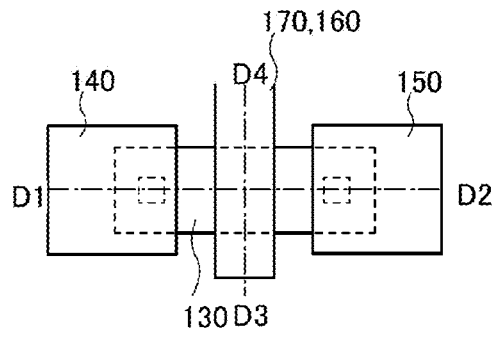
Figure 26F:
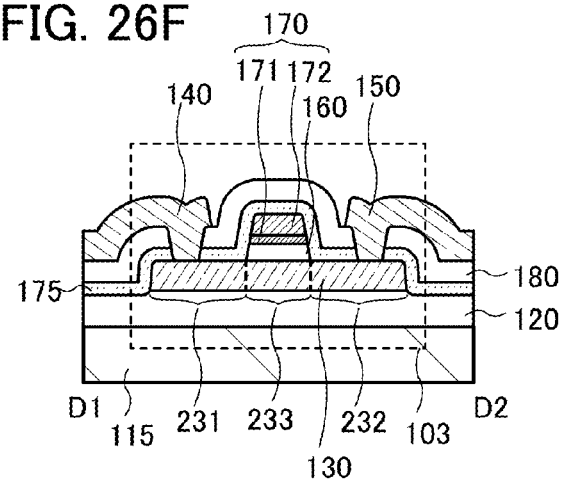

The transistor in one embodiment of the present invention may have a structure illustrated in FIGS. 26E and 26F. FIG. 26E is a top view of a transistor 103. A cross section in the direction of dashed-dotted line D1-D2 in FIG. 26E is illustrated in FIG. 26F. A cross section in the direction of dashed-dotted line D3-D4 in FIG. 26E is illustrated in FIG. 28A. The direction of dashed-dotted line D1-D2 is referred to as a channel length direction, and the direction of dashed-dotted line D3-D4 is referred to as a channel width direction.

The transistor 103 includes the insulating layer 120 in contact with the substrate 115; the oxide semiconductor layer 130 in contact with the insulating layer 120; the insulating layer 160 in contact with the oxide semiconductor layer 130; the conductive layer 170 in contact with the insulating layer 160; the insulating layer 175 covering the oxide semiconductor layer 130, the insulating layer 160, and the conductive layer 170; the insulating layer 180 in contact with the insulating layer 175; and the conductive layers 140 and 150 electrically connected to the oxide semiconductor layer 130 through openings provided in the insulating layers 175 and 180. The transistor 103 may further include, for example, an insulating layer (planarization film) in contact with the insulating layer 180 and the conductive layers 140 and 150 as necessary.

Here, the conductive layer 140, the conductive layer 150, the insulating layer 160, and the conductive layer 170 can function as a source electrode layer, a drain electrode layer, a gate insulating film, and a gate electrode layer, respectively.

The region 231, the region 232, and the region 233 in FIG. 26F can function as a source region, a drain region, and a channel formation region, respectively. The regions 231 and 232 are in contact with the insulating layer 175. When an insulating material containing hydrogen is used for the insulating layer 175, for example, the resistance of the regions 231 and 232 can be reduced.

Specifically, interaction between an oxygen vacancy generated in the regions 231 and 232 by the steps up to formation of the insulating layer 175 and hydrogen that diffuses into the regions 231 and 232 from the insulating layer 175 changes the regions 231 and 232 to n-type regions with low resistance. As the insulating material containing hydrogen, for example, silicon nitride, aluminum nitride, or the like can be used.

Figure 27A:
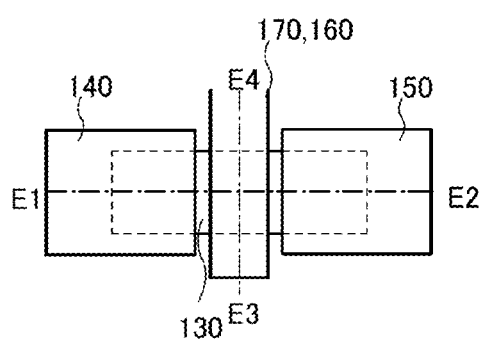
FIGS. 27A to 27F are top views and cross-sectional views illustrating transistors.
Figure 27B:
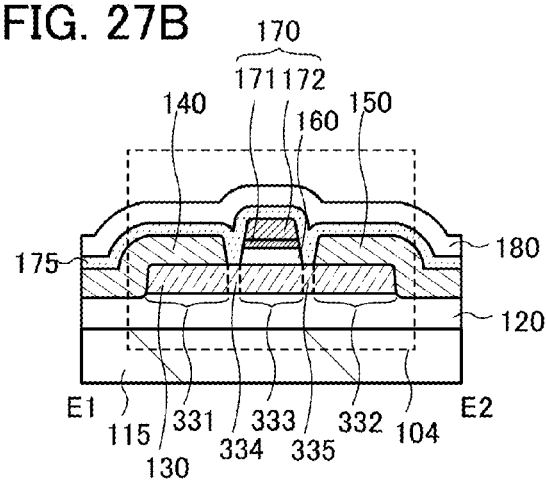

The transistor in one embodiment of the present invention may have a structure illustrated in FIGS. 27A and 27B. FIG. 27A is a top view of a transistor 104. A cross section in the direction of dashed-dotted line E1-E2 in FIG. 27A is illustrated in FIG. 27B. A cross section in the direction of dashed-dotted line E3-E4 in FIG. 27A is illustrated in FIG. 28A. The direction of dashed-dotted line E1-E2 is referred to as a channel length direction, and the direction of dashed-dotted line E3-E4 is referred to as a channel width direction.

The transistor 104 has the same structure as the transistor 103 except that the conductive layers 140 and 150 in contact with the oxide semiconductor layer 130 cover end portions of the oxide semiconductor layer 130.

In FIG. 27B, regions 331 and 334 can function as a source region, regions 332 and 335 can function as a drain region, and a region 333 can function as a channel formation region.

The resistance of the regions 331 and 332 can be reduced in a manner similar to that of the regions 231 and 232 in the transistor 101.

The resistance of the regions 334 and 335 can be reduced in a manner similar to that of the regions 231 and 232 in the transistor 103. In the case where the width of the regions 334 and 335 in the channel length direction is less than or equal to 100 nm, preferably less than or equal to 50 nm, a gate electric field prevents a significant decrease in on-state current. Therefore, a reduction in resistance of the regions 334 and 335 is not performed in some cases.

The transistors 103 and 104 each have a self-aligned structure that does not include a region where the conductive layer 170 overlaps with the conductive layers 140 and 150. A transistor with a self-aligned structure, which has extremely low parasitic capacitance between a gate electrode layer and source and drain electrode layers, is suitable for applications that require high-speed operation.

Figure 27C:
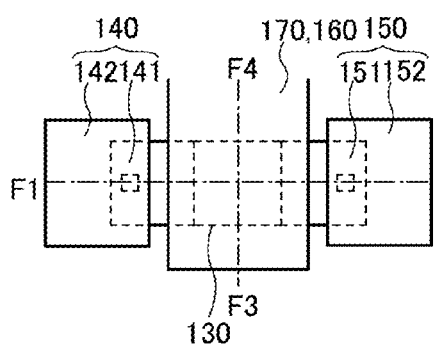
Figure 27D:
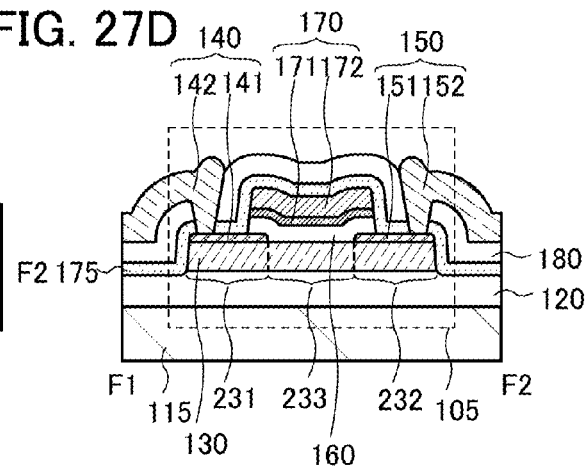

The transistor in one embodiment of the present invention may have a structure illustrated in FIGS. 27C and 27D. FIG. 27C is a top view of a transistor 105. A cross section in the direction of dashed-dotted line F1-F2 in FIG. 27C is illustrated in FIG. 27D. A cross section in the direction of dashed-dotted line F3-F4 in FIG. 27C is illustrated in FIG. 28A. The direction of dashed-dotted line F1-F2 is referred to as a channel length direction, and the direction of dashed-dotted line F3-F4 is referred to as a channel width direction.

The transistor 105 includes the insulating layer 120 in contact with the substrate 115; the oxide semiconductor layer 130 in contact with the insulating layer 120; conductive layers 141 and 151 electrically connected to the oxide semiconductor layer 130; the insulating layer 160 in contact with the oxide semiconductor layer 130 and the conductive layers 141 and 151; the conductive layer 170 in contact with the insulating layer 160; the insulating layer 175 in contact with the oxide semiconductor layer 130, the conductive layers 141 and 151, the insulating layer 160, and the conductive layer 170; the insulating layer 180 in contact with the insulating layer 175; and conductive layers 142 and 152 electrically connected to the conductive layers 141 and 151, respectively, through openings provided in the insulating layers 175 and 180. The transistor 105 may further include, for example, an insulating layer in contact with the insulating layer 180 and the conductive layers 142 and 152 as necessary.

Here, the conductive layers 141 and 151 are in contact with the top surface of the oxide semiconductor layer 130 and are not in contact with side surfaces of the oxide semiconductor layer 130.

The transistor 105 has the same structure as the transistor 101 except that the conductive layers 141 and 151 are provided, that openings are provided in the insulating layers 175 and 180, and that the conductive layers 142 and 152 electrically connected to the conductive layers 141 and 151, respectively, through the openings are provided. The conductive layer 140 (the conductive layers 141 and 142) can function as a source electrode layer, and the conductive layer 150 (the conductive layers 151 and 152) can function as a drain electrode layer.

Figure 27E:
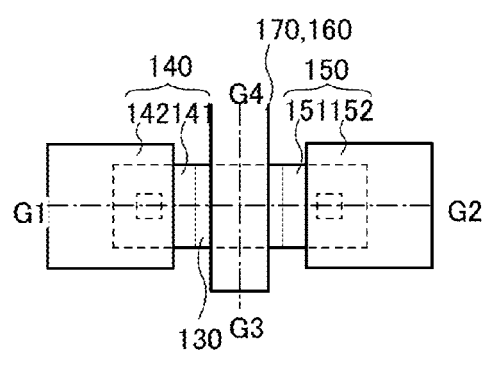
Figure 27F:
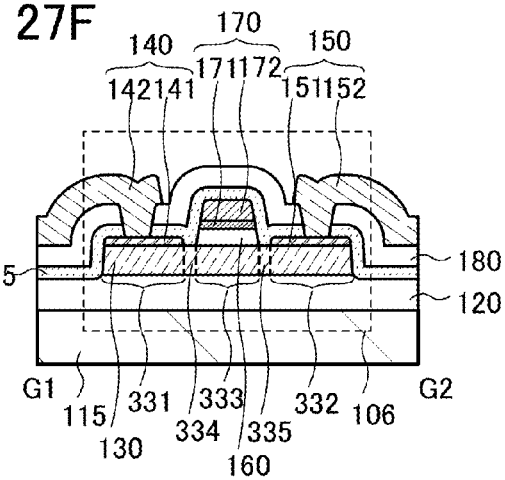

The transistor in one embodiment of the present invention may have a structure illustrated in FIGS. 27E and 27F. FIG. 27E is a top view of a transistor 106. A cross section in the direction of dashed-dotted line G1-G2 in FIG. 27E is illustrated in FIG. 27F. A cross section in the direction of dashed-dotted line G3-G4 in FIG. 27A is illustrated in FIG. 28A. The direction of dashed-dotted line G1-G2 is referred to as a channel length direction, and the direction of dashed-dotted line G3-G4 is referred to as a channel width direction.

The transistor 106 includes the insulating layer 120 in contact with the substrate 115; the oxide semiconductor layer 130 in contact with the insulating layer 120; the conductive layers 141 and 151 electrically connected to the oxide semiconductor layer 130; the insulating layer 160 in contact with the oxide semiconductor layer 130; the conductive layer 170 in contact with the insulating layer 160; the insulating layer 175 in contact with the insulating layer 120, the oxide semiconductor layer 130, the conductive layers 141 and 151, the insulating layer 160, and the conductive layer 170; the insulating layer 180 in contact with the insulating layer 175; and the conductive layers 142 and 152 electrically connected to the conductive layers 141 and 151, respectively, through openings provided in the insulating layers 175 and 180. The transistor 106 may further include, for example, an insulating layer (planarization film) in contact with the insulating layer 180 and the conductive layers 142 and 152 as necessary.

Here, the conductive layers 141 and 151 are in contact with the top surface of the oxide semiconductor layer 130 and are not in contact with side surfaces of the oxide semiconductor layer 130.

The transistor 106 has the same structure as the transistor 103 except that the conductive layers 141 and 151 are provided. The conductive layer 140 (the conductive layers 141 and 142) can function as a source electrode layer, and the conductive layer 150 (the conductive layers 151 and 152) can function as a drain electrode layer.

In the structures of the transistors 105 and 106, the conductive layers 140 and 150 are not in contact with the insulating layer 120. These structures make the insulating layer 120 less likely to be deprived of oxygen by the conductive layers 140 and 150 and facilitate oxygen supply from the insulating layer 120 to the oxide semiconductor layer 130.

An impurity for forming an oxygen vacancy to increase conductivity may be added to the regions 231 and 232 in the transistor 103 and the regions 334 and 335 in the transistors 104 and 106. As an impurity for forming an oxygen vacancy in an oxide semiconductor layer, for example, one or more of the following can be used: phosphorus, arsenic, antimony, boron, aluminum, silicon, nitrogen, helium, neon, argon, krypton, xenon, indium, fluorine, chlorine, titanium, zinc, and carbon. As a method for adding the impurity, plasma treatment, ion implantation, ion doping, plasma immersion ion implantation, or the like can be used.

When the above element is added as an impurity element to the oxide semiconductor layer, a bond between a metal element and oxygen in the oxide semiconductor layer is cut, so that an oxygen vacancy is formed. Interaction between an oxygen vacancy in the oxide semiconductor layer and hydrogen that remains in the oxide semiconductor layer or is added to the oxide semiconductor layer later can increase the conductivity of the oxide semiconductor layer.

When hydrogen is added to an oxide semiconductor in which an oxygen vacancy is formed by addition of an impurity element, hydrogen enters an oxygen vacant site and forms a donor level in the vicinity of the conduction band. Consequently, an oxide conductor can be formed. Here, an oxide conductor refers to an oxide semiconductor having become a conductor. Note that the oxide conductor has a light-transmitting property like the oxide semiconductor.

The oxide conductor is a degenerated semiconductor and it is suggested that the conduction band edge equals or substantially equals the Fermi level. For that reason, an ohmic contact is made between an oxide conductor layer and conductive layers functioning as a source electrode layer and a drain electrode layer; thus, contact resistance between the oxide conductor layer and the conductive layers functioning as a source electrode layer and a drain electrode layer can be reduced.

Figure 28C:
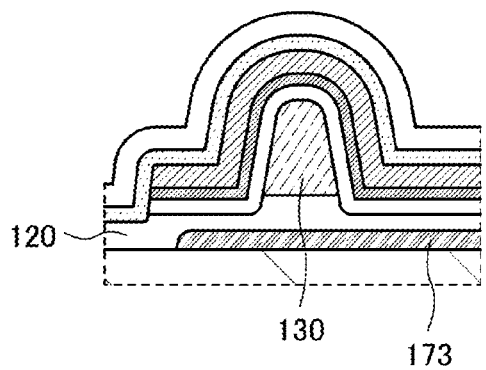
Figure 28D:
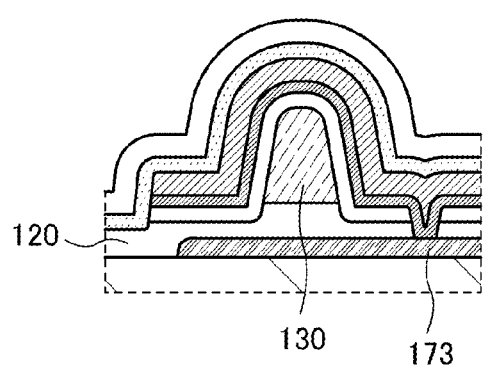

The transistor in one embodiment of the present invention may include a conductive layer 173 between the oxide semiconductor layer 130 and the substrate 115 as illustrated in cross-sectional views in the channel length direction in FIGS. 29A to 29F and cross-sectional views in the channel width direction in FIGS. 28C and 28D. When the conductive layer 173 is used as a second gate electrode layer (back gate), the on-state current can be increased or the threshold voltage can be controlled. In the cross-sectional views in FIGS. 29A to 29F, the width of the conductive layer 173 may be shorter than that of the oxide semiconductor layer 130. Moreover, the width of the conductive layer 173 may be shorter than that of the conductive layer 170.

In order to increase the on-state current, for example, the conductive layers 170 and 173 are made to have the same potential, and the transistor is driven as a double-gate transistor. Furthermore, in order to control the threshold voltage, a fixed potential that is different from the potential of the conductive layer 170 is applied to the conductive layer 173. To set the conductive layers 170 and 173 at the same potential, for example, as illustrated in FIG. 28D, the conductive layers 170 and 173 may be electrically connected to each other through a contact hole.

Although the transistors 101 to 106 in FIGS. 26A to 26F and FIGS. 27A to 27F are examples in which the oxide semiconductor layer 130 is a single layer, the oxide semiconductor layer 130 may be a stacked layer. The oxide semiconductor layer 130 in the transistors 101 to 106 can be replaced with the oxide semiconductor layer 130 in FIGS. 30B and 30C or FIGS. 30D and 30E.

Figure 30A:
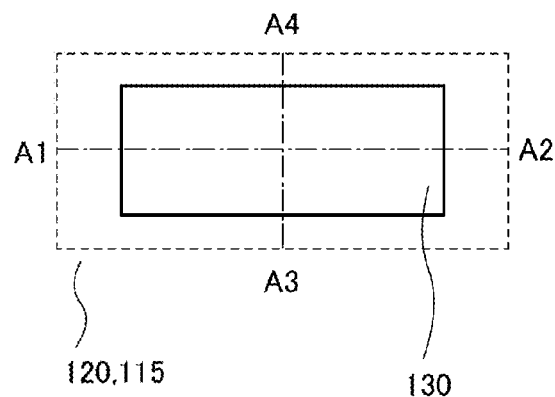
FIGS. 30A to 30E are a top view and cross-sectional views illustrating semiconductor layers.
Figure 30B:
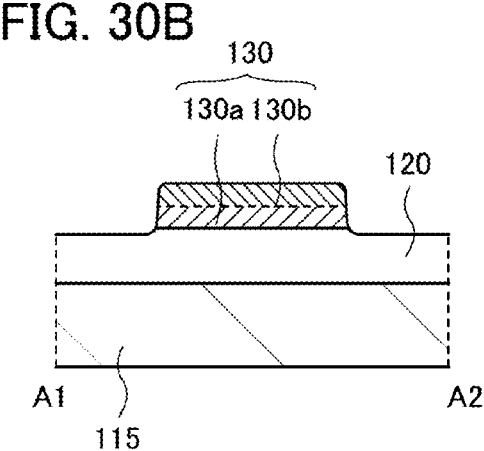
Figure 30D:
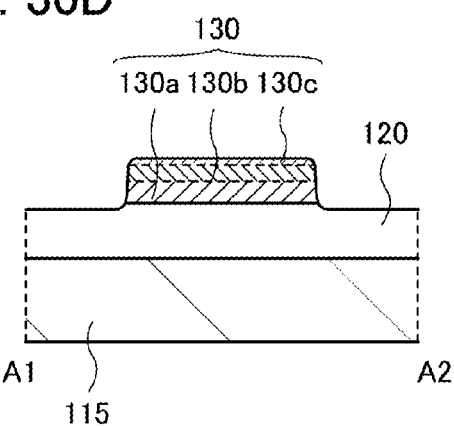
Figure 30C:
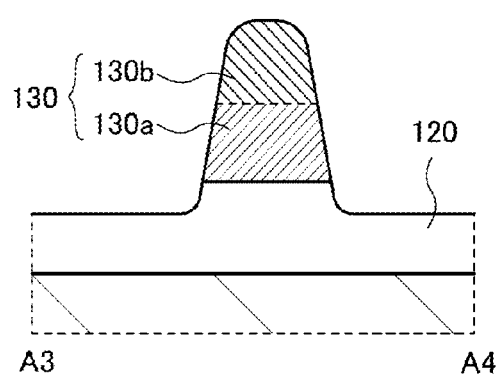
Figure 30E:
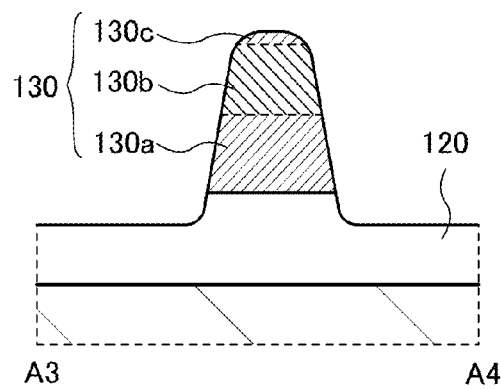

FIG. 30A is a top view of the oxide semiconductor layer 130, and FIGS. 30B and 30C are cross-sectional views of the oxide semiconductor layer 130 with a two-layer structure. FIGS. 30D and 30E are cross-sectional views of the oxide semiconductor layer 130 with a three-layer structure.

Oxide semiconductor layers with different compositions, for example, can be used as an oxide semiconductor layer 130a, an oxide semiconductor layer 130b, and an oxide semiconductor layer 130c.

Figure 31A:
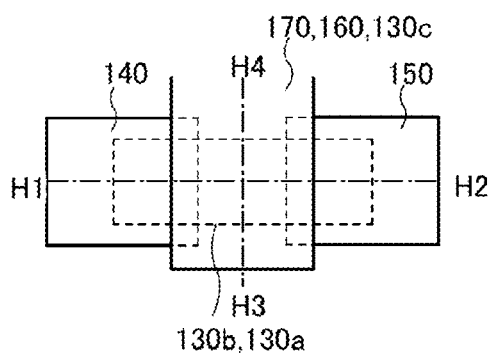
FIGS. 31A to 31F are top views and cross-sectional views illustrating transistors.
Figure 31B:
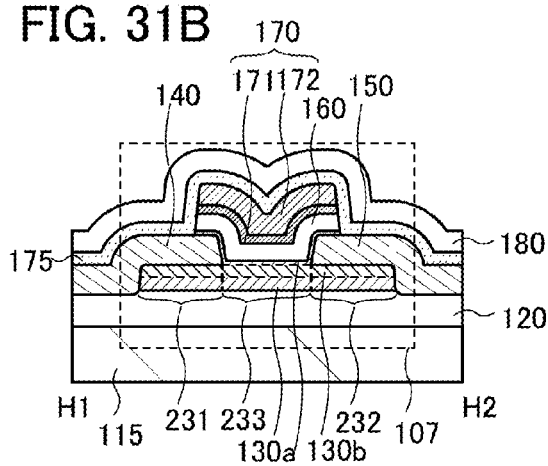
Figure 33A:
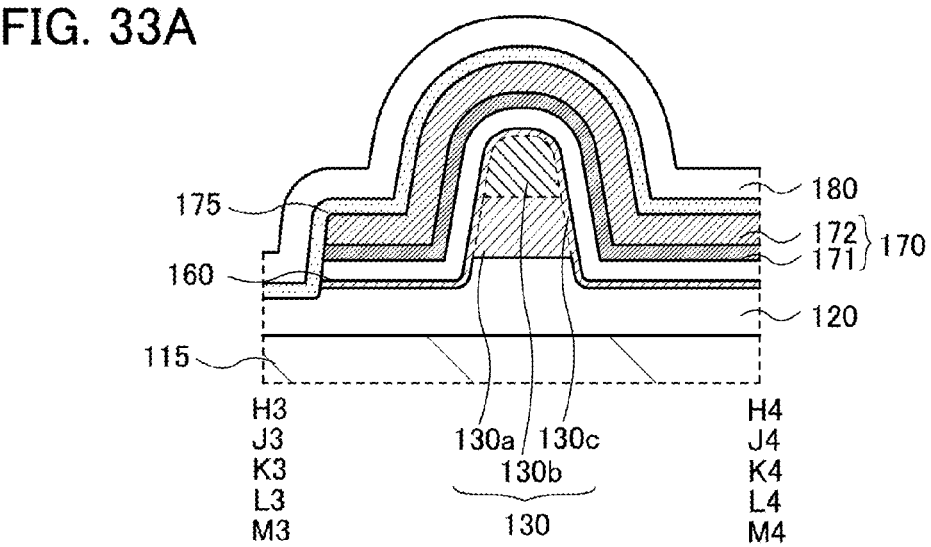
FIGS. 33A to 33D each illustrate a cross section of a transistor in a channel width direction.

The transistor in one embodiment of the present invention may have a structure illustrated in FIGS. 31A and 31B. FIG. 31A is a top view of a transistor 107. A cross section in the direction of dashed-dotted line H1-H2 in FIG. 31A is illustrated in FIG. 31B. A cross section in the direction of dashed-dotted line H3-H4 in FIG. 31A is illustrated in FIG. 33A. The direction of dashed-dotted line H1-H2 is referred to as a channel length direction, and the direction of dashed-dotted line H3-H4 is referred to as a channel width direction.

The transistor 107 includes the insulating layer 120 in contact with the substrate 115; a stack of the oxide semiconductor layers 130a and 130b in contact with the insulating layer 120; the conductive layers 140 and 150 electrically connected to the stack; the oxide semiconductor layer 130c in contact with the stack and the conductive layers 140 and 150; the insulating layer 160 in contact with the oxide semiconductor layer 130c; the conductive layer 170 in contact with the insulating layer 160; the insulating layer 175 in contact with the conductive layers 140 and 150, the oxide semiconductor layer 130c, the insulating layer 160, and the conductive layer 170; and the insulating layer 180 in contact with the insulating layer 175. The insulating layer 180 may function as a planarization film as necessary.

The transistor 107 has the same structure as the transistor 101 except that the oxide semiconductor layer 130 includes two layers (the oxide semiconductor layers 130a and 130b) in the regions 231 and 232, that the oxide semiconductor layer 130 includes three layers (the oxide semiconductor layers 130a to 130c) in the region 233, and that part of the oxide semiconductor layer (the oxide semiconductor layer 130c) exists between the insulating layer 160 and the conductive layers 140 and 150.

Figure 31C:
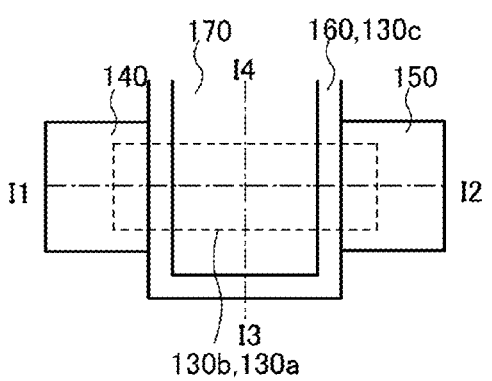
Figure 31D:
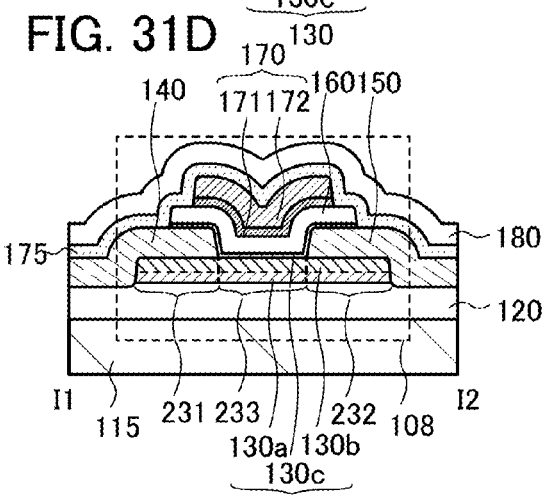
Figure 33B:
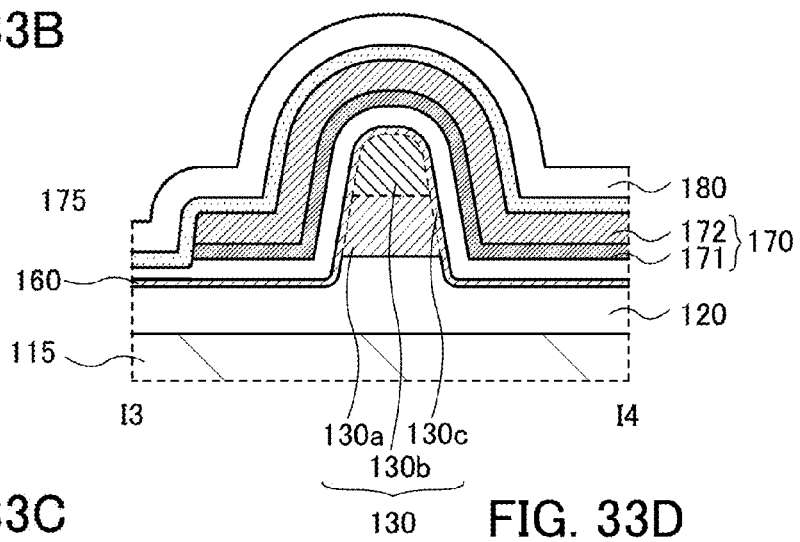

The transistor in one embodiment of the present invention may have a structure illustrated in FIGS. 31C and 31D. FIG. 31C is a top view of a transistor 108. A cross section in the direction of dashed-dotted line I1-I2 in FIG. 31C is illustrated in FIG. 31D. A cross section in the direction of dashed-dotted line I3-I4 in FIG. 31C is illustrated in FIG. 33B. The direction of dashed-dotted line I1-I2 is referred to as a channel length direction, and the direction of dashed-dotted line I3-I4 is referred to as a channel width direction.

The transistor 108 differs from the transistor 107 in that end portions of the insulating layer 160 and the oxide semiconductor layer 130c are not aligned with the end portion of the conductive layer 170.

Figure 31E:
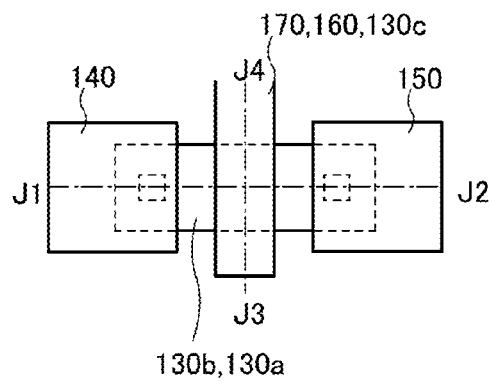
Figure 31F:
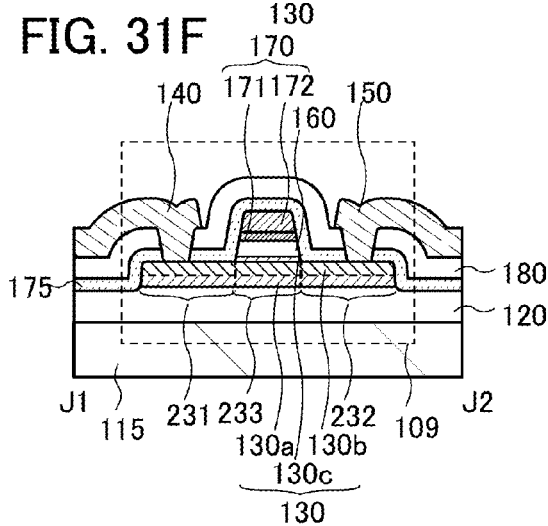

The transistor in one embodiment of the present invention may have a structure illustrated in FIGS. 31E and 31F. FIG. 31E is a top view of a transistor 109. A cross section in the direction of dashed-dotted line J1-J2 in FIG. 31E is illustrated in FIG. 31F. A cross section in the direction of dashed-dotted line J3-J4 in FIG. 31E is illustrated in FIG. 33A. The direction of dashed-dotted line J1-J2 is referred to as a channel length direction, and the direction of dashed-dotted line J3-J4 is referred to as a channel width direction.

The transistor 109 includes the insulating layer 120 in contact with the substrate 115; a stack of the oxide semiconductor layers 130a and 130b in contact with the insulating layer 120; the oxide semiconductor layer 130c in contact with the stack; the insulating layer 160 in contact with the oxide semiconductor layer 130c; the conductive layer 170 in contact with the insulating layer 160; the insulating layer 175 covering the stack, the oxide semiconductor layer 130c, the insulating layer 160, and the conductive layer 170; the insulating layer 180 in contact with the insulating layer 175; and the conductive layers 140 and 150 electrically connected to the stack through openings provided in the insulating layers 175 and 180. The transistor 109 may further include, for example, an insulating layer (planarization film) in contact with the insulating layer 180 and the conductive layers 140 and 150 as necessary.

The transistor 109 has the same structure as the transistor 103 except that the oxide semiconductor layer 130 includes two layers (the oxide semiconductor layers 130a and 130b) in the regions 231 and 232 and that the oxide semiconductor layer 130 includes three layers (the oxide semiconductor layers 130a to 130c) in the region 233.

Figure 32A:
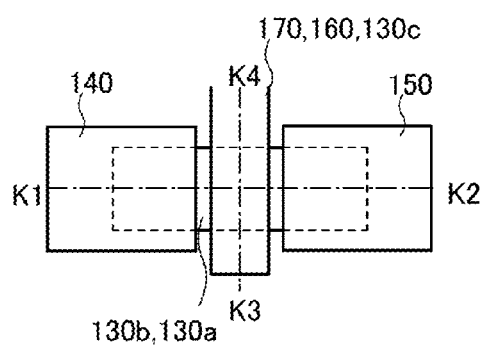
FIGS. 32A to 32F are top views and cross-sectional views illustrating transistors.
Figure 32B:
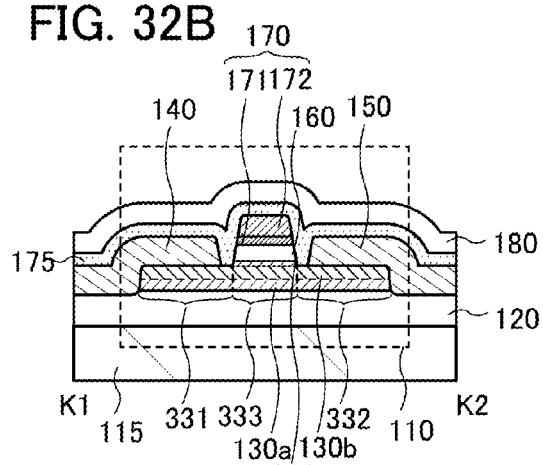

The transistor in one embodiment of the present invention may have a structure illustrated in FIGS. 32A and 32B. FIG. 32A is a top view of a transistor 110. A cross section in the direction of dashed-dotted line K1-K2 in FIG. 32A is illustrated in FIG. 32B. A cross section in the direction of dashed-dotted line K3-K4 in FIG. 32A is illustrated in FIG. 33A. The direction of dashed-dotted line K1-K2 is referred to as a channel length direction, and the direction of dashed-dotted line K3-K4 is referred to as a channel width direction.

The transistor 110 has the same structure as the transistor 104 except that the oxide semiconductor layer 130 includes two layers (the oxide semiconductor layers 130a and 130b) in the regions 331 and 332 and that the oxide semiconductor layer 130 includes three layers (the oxide semiconductor layers 130a to 130c) in the region 333.

Figure 32C:
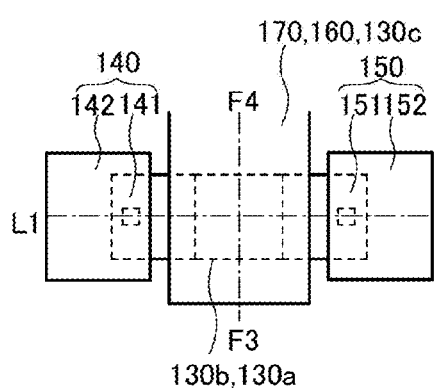
Figure 32D:
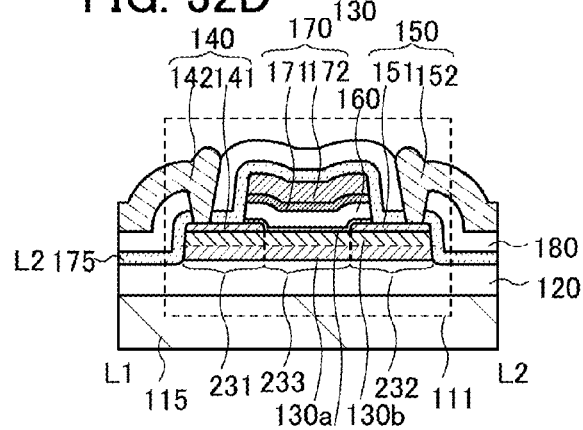

The transistor in one embodiment of the present invention may have a structure illustrated in FIGS. 32C and 32D. FIG. 32C is a top view of a transistor 111. A cross section in the direction of dashed-dotted line K1-K2 in FIG. 32C is illustrated in FIG. 32D. A cross section in the direction of dashed-dotted line K3-K4 in FIG. 32C is illustrated in FIG. 33A. The direction of dashed-dotted line K1-K2 is referred to as a channel length direction, and the direction of dashed-dotted line K3-K4 is referred to as a channel width direction.

The transistor 111 includes the insulating layer 120 in contact with the substrate 115; a stack of the oxide semiconductor layers 130a and 130b in contact with the insulating layer 120; the conductive layers 141 and 151 electrically connected to the stack; the oxide semiconductor layer 130c in contact with the stack and the conductive layers 141 and 151; the insulating layer 160 in contact with the oxide semiconductor layer 130c; the conductive layer 170 in contact with the insulating layer 160; the insulating layer 175 in contact with the stack, the conductive layers 141 and 151, the oxide semiconductor layer 130c, the insulating layer 160, and the conductive layer 170; the insulating layer 180 in contact with the insulating layer 175; and the conductive layers 142 and 152 electrically connected to the conductive layers 141 and 151, respectively, through openings provided in the insulating layers 175 and 180. The transistor 111 may further include, for example, an insulating layer (planarization film) in contact with the insulating layer 180 and the conductive layers 142 and 152 as necessary.

The transistor 111 has the same structure as the transistor 105 except that the oxide semiconductor layer 130 includes two layers (the oxide semiconductor layers 130a and 130b)

in the regions 231 and 232, that the oxide semiconductor layer 130 includes three layers (the oxide semiconductor layers 130a to 130c) in the region 233, and that part of the oxide semiconductor layer (the oxide semiconductor layer 130c) exists between the insulating layer 160 and the conductive layers 141 and 151.

Figure 32E:
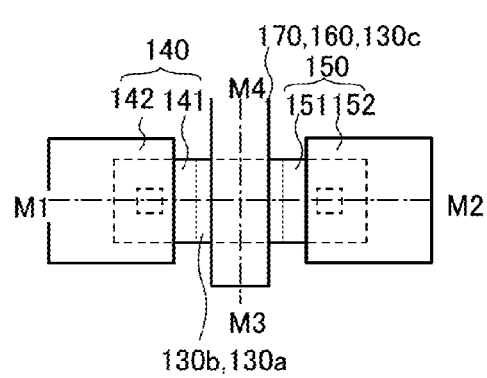
Figure 32F:
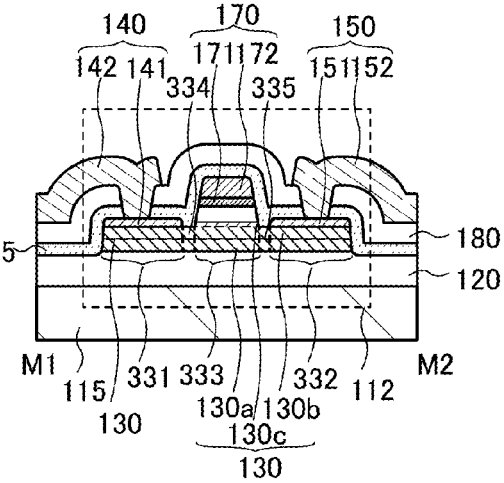

The transistor in one embodiment of the present invention may have a structure illustrated in FIGS. 32E and 32F. FIG. 32E is a top view of a transistor 112. A cross section in the direction of dashed-dotted line M1-M2 in FIG. 32E is illustrated in FIG. 32F. A cross section in the direction of dashed-dotted line M3-M4 in FIG. 32E is illustrated in FIG. 33A. The direction of dashed-dotted line M1-M2 is referred to as a channel length direction, and the direction of dashed-dotted line M3-M4 is referred to as a channel width direction.

The transistor 112 has the same structure as the transistor 106 except that the oxide semiconductor layer 130 includes two layers (the oxide semiconductor layers 130a and 130b) in the regions 331, 332, 334, and 335 and that the oxide semiconductor layer 130 includes three layers (the oxide semiconductor layers 130a to 130c) in the region 333.

Figure 33C:
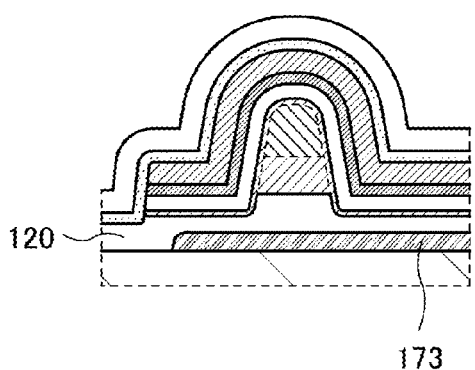
Figure 33D:
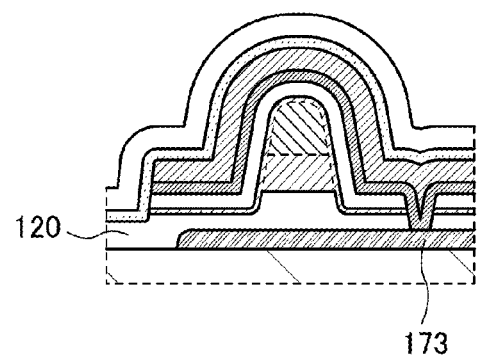
Figure 34A:
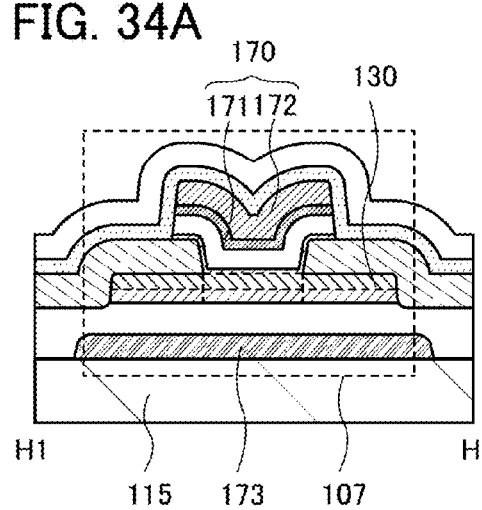
FIGS. 34A to 34F each illustrate a cross section of a transistor in a channel length direction.
Figure 34B:
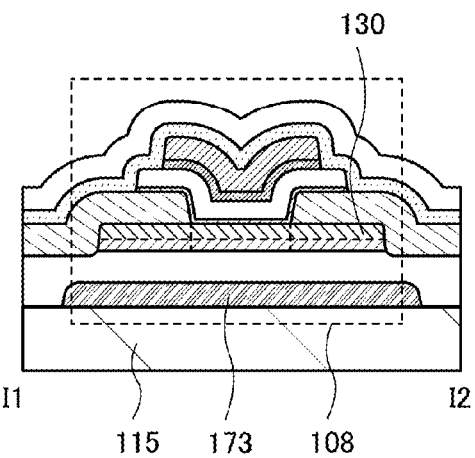
Figure 34C:
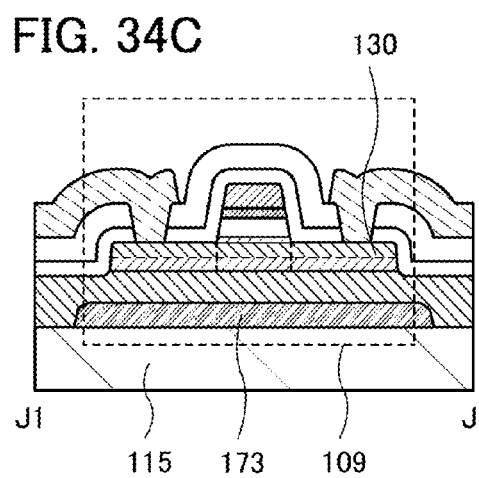
Figure 34D:
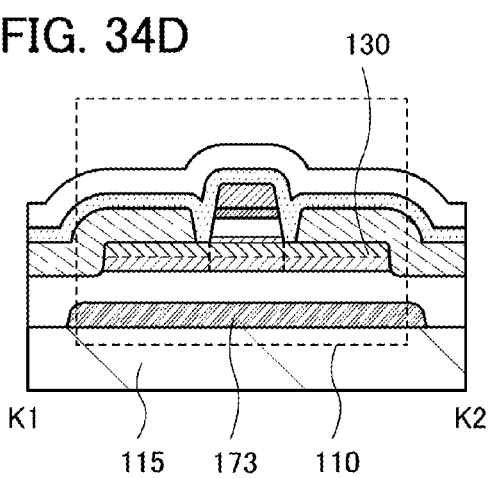
Figure 34E:
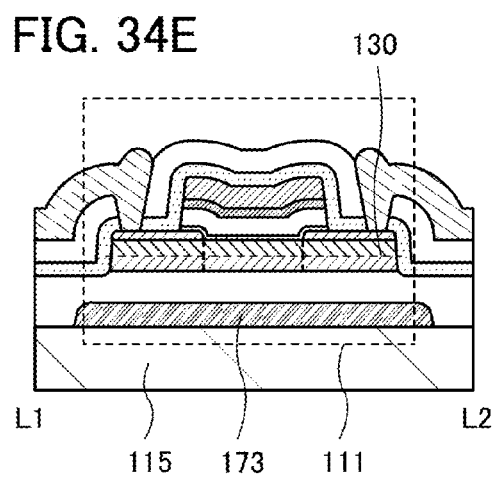
Figure 34F:
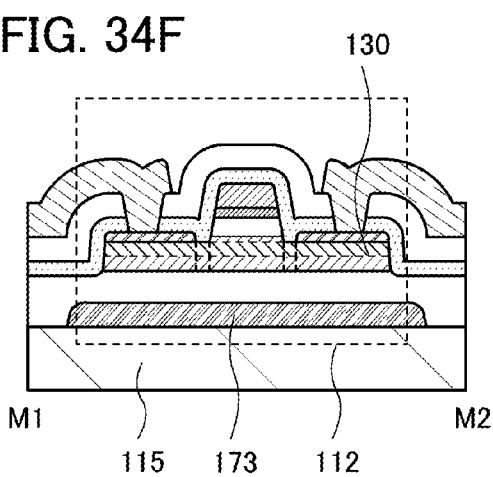

The transistor in one embodiment of the present invention may include the conductive layer 173 between the oxide semiconductor layer 130 and the substrate 115 as illustrated in cross-sectional views in the channel length direction in FIGS. 34A to 34F and cross-sectional views in the channel width direction in FIGS. 33C and 33D. When the conductive layer is used as a second gate electrode layer (back gate), the on-state current can be increased or the threshold voltage can be controlled. In the cross-sectional views in FIGS. 34A to 34F, the width of the conductive layer 173 may be shorter than that of the oxide semiconductor layer 130. Moreover, the width of the conductive layer 173 may be shorter than that of the conductive layer 170.

Figure 35A:
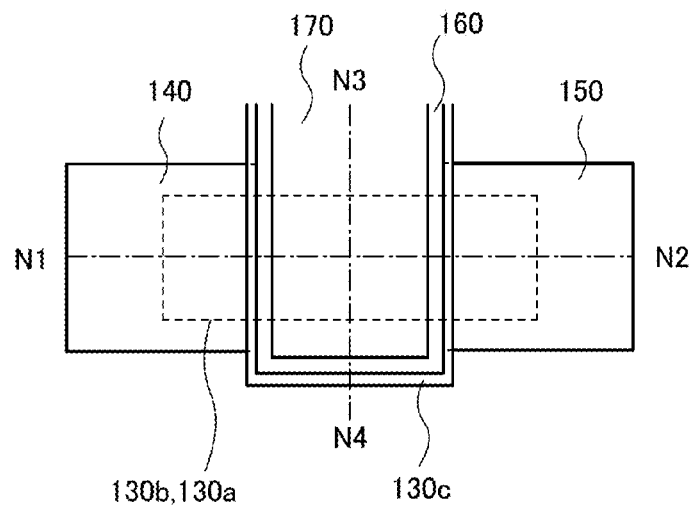
FIGS. 35A and 35B are a top view and cross-sectional views illustrating a transistor.
Figure 35B:
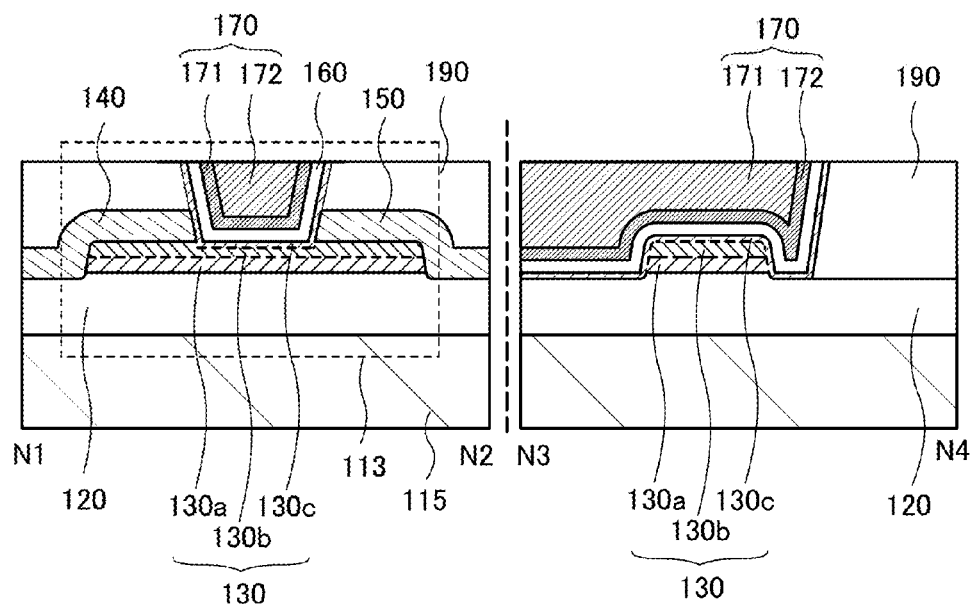

The transistor in one embodiment of the present invention may have a structure illustrated in FIGS. 35A and 35B. FIG. 35A is a top view and FIG. 35B is a cross-sectional view taken along dashed-dotted line N1-N2 and dashed-dotted line N3-N4 in FIG. 35A. Note that for simplification of the drawing, some components are not illustrated in the top view in FIG. 35A.

A transistor 113 illustrated in FIGS. 35A and 35B includes the substrate 115, the insulating layer 120 over the substrate 115, the oxide semiconductor layer 130 (the oxide semiconductor layer 130a, the oxide semiconductor layer 130b, and the oxide semiconductor layer 130c) over the insulating layer 120, the conductive layers 140 and 150 which are in contact with the oxide semiconductor layer 130 and are apart from each other, the insulating layer 160 in contact with the oxide semiconductor layer 130c, and the conductive layer 170 in contact with the insulating layer 160. Note that the oxide semiconductor layer 130c, the insulating layer 160, and the conductive layer 170 are provided in an opening which is provided in the insulating layer 190 over the transistor 113 and reaches the oxide semiconductor layers 130a and 130b and the insulating layer 120.

The transistor 113 has a smaller region in which a conductor serving as a source electrode or a drain electrode overlaps with a conductor serving as a gate electrode than the other transistors described above; thus, the parasitic capacitance in the transistor 113 can be reduced. Therefore, the transistor 113 is preferable as a component of a circuit for which high-speed operation is needed. As illustrated in FIG. 35B, a top surface of the transistor 113 is preferably planarized by a chemical mechanical polishing (CMP) method or the like, but is not necessarily planarized.

Figure 36A:
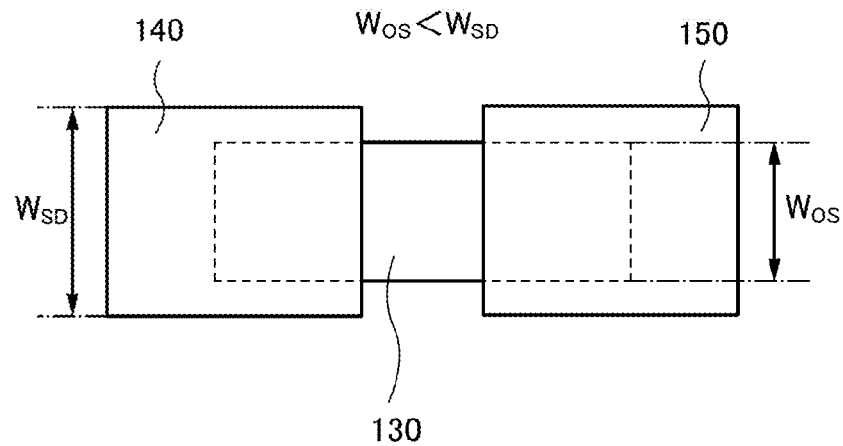
FIGS. 36A to 36C are top views each illustrating a transistor.
Figure 36B:
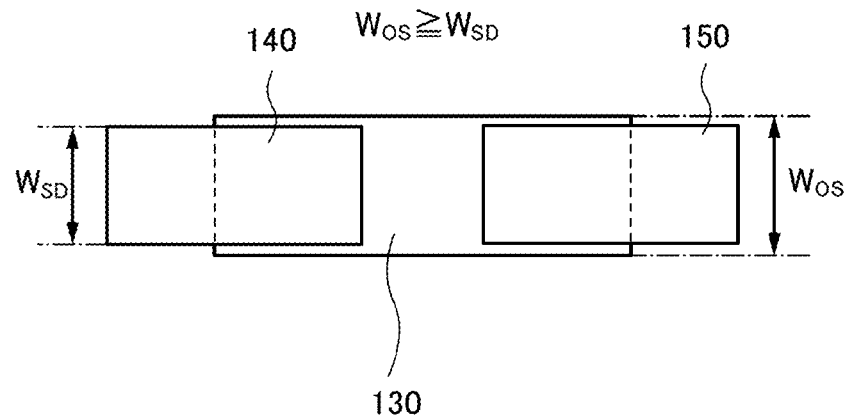
Figure 36C:
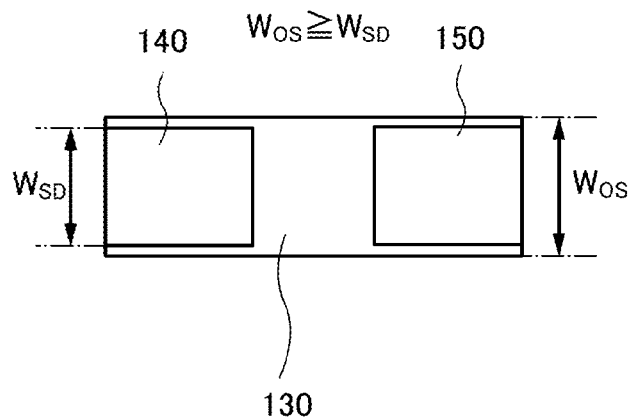

As shown in the top views in FIGS. 36A and 36B (showing only the oxide semiconductor layer 130, the conductive layer 140, and the conductive layer 150), the widths ($W_{SD}$) of the conductive layer 140 (source electrode layer) and the conductive layer 150 (drain electrode layer) in the transistor of one embodiment of the present invention may be either longer than or shorter than the width ($W_{OS}$) of the oxide semiconductor layer 130. When $W_{OS} \geq W_{SD}$ ($W_{SD}$ is less than or equal to $W_{OS}$) is satisfied, a gate electric field is easily applied to the entire oxide semiconductor layer 130, so that electrical characteristics of the transistor can be improved. As illustrated in FIG. 36C, the conductive layers 140 and 150 may be formed only in a region that overlaps with the oxide semiconductor layer 130.

In the transistor in one embodiment of the present invention (any of the transistors 101 to 113), the conductive layer 170 functioning as a gate electrode layer electrically surrounds the oxide semiconductor layer 130 in the channel width direction with the insulating layer 160 functioning as a gate insulating film positioned therebetween. This structure increases the on-state current. Such a transistor structure is referred to as a surrounded channel (s-channel) structure.

In the transistor including the oxide semiconductor layers 130a and 130b and the transistor including the oxide semiconductor layers 130a to 130c, selecting appropriate materials for the two or three layers forming the oxide semiconductor layer 130 makes current flow to the oxide semiconductor layer 130b. Since current flows to the oxide semiconductor layer 130b, the current is hardly influenced by interface scattering, leading to high on-state current. Thus, increasing the thickness of the oxide semiconductor layer 130b improves the on-state current in some cases.

With the above structure, the electrical characteristics of the transistor can be improved.

The structures described in this embodiment can be used in appropriate combination with any of the structures described in the other embodiments.

Embodiment 3

In this embodiment, components of the transistors described in Embodiment 2 will be described in detail.

As the substrate 115, a glass substrate, a quartz substrate, a semiconductor substrate, a ceramic substrate, a metal substrate with an insulated surface, or the like can be used. Alternatively, a silicon substrate provided with a transistor, a photodiode, or the like can be used, and an insulating layer, a wiring, a conductor functioning as a contact plug, and the like may be provided over the silicon substrate. Note that when p-channel transistors are formed using the silicon substrate, a silicon substrate with n⁻-type conductivity is preferably used. Alternatively, an SOI substrate including an n⁻-type or i-type silicon layer may be used. In the case where a p-channel transistor is formed on the silicon substrate, it is preferable to use a silicon substrate in which a plane where the transistor is formed is a (110) plane orientation. Forming a p-channel transistor with the (110) plane can increase mobility.

The insulating layer 120 can have a function of supplying oxygen to the oxide semiconductor layer 130 as well as a function of preventing diffusion of impurities from a component included in the substrate 115. For this reason, the insulating layer 120 is preferably an insulating film containing oxygen and further preferably, the insulating layer 120 is an insulating film containing oxygen in which the oxygen content is higher than that in the stoichiometric composition. The insulating layer 120 is a film in which the amount of released oxygen when converted into oxygen atoms is preferably greater than or equal to $1.0 \times 10^{19}$ atoms/cm$^3$ in TDS analysis. In the TDS analysis, the film surface temperature is higher than or equal to 100° C. and lower than or equal to 700° C., or higher than or equal to 100° C. and lower than or equal to 500° C. In the case where the substrate 115 is provided with another device, the insulating layer 120 also has a function as an interlayer insulating film. In that case, the insulating layer 120 is preferably subjected to planarization treatment such as chemical mechanical polishing (CMP) treatment so as to have a flat surface.

For example, the insulating layer 120 can be formed using an oxide insulating film including aluminum oxide, magnesium oxide, silicon oxide, silicon oxynitride, gallium oxide, germanium oxide, yttrium oxide, zirconium oxide, lanthanum oxide, neodymium oxide, hafnium oxide, tantalum oxide, or the like; a nitride insulating film including silicon nitride, silicon nitride oxide, aluminum nitride, aluminum nitride oxide, or the like; or a mixed material of any of these. The insulating layer 120 may be a stack of any of the above materials.

In this embodiment, detailed description is given mainly on the case where the oxide semiconductor layer 130 of the transistor has a three-layer structure in which the oxide semiconductor layers 130a to 130c are sequentially stacked from the insulating layer 120 side.

Note that in the case where the oxide semiconductor layer 130 is a single layer, a layer corresponding to the oxide semiconductor layer 130b described in this embodiment is used.

In the case where the oxide semiconductor layer 130 has a two-layer structure, a stack in which layers corresponding to the oxide semiconductor layer 130a and the oxide semiconductor layer 130b described in this embodiment are sequentially stacked from the insulating layer 120 side is used. In such a case, the oxide semiconductor layers 130a and 130b can be replaced with each other.

In the case where the oxide semiconductor layer 130 has a layered structure of four or more layers, for example, a structure in which another oxide semiconductor layer is added to the three-layer stack of the oxide semiconductor layer 130 described in this embodiment can be employed.

For the oxide semiconductor layer 130b, for example, an oxide semiconductor whose electron affinity (an energy difference between a vacuum level and the conduction band minimum) is higher than those of the oxide semiconductor layers 130a and 130c is used. The electron affinity can be obtained by subtracting an energy difference between the conduction band minimum and the valence band maximum (what is called an energy gap) from an energy difference between the vacuum level and the valence band maximum (what is called an ionization potential).

The oxide semiconductor layers 130a and 130c each contain one or more kinds of metal elements contained in the oxide semiconductor layer 130b. For example, the oxide semiconductor layers 130a and 130c are preferably formed using an oxide semiconductor whose conduction band minimum is closer to a vacuum level than that of the oxide semiconductor layer 130b by 0.05 eV or more, 0.07 eV or more, 0.1 eV or more, or 0.15 eV or more and 2 eV or less, 1 eV or less, 0.5 eV or less, or 0.4 eV or less.

In such a structure, when an electric field is applied to the conductive layer 170, a channel is formed in the oxide semiconductor layer 130b whose conduction band minimum is the lowest in the oxide semiconductor layer 130. Therefore, the oxide semiconductor layer 130b can be regarded as having a region serving as a semiconductor, while the oxide semiconductor layer 130a and the oxide semiconductor layer 130c can be regarded as having a region serving as an insulator or a semi-insulator.

Furthermore, since the oxide semiconductor layer 130a contains one or more kinds of metal elements contained in the oxide semiconductor layer 130b, an interface state is unlikely to be formed at the interface between the oxide semiconductor layers 130a and 130b, compared with the interface between the oxide semiconductor layer 130b and the insulating layer 120 on the assumption that the oxide semiconductor layer 130b is in contact with the insulating layer 120. The interface state sometimes forms a channel; therefore, the threshold voltage of the transistor is changed in some cases. Thus, with the oxide semiconductor layer 130a, variations in electrical characteristics of the transistor, such as a threshold voltage, can be reduced. Moreover, the reliability of the transistor can be improved.

Since the oxide semiconductor layer 130c contains one or more kinds of metal elements contained in the oxide semiconductor layer 130b, scattering of carriers is unlikely to occur at the interface between the oxide semiconductor layers 130b and 130c, compared with the interface between the oxide semiconductor layer 130b and the gate insulating film (the insulating layer 160) on the assumption that the oxide semiconductor layer 130b is in contact with the gate insulating film. Thus, with the oxide semiconductor layer 130c, the field-effect mobility of the transistor can be increased.

For the oxide semiconductor layers 130a and 130c, for example, a material containing Al, Ti, Ga, Ge, Y, Zr, Sn, La, Ce, or Hf with a higher atomic ratio than that used for the oxide semiconductor layer 130b can be used. Specifically, the atomic ratio of any of the above metal elements in the oxide semiconductor layers 130a and 130c is 1.5 times or more, preferably 2 times or more, further preferably 3 times or more as large as that in the oxide semiconductor layer 130b. Any of the above metal elements is strongly bonded to oxygen and thus has a function of suppressing generation of an oxygen vacancy in the oxide semiconductor layers 130a and 130c. That is, an oxygen vacancy is less likely to be generated in the oxide semiconductor layers 130a and 130c than in the oxide semiconductor layer 130b.

An oxide semiconductor that can be used for each of the oxide semiconductor layers 130a to 130c preferably contains at least In or Zn. Both In and Zn are preferably contained. In order to reduce variations in electrical characteristics of the transistor including the oxide semiconductor, the oxide semiconductor preferably contains a stabilizer in addition to In and Zn.

Examples of a stabilizer include Ga, Sn, Hf, Al, and Zr. Other examples of the stabilizer include lanthanoids such as La, Ce, Pr, Nd, Sm, Eu, Gd, Tb, Dy, Ho, Er, Tm, Yb, and Lu.

As the oxide semiconductor, for example, any of the following can be used: indium oxide, tin oxide, gallium oxide, zinc oxide, an In—Zn oxide, a Sn—Zn oxide, an Al—Zn oxide, a Zn—Mg oxide, a Sn—Mg oxide, an In—Mg oxide, an In—Ga oxide, an In—Ga—Zn oxide, an In—Al—Zn oxide, an In—Sn—Zn oxide, a Sn—Ga—Zn oxide, an Al—Ga—Zn oxide, a Sn—Al—Zn oxide, an In—Hf—Zn oxide, an In—La—Zn oxide, an In—Ce—Zn oxide, an In—Pr—Zn oxide, an In—Nd—Zn oxide, an In—Sm—Zn oxide, an In—Eu—Zn oxide, an In—Gd—Zn oxide, an In—Tb—Zn oxide, an In—Dy—Zn oxide, an In—Ho—Zn oxide, an In—Er—Zn oxide, an In—Tm—Zn oxide, an In—Yb—Zn oxide, an In—Lu—Zn oxide, an In—Sn—Ga—Zn oxide, an In—Hf—Ga—Zn oxide, an In—Al—Ga—Zn oxide, an In—Sn—Al—Zn oxide, an In—Sn—Hf—Zn oxide, and an In—Hf—Al—Zn oxide.

For example, an In—Ga—Zn oxide means an oxide containing In, Ga, and Zn as its main components. The In—Ga—Zn oxide may contain another metal element in addition to In, Ga, and Zn. In this specification, a film containing the In—Ga—Zn oxide is also referred to as an IGZO film.

A material represented by $InMO_3(ZnO)_m$ (m>0, where m is not an integer) may be used. Note that M represents one or more metal elements selected from Ga, Y, Zr, La, Ce, and Nd. Alternatively, a material represented by $In_2SnO_5(ZnO)_n$ (n>0, where n is an integer) may be used.

Note that when each of the oxide semiconductor layers 130a to 130c is an In-M-Zn oxide containing at least indium, zinc, and M (M is a metal such as Al, Ti, Ga, Ge, Y, Zr, Sn, La, Ce, or Hf), in the case where the oxide semiconductor layer 130a has an atomic ratio of In to M and Zn which is $x_1:y_1:z_1$, the oxide semiconductor layer 130b has an atomic ratio of In to M and Zn which is $x_2:y_2:z_2$, and the oxide semiconductor layer 130c has an atomic ratio of In to M and Zn which is $x_3:y_3:z_3$, each of $y_1/x_1$ and $y_3/x_3$ is preferably larger than $y_2/x_2$. Each of $y_1/x_1$ and $y_3/x_3$ is 1.5 times or more, preferably 2 times or more, more preferably 3 times or more as large as $y_2/x_2$. At this time, when $y_2$ is greater than or equal to $x_2$ in the oxide semiconductor layer 130b, the transistor can have stable electrical characteristics. However, when $y_2$ is 3 times or more as large as $x_2$, the field-effect mobility of the transistor is reduced; accordingly, $y_2$ is preferably smaller than 3 times $x_2$.

In the case where Zn and O are not taken into consideration, the proportion of In and the proportion of M in each of the oxide semiconductor layers 130a and 130c are preferably less than 50 atomic % and greater than or equal to 50 atomic %, respectively, more preferably less than 25 atomic % and greater than or equal to 75 atomic %, respectively. Furthermore, in the case where Zn and O are not taken into consideration, the proportion of In and the proportion of M in the oxide semiconductor layer 130b are preferably greater than or equal to 25 atomic % and less than 75 atomic %, respectively, more preferably greater than or equal to 34 atomic % and less than 66 atomic %, respectively.

The indium content in the oxide semiconductor layer 130b is preferably higher than those in the oxide semiconductor layers 130a and 130c. In an oxide semiconductor, the s orbital of heavy metal mainly contributes to carrier transfer, and when the proportion of In in the oxide semiconductor is increased, overlap of the s orbitals is likely to be increased. Therefore, an oxide in which the proportion of In is higher than that of M has higher mobility than an oxide in which the proportion of In is equal to or lower than that of M. Thus, with the use of an oxide having a high content of indium for the oxide semiconductor layer 130b, a transistor having high field-effect mobility can be obtained.

The thickness of the oxide semiconductor layer 130a is greater than or equal to 3 nm and less than or equal to 100 nm, preferably greater than or equal to 5 nm and less than or equal to 50 nm, more preferably greater than or equal to 5 nm and less than or equal to 25 nm. The thickness of the oxide semiconductor layer 130b is greater than or equal to 3 nm and less than or equal to 200 nm, preferably greater than or equal to 5 nm and less than or equal to 150 nm, more preferably greater than or equal to 10 nm and less than or equal to 100 nm. The thickness of the oxide semiconductor layer 130c is greater than or equal to 1 nm and less than or equal to 50 nm, preferably greater than or equal to 2 nm and less than or equal to 30 nm, more preferably greater than or equal to 3 nm and less than or equal to 15 nm. In addition, the oxide semiconductor layer 130b is preferably thicker than the oxide semiconductor layer 130c.

In order that a transistor in which a channel is formed in an oxide semiconductor layer have stable electrical characteristics, it is effective to make the oxide semiconductor layer intrinsic (i-type) or substantially intrinsic by reducing the concentration of impurities in the oxide semiconductor layer. The term "substantially intrinsic" refers to a state where an oxide semiconductor layer has a carrier density lower than $1\times10^{19}/cm^3$, lower than $1\times10^{15}/cm^3$, lower than $1\times10^{13}/cm^3$, or lower than $1\times10^{8}/cm^3$, and higher than or equal to $1\times10^{-9}/cm^3$.

In the oxide semiconductor layer, hydrogen, nitrogen, carbon, silicon, and a metal element other than main components of the oxide semiconductor layer are impurities. For example, hydrogen and nitrogen form donor levels to increase the carrier density, and silicon forms impurity levels in the oxide semiconductor layer. The impurity levels serve as traps and might cause deterioration of electrical characteristics of the transistor. Therefore, it is preferable to reduce the concentration of the impurities in the oxide semiconductor layers 130a to 130c and at interfaces between the oxide semiconductor layers.

In order to make the oxide semiconductor layer intrinsic or substantially intrinsic, the oxide semiconductor layer is controlled to have a region in which the concentration of hydrogen estimated by secondary ion mass spectrometry (SIMS) is lower than or equal to $2\times10^{20}$ atoms/cm$^3$, preferably lower than or equal to $5\times10^{19}$ atoms/cm$^3$, more preferably lower than or equal to $1\times10^{19}$ atoms/cm$^3$, still more preferably and lower than or equal to $5\times10^{18}$ atoms/cm$^3$ and is higher than or equal to $1\times10^{17}$ atoms/cm$^3$. In addition, the oxide semiconductor layer is controlled to have a region in which the concentration of nitrogen is lower than $5\times10^{19}$ atoms/cm$^3$, preferably lower than or equal to $5\times10^{18}$ atoms/cm$^3$, more preferably lower than or equal to $1\times10^{18}$ atoms/cm$^3$, still more preferably lower than or equal to $5\times10^{17}$ atoms/cm$^3$ and is higher than or equal to $5\times10^{16}$ atoms/cm$^3$.

The high concentration of silicon or carbon might reduce the crystallinity of the oxide semiconductor layer. In order not to lower the crystallinity of the oxide semiconductor layer, the oxide semiconductor layer is controlled to have a region in which the concentration of silicon is lower than $1\times10^{19}$ atoms/cm$^3$, preferably lower than $5\times10^{18}$ atoms/cm$^3$ and is higher than or equal to $1\times10^{18}$ atoms/cm$^3$. Furthermore, the oxide semiconductor layer is controlled to have a region in which the concentration of carbon is lower than $1\times10^{19}$ atoms/cm$^3$, preferably lower than $5\times10^{18}$ atoms/cm$^3$, more preferably lower than $1\times10^{18}$ atoms/cm$^3$ and is higher than or equal to $6\times10^{17}$ atoms/cm$^3$.

As described above, a transistor in which a highly purified oxide semiconductor film is used for a channel formation region exhibits an extremely low off-state current. When voltage between a source and a drain is set at about 0.1 V, 5 V, or 10 V, for example, the off-state current per channel width of the transistor can be as low as several yoctoamperes per micrometer to several zeptoamperes per micrometer.

As the gate insulating film of the transistor, an insulating film containing silicon is used in many cases; thus, it is preferable that, as in the transistor of one embodiment of the present invention, a region of the oxide semiconductor layer that serves as a channel not be in contact with the gate insulating film for the above reason. In the case where a channel is formed at the interface between the gate insulating film and the oxide semiconductor layer, scattering of carriers occurs at the interface, so that the field-effect mobility of the transistor is reduced in some cases. Also from the view of the above, it is preferable that the region of the oxide semiconductor layer that serves as a channel be separated from the gate insulating film.

Accordingly, with the oxide semiconductor layer 130 having a layered structure including the oxide semiconductor layers 130a to 130c, a channel can be formed in the oxide semiconductor layer 130b; thus, the transistor can have high field-effect mobility and stable electrical characteristics.

In a band structure, the conduction band minimums of the oxide semiconductor layers 130a to 130c are continuous. This can be understood also from the fact that the compositions of the oxide semiconductor layers 130a to 130c are close to one another and oxygen is easily diffused among the oxide semiconductor layers 130a to 130c. Thus, the oxide semiconductor layers 130a to 130c have a continuous physical property though they have different compositions and form a stack. In the drawings, interfaces between the oxide semiconductor layers of the stack are indicated by dotted lines.

The oxide semiconductor layer 130 in which layers containing the same main components are stacked is formed to have not only a simple layered structure of the layers but also a continuous energy band (here, in particular, a well structure having a U shape in which the conduction band minimums are continuous (U-shape well)). In other words, the layered structure is formed such that there exists no impurity that forms a defect level such as a trap center or a recombination center at each interface. If impurities exist between the stacked oxide semiconductor layers, the continuity of the energy band is lost and carriers disappear by a trap or recombination at the interface.

For example, an In—Ga—Zn oxide whose atomic ratio of In to Ga and Zn is 1:3:2, 1:3:3, 1:3:4, 1:3:6, 1:4:5, 1:6:4, or 1:9:6 can be used for the oxide semiconductor layers 130a and 130c, and an In—Ga—Zn oxide whose atomic ratio of In to Ga and Zn is 1:1:1, 2:1:3, 5:5:6, or 3:1:2 can be used for the oxide semiconductor layer 130b. In each of the oxide semiconductor layers 130a, 130b, and 130c, the proportion of each atom in the atomic ratio varies within a range of ±40% as an error.

The oxide semiconductor layer 130b of the oxide semiconductor layer 130 serves as a well, so that a channel is formed in the oxide semiconductor layer 130b. Since the conduction band minimums are continuous, the oxide semiconductor layer 130 can also be referred to as a U-shaped well. Furthermore, a channel formed to have such a structure can also be referred to as a buried channel.

Note that trap levels due to impurities or defects might be formed in the vicinity of the interface between an insulating layer such as a silicon oxide film and each of the oxide semiconductor layers 130a and 130c. The oxide semiconductor layer 130b can be distanced away from the trap levels owing to the existence of the oxide semiconductor layers 130a and 130c.

However, when the energy differences between the conduction band minimum of the oxide semiconductor layer 130b and the conduction band minimum of each of the oxide semiconductor layers 130a and 130c are small, an electron in the oxide semiconductor layer 130b might reach the trap level by passing over the energy differences. When the electron is trapped in the trap level, negative charge is generated at the interface with the insulating layer, so that the threshold voltage of the transistor is shifted in the positive direction.

The oxide semiconductor layers 130a to 130c preferably include crystal parts. In particular, when crystals with c-axis alignment are used, the transistor can have stable electrical characteristics. Moreover, crystals with c-axis alignment are resistant to bending; therefore, using such crystals can improve the reliability of a semiconductor device using a flexible substrate.

As the conductive layer 140 functioning as a source electrode layer and the conductive layer 150 functioning as a drain electrode layer, for example, a single layer or a stacked layer formed using a material selected from Al, Cr, Cu, Ta, Ti, Mo, W, Ni, Mn, Nd, and Sc and alloys of any of these metal materials can be used. Typically, it is preferable to use Ti, which is particularly easily bonded to oxygen, or W, which has a high melting point and thus allows subsequent processes to be performed at relatively high temperatures. It is also possible to use a stack of any of the above materials and Cu or an alloy such as Cu—Mn, which has low resistance. In the transistors 105, 106, 111, and 112, for example, it is possible to use W for the conductive layers 141 and 151 and use a stack of Ti and Al for the conductive layers 142 and 152.

The above materials are capable of extracting oxygen from an oxide semiconductor film. Therefore, in a region of the oxide semiconductor layer that is in contact with any of the above materials, oxygen is released from the oxide semiconductor layer and an oxygen vacancy is formed. Hydrogen slightly contained in the layer and the oxygen vacancy are bonded to each other, so that the region is markedly changed to an n-type region. Accordingly, the n-type region can serve as a source or a drain of the transistor.

In the case where W is used for the conductive layers 140 and 150, the conductive layers 140 and 150 may be doped with nitrogen. Doping with nitrogen can appropriately lower the capability of extracting oxygen and prevent the n-type region from spreading to a channel region. It is possible to prevent the n-type region from spreading to a channel region also by using a stack of W and an n-type semiconductor layer as the conductive layers 140 and 150 and putting the n-type semiconductor layer in contact with the oxide semiconductor layer. As the n-type semiconductor layer, an In—Ga—Zn oxide, zinc oxide, indium oxide, tin oxide, indium tin oxide, or the like to which nitrogen is added can be used.

The insulating layer 160 functioning as a gate insulating film can be formed using an insulating film containing one or more of aluminum oxide, magnesium oxide, silicon oxide, silicon oxynitride, silicon nitride oxide, silicon nitride, gallium oxide, germanium oxide, yttrium oxide, zirconium oxide, lanthanum oxide, neodymium oxide, hafnium oxide, and tantalum oxide. The insulating layer 160 may be a stack including any of the above materials. The insulating layer 160 may contain La, N, Zr, or the like as an impurity.

An example of a layered structure of the insulating layer 160 is described. The insulating layer 160 includes, for example, oxygen, nitrogen, silicon, or hafnium. Specifically, the insulating layer 160 preferably includes hafnium oxide and silicon oxide or silicon oxynitride.

Hafnium oxide and aluminum oxide have higher dielectric constants than silicon oxide and silicon oxynitride. Therefore, the insulating layer 160 using hafnium oxide or aluminum oxide can have larger thickness than the insulating layer 160 using silicon oxide, so that leakage current due to tunnel current can be reduced. That is, a transistor with a low off-state current can be provided. Moreover, hafnium oxide with a crystalline structure has a higher dielectric constant than hafnium oxide with an amorphous structure. Therefore, it is preferable to use hafnium oxide with a crystalline structure in order to provide a transistor with a low off-state current. Examples of the crystalline structure include a monoclinic crystal structure and a cubic crystal structure. Note that one embodiment of the present invention is not limited to the these examples.

For the insulating layers 120 and 160 in contact with the oxide semiconductor layer 130, a film that releases less nitrogen oxide is preferably used. In the case where the oxide semiconductor is in contact with an insulating layer that releases a large amount of nitrogen oxide, the density of states due to nitrogen oxide increases in some cases. For the insulating layers 120 and 160, for example, an oxide insulating layer such as a silicon oxynitride film or an aluminum oxynitride film that releases less nitrogen oxide can be used.

A silicon oxynitride film that releases less nitrogen oxide is a film of which the amount of released ammonia is larger than the amount of released nitrogen oxide in TDS; the amount of released ammonia is typically greater than or equal to $1 \times 10^{18}$ molecules/cm$^3$ and less than or equal to $5 \times 10^{19}$ molecules/cm$^3$. Note that the amount of released ammonia is the amount of ammonia released by heat treatment with which the surface temperature of the film becomes higher than or equal to 50° C. and lower than or equal to 650° C., preferably higher than or equal to 50° C. and lower than or equal to 550° C.

By using the above oxide insulating layer for the insulating layers 120 and 160, a shift in the threshold voltage of the transistor can be reduced, which leads to reduced fluctuations in the electrical characteristics of the transistor.

For the conductive layer 170 functioning as a gate electrode layer, for example, a conductive film formed using Al, Ti, Cr, Co, Ni, Cu, Y, Zr, Mo, Ru, Ag, Mn, Nd, Sc, Ta, or W can be used. Alternatively, an alloy or a conductive nitride of any of these materials may be used. Alternatively, a stack of a plurality of materials selected from these materials, alloys of these materials, and conductive nitrides of these materials may be used. Typically, tungsten, a stack of tungsten and titanium nitride, a stack of tungsten and tantalum nitride, or the like can be used. Alternatively, Cu or an alloy such as Cu—Mn, which has low resistance, or a stack of any of the above materials and Cu or an alloy such as Cu—Mn may be used. In this embodiment, tantalum nitride is used for the conductive layer 171 and tungsten is used for the conductive layer 172 to form the conductive layer 170.

As the insulating layer 175, a silicon nitride film, an aluminum nitride film, or the like containing hydrogen can be used. In the transistors 103, 104, 106, 109, 110, and 112 described in Embodiment 2, when an insulating film containing hydrogen is used as the insulating layer 175, part of the oxide semiconductor layer can have n-type conductivity. In addition, a nitride insulating film functions as a blocking film against moisture and the like and can improve the reliability of the transistor.

An aluminum oxide film can also be used as the insulating layer 175. It is particularly preferable to use an aluminum oxide film as the insulating layer 175 in the transistors 101, 102, 105, 107, 108, and 111 described in Embodiment 2. The aluminum oxide film has a significant effect of blocking both oxygen and impurities such as hydrogen and moisture. Accordingly, during and after the manufacturing process of the transistor, the aluminum oxide film can suitably function as a protective film that has effects of preventing entry of impurities such as hydrogen and moisture into the oxide semiconductor layer 130, preventing release of oxygen from the oxide semiconductor layer, and preventing unnecessary release of oxygen from the insulating layer 120. Furthermore, oxygen contained in the aluminum oxide film can be diffused into the oxide semiconductor layer.

Furthermore, the insulating layer 180 is preferably formed over the insulating layer 175. The insulating layer 180 can be formed using an insulating film containing one or more of magnesium oxide, silicon oxide, silicon oxynitride, silicon nitride oxide, silicon nitride, gallium oxide, germanium oxide, yttrium oxide, zirconium oxide, lanthanum oxide, neodymium oxide, hafnium oxide, and tantalum oxide. The insulating layer 180 may be a stack of any of the above materials.

Here, like the insulating layer 120, the insulating layer 180 preferably contains oxygen more than that in the stoichiometric composition. Oxygen released from the insulating layer 180 can be diffused into the channel formation region in the oxide semiconductor layer 130 through the insulating layer 160, so that oxygen vacancies formed in the channel formation region can be filled with oxygen. In this manner, stable electrical characteristics of the transistor can be achieved.

High integration of a semiconductor device requires miniaturization of a transistor. However, it is known that miniaturization of a transistor causes deterioration of electrical characteristics of the transistor. In particular, a decrease in channel width causes a reduction in on-state current.

In the transistors 107 to 112 in one embodiment of the present invention, the oxide semiconductor layer 130c is formed to cover the oxide semiconductor layer 130b where a channel is formed; thus, a channel formation layer is not in contact with the gate insulating film. Accordingly, scattering of carriers at the interface between the channel formation layer and the gate insulating film can be reduced and the on-state current of the transistor can be increased.

In the transistor in one embodiment of the present invention, as described above, the gate electrode layer (the conductive layer 170) is formed to electrically surround the oxide semiconductor layer 130 in the channel width direction; accordingly, a gate electric field is applied to the oxide semiconductor layer 130 in a direction perpendicular to its side surface in addition to a direction perpendicular to its top surface. In other words, a gate electric field is applied to the entire channel formation layer and an effective channel width is increased, leading to a further increase in on-state current.

Furthermore, in the transistor in one embodiment of the present invention in which the oxide semiconductor layer 130 has a two-layer structure or a three-layer structure, since the oxide semiconductor layer 130b where a channel is formed is provided over the oxide semiconductor layer 130a, an interface state is less likely to be formed. In the transistor in one embodiment of the present invention in which the oxide semiconductor layer 130 has a three-layer structure, since the oxide semiconductor layer 130b is positioned at the middle of the three-layer structure, the influence of an impurity that enters from upper and lower layers on the oxide semiconductor layer 130b can also be eliminated. Therefore, the transistor can achieve not only the increase in on-state current but also stabilization of the threshold voltage and a reduction in S value (subthreshold value). Thus, current at a gate voltage VG of 0 V can be reduced and power consumption can be reduced. In addition, since the threshold voltage of the transistor becomes stable, long-term reliability of the semiconductor device can be improved. Furthermore, the transistor in one embodiment of the present invention is suitable for a highly integrated semiconductor device because deterioration of electrical characteristics due to miniaturization is reduced.

Although the variety of films such as the metal films, the semiconductor films, and the inorganic insulating films that are described in this embodiment typically can be formed by sputtering or plasma-enhanced CVD, such films may be formed by another method such as thermal CVD. Examples of the thermal CVD include metal organic chemical vapor deposition (MOCVD) and atomic layer deposition (ALD).

Since plasma is not used for deposition, thermal CVD has an advantage that no defect due to plasma damage is generated.

Deposition by thermal CVD may be performed in such a manner that a source gas and an oxidizer are supplied to the chamber at the same time, the pressure in the chamber is set to an atmospheric pressure or a reduced pressure, and reaction is caused in the vicinity of the substrate or over the substrate.

Deposition by ALD is performed in such a manner that the pressure in a chamber is set to an atmospheric pressure or a reduced pressure, source gases for reaction are introduced into the chamber and reacted, and then the sequence of gas introduction is repeated. An inert gas (e.g., argon or nitrogen) may be introduced as a carrier gas with the source gases. For example, two or more kinds of source gases may be sequentially supplied to the chamber. In that case, after reaction of a first source gas, an inert gas is introduced, and then a second source gas is introduced so that the source gases are not mixed. Alternatively, the first source gas may be exhausted by vacuum evacuation instead of introduction of the inert gas, and then the second source gas may be introduced. The first source gas is adsorbed on the surface of the substrate and reacted to form a first layer, and then, the second source gas introduced is absorbed and reacted. As a result, a second layer is stacked over the first layer, so that a thin film is formed. The sequence of gas introduction is controlled and repeated more than once until desired thickness is obtained, so that a thin film with excellent step coverage can be formed. The thickness of the thin film can be adjusted by the number of repetition times of the sequence of gas introduction; therefore, ALD makes it possible to accurately adjust thickness and thus is suitable for manufacturing a minute FET.

The variety of films such as the metal film, the semiconductor film, and the inorganic insulating film that have been disclosed in the above embodiments can be formed by thermal CVD such as MOCVD or ALD. For example, in the case where an In—Ga—Zn—O film is formed, trimethylindium (In(CH$_3$)$_3$), trimethylgallium (Ga(CH$_3$)$_3$), and dimethylzinc (Zn(CH$_3$)$_2$) can be used. Without limitation to the above combination, triethylgallium (Ga(C$_2$H$_5$)$_3$) can be used instead of trimethylgallium and diethylzinc (Zn(C$_2$H$_5$)$_2$) can be used instead of dimethylzinc.

For example, in the case where a hafnium oxide film is formed by a deposition apparatus using ALD, two kinds of gases, i.e., ozone (O$_3$) as an oxidizer and a source material gas which is obtained by vaporizing liquid containing a solvent and a hafnium precursor (hafnium alkoxide and a hafnium amide such as tetrakis(dimethylamide)hafnium (TDMAH, Hf[N(CH$_3$)$_2$]$_4$) and tetrakis(ethylmethylamide) hafnium) are used.

For example, in the case where an aluminum oxide film is formed by a deposition apparatus using ALD, two kinds of gases, i.e., H$_2$O as an oxidizer and a source gas which is obtained by vaporizing liquid containing a solvent and an aluminum precursor (e.g., trimethylaluminum (TMA, Al(CH$_3$)$_3$)) are used. Examples of another material include tris(dimethylamide)aluminum, triisobutylaluminum, and aluminum tris(2,2,6,6-tetramethyl-3,5-heptanedionate).

For example, in the case where a silicon oxide film is formed by a deposition apparatus using ALD, hexachlorodisilane is adsorbed on a surface where a film is to be formed, and radicals of an oxidizing gas (e.g., O$_2$ or dinitrogen monoxide) are supplied to react with an adsorbate.

For example, in the case where a tungsten film is formed by a deposition apparatus using ALD, a WF$_6$ gas and a B$_2$H$_6$ gas are sequentially introduced to form an initial tungsten film, and then a WF$_6$ gas and an H$_2$ gas are sequentially introduced to form a tungsten film. Note that an SiH$_4$ gas may be used instead of a B$_2$H$_6$ gas.

For example, in the case where an oxide semiconductor film, e.g., an In—Ga—Zn—O film is formed by a deposition apparatus using ALD, an In(CH$_3$)$_3$ gas and an O$_3$ gas are sequentially introduced to form an In—O layer, a Ga(CH$_3$)$_3$ gas and an O$_3$ gas are sequentially introduced to form a Ga—O layer, and then a Zn(CH$_3$)$_2$ gas and an O$_3$ gas are sequentially introduced to form a Zn—O layer. Note that the order of these layers is not limited to this example. A mixed compound layer such as an In—Ga—O layer, an In—Zn—O layer, or a Ga—Zn—O layer may be formed by using these gases. Although an H$_2$O gas which is obtained by bubbling with an inert gas such as Ar may be used instead of an O$_3$ gas, it is preferable to use an O$_3$ gas, which does not contain H.

A facing-target-type sputtering apparatus can be used for deposition of an oxide semiconductor layer. Deposition using the facing-target-type sputtering apparatus can also be referred to as vapor deposition SP (VDSP).

When an oxide semiconductor layer is deposited using a facing-target-type sputtering apparatus, plasma damage to the oxide semiconductor layer at the time of deposition can be reduced. Thus, oxygen vacancies in the film can be reduced. In addition, the use of the facing-target-type sputtering apparatus enables low-pressure deposition. Accordingly, the concentration of impurities (e.g., hydrogen, a rare gas (e.g., argon), and water) in a deposited oxide semiconductor layer can be lowered.

The structures described in this embodiment can be used in appropriate combination with any of the structures described in the other embodiments.

Embodiment 4

A structure of an oxide semiconductor film that can be used in one embodiment of the present invention will be described below.

In this specification, the term "parallel" indicates that the angle formed between two straight lines is greater than or equal to −10° and less than or equal to 10°, and accordingly also includes the case where the angle is greater than or equal to −5° and less than or equal to 5°. Furthermore, the term "perpendicular" indicates that the angle formed between two straight lines is greater than or equal to 80° and less than or equal to 100°, and accordingly also includes the case where the angle is greater than or equal to 85° and less than or equal to 95°.

In this specification, trigonal and rhombohedral crystal systems are included in a hexagonal crystal system.

<Structure of Oxide Semiconductor>

The structure of an oxide semiconductor will be described below.

An oxide semiconductor is classified into a single crystal oxide semiconductor and a non-single-crystal oxide semiconductor. Examples of a non-single-crystal oxide semiconductor include a c-axis aligned crystalline oxide semiconductor (CAAC-OS), a polycrystalline oxide semiconductor, a nanocrystalline oxide semiconductor (nc-OS), an amorphous-like oxide semiconductor (a-like OS), and an amorphous oxide semiconductor.

From another perspective, an oxide semiconductor is classified into an amorphous oxide semiconductor and a crystalline oxide semiconductor. Examples of a crystalline oxide semiconductor include a single crystal oxide semiconductor, a CAAC-OS, a polycrystalline oxide semiconductor, and an nc-OS.

An amorphous structure is generally thought to be isotropic and have no non-uniform structure, to be metastable and have no fixed positions of atoms, to have a flexible bond angle, and to have a short-range order but have no long-range order, for example.

In other words, a stable oxide semiconductor cannot be regarded as a completely amorphous oxide semiconductor. Moreover, an oxide semiconductor that is not isotropic (e.g., an oxide semiconductor that has a periodic structure in a microscopic region) cannot be regarded as a completely amorphous oxide semiconductor. In contrast, an a-like OS, which is not isotropic, has an unstable structure that contains a void. Because of its instability, an a-like OS is close to an amorphous oxide semiconductor in terms of physical properties.

<CAAC-OS>

First, a CAAC-OS will be described.

A CAAC-OS is one of oxide semiconductors having a plurality of c-axis aligned crystal parts (also referred to as pellets).

Figure 37A:
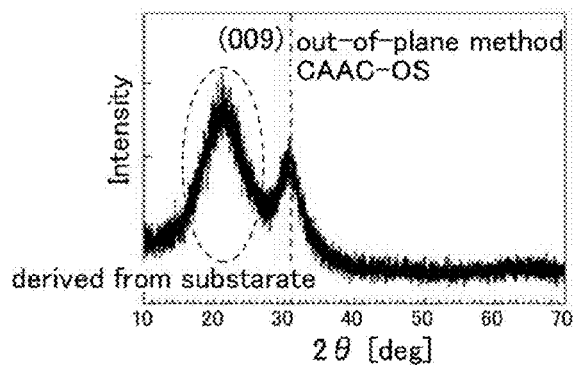
FIGS. 37A to 37E show structural analysis of a CAAC-OS and a single crystal oxide semiconductor by XRD and selected-area electron diffraction patterns of a CAAC-OS.

Analysis of a CAAC-OS by X-ray diffraction (XRD) is described. For example, when the structure of a CAAC-OS including an $InGaZnO_4$ crystal that is classified into the space group R-3 m is analyzed by an out-of-plane method, a peak appears at a diffraction angle (2θ) of around 31° as shown in FIG. 37A. This peak is derived from the (009) plane of the $InGaZnO_4$ crystal, which indicates that crystals in the CAAC-OS have c-axis alignment, and that the c-axes are aligned in a direction substantially perpendicular to a surface over which the CAAC-OS film is formed (also referred to as a formation surface) or the top surface of the CAAC-OS film. Note that a peak sometimes appears at a 2θ of around 36° in addition to the peak at a 2θ of around 31°. The peak at a 2θ of around 36° is derived from a crystal structure that is classified into the space group Fd-3m; thus, this peak is preferably not exhibited in a CAAC-OS.

Figure 37B:
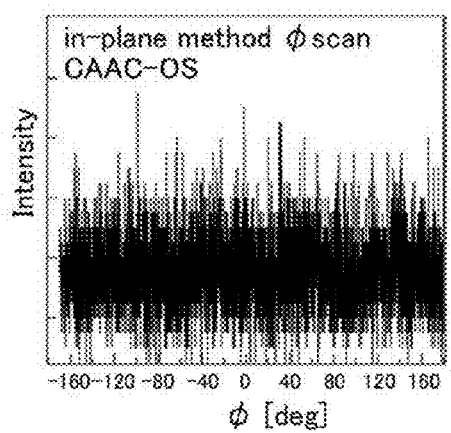
Figure 37C:
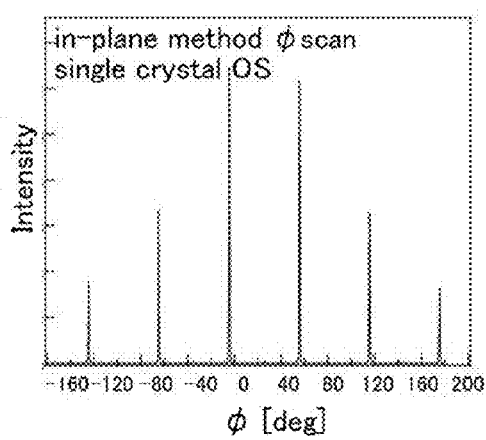

On the other hand, in structural analysis of the CAAC-OS by an in-plane method in which an X-ray is incident on the CAAC-OS in a direction parallel to the formation surface, a peak appears at a 2θ of around 56°. This peak is attributed to the (110) plane of the $InGaZnO_4$ crystal. When analysis (φ scan) is performed with 2θ fixed at around 56° and with the sample rotated using a normal vector to the sample surface as an axis (φ axis), as shown in FIG. 37B, a peak is not clearly observed. In contrast, in the case where single crystal $InGaZnO_4$ is subjected to φ scan with 2θ fixed at around 56°, as shown in FIG. 37C, six peaks which are derived from crystal planes equivalent to the (110) plane are observed. Accordingly, the structural analysis using XRD shows that the directions of a-axes and b-axes are irregularly oriented in the CAAC-OS.

Figure 37D:
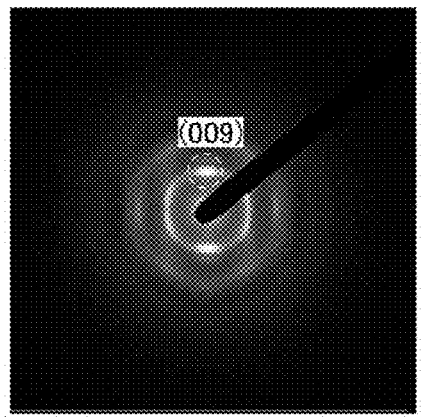
Figure 37E:
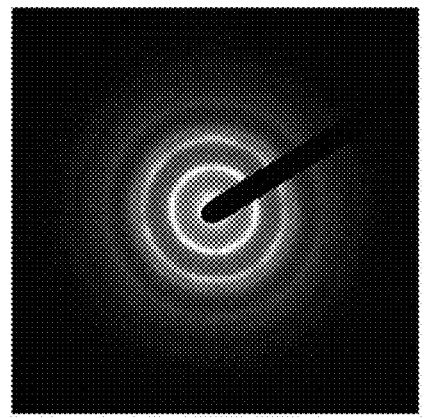

Next, a CAAC-OS analyzed by electron diffraction is described. For example, when an electron beam with a probe diameter of 300 nm is incident on a CAAC-OS including an $InGaZnO_4$ crystal in a direction parallel to the formation surface of the CAAC-OS, a diffraction pattern (also referred to as a selected-area electron diffraction pattern) shown in FIG. 37D can be obtained. In this diffraction pattern, spots derived from the (009) plane of an $InGaZnO_4$ crystal are included. Thus, the electron diffraction also indicates that pellets included in the CAAC-OS have c-axis alignment and that the c-axes are aligned in a direction substantially perpendicular to the formation surface or the top surface of the CAAC-OS. Meanwhile, FIG. 37E shows a diffraction pattern obtained in such a manner that an electron beam with a probe diameter of 300 nm is incident on the same sample in a direction perpendicular to the sample surface. As shown in FIG. 37E, a ring-like diffraction pattern is observed. Thus, the electron diffraction using an electron beam with a probe diameter of 300 nm also indicates that the a-axes and b-axes of the pellets included in the CAAC-OS do not have regular orientation. The first ring in FIG. 37E is considered to be derived from the (010) plane, the (100) plane, and the like of the $InGaZnO_4$ crystal. The second ring in FIG. 37E is considered to be derived from the (110) plane and the like.

In a combined analysis image (also referred to as a high-resolution TEM image) of a bright-field image and a diffraction pattern of a CAAC-OS, which is obtained using a transmission electron microscope (TEM), a plurality of pellets can be observed. However, in the high-resolution TEM image, a boundary between pellets, that is, a grain boundary is not clearly observed in some cases. Thus, in the CAAC-OS, a reduction in electron mobility due to the grain boundary is less likely to occur.

Figure 38A:
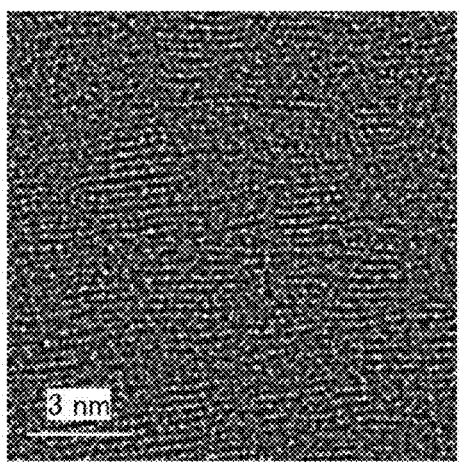
FIGS. 38A to 38E show a cross-sectional TEM image and plan-view TEM images of a CAAC-OS and images obtained through analysis thereof.

FIG. 38A shows a high-resolution TEM image of a cross section of the CAAC-OS which is observed from a direction substantially parallel to the sample surface. The high-resolution TEM image is obtained with a spherical aberration corrector function. The high-resolution TEM image obtained with a spherical aberration corrector function is particularly referred to as a Cs-corrected high-resolution TEM image. The Cs-corrected high-resolution TEM image can be observed with, for example, an atomic resolution analytical electron microscope JEM-ARM200F manufactured by JEOL Ltd.

FIG. 38A shows pellets in which metal atoms are arranged in a layered manner. FIG. 38A proves that the size of a pellet is greater than or equal to 1 nm or greater than or equal to 3 nm. Therefore, the pellet can also be referred to as a nanocrystal (nc). Furthermore, the CAAC-OS can also be referred to as an oxide semiconductor including c-axis aligned nanocrystals (CANC). A pellet reflects unevenness of a formation surface or a top surface of the CAAC-OS, and is parallel to the formation surface or the top surface of the CAAC-OS.

Figure 38B:
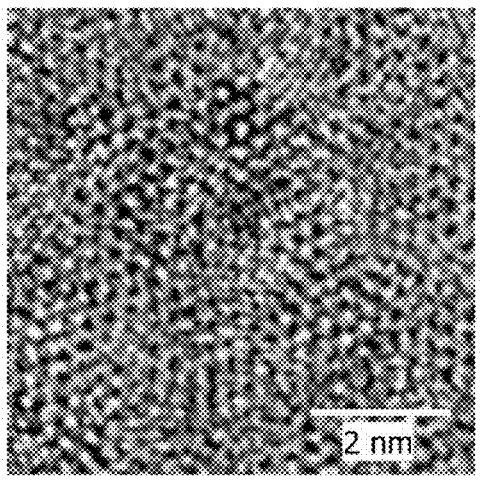
Figure 38C:
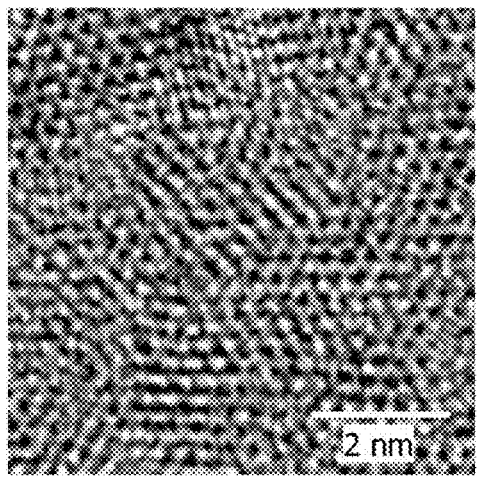
Figure 38D:
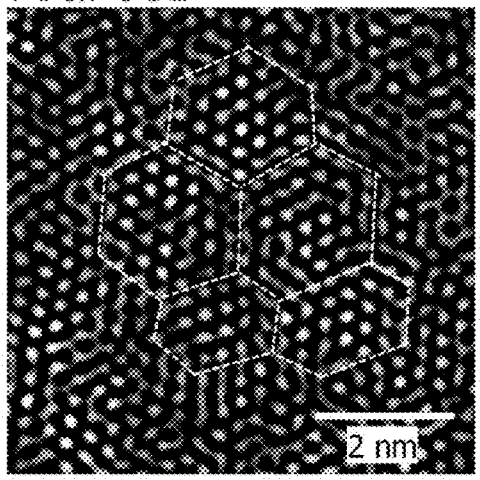
Figure 38E:
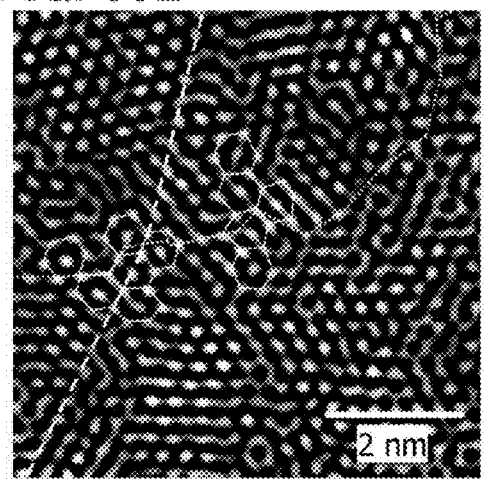

FIGS. 38B and 38C show Cs-corrected high-resolution TEM images of a plane of the CAAC-OS observed from a direction substantially perpendicular to the sample surface. FIGS. 38D and 38E are images obtained through image processing of FIGS. 38B and 38C. The method of image processing is as follows. The image in FIG. 38B is subjected to fast Fourier transform (FFT), so that an FFT image is obtained. Then, mask processing is performed such that a range of from 2.8 $nm^{-1}$ to 5.0 $nm^{-1}$ from the origin in the obtained FFT image remains. After the mask processing, the FFT image is processed by inverse fast Fourier transform (IFFT) to obtain a processed image. The image obtained in this manner is called an FFT filtering image. The FFT filtering image is a Cs-corrected high-resolution TEM image from which a periodic component is extracted, and shows a lattice arrangement.

In FIG. 38D, a portion where a lattice arrangement is broken is denoted with a dashed line. A region surrounded by a dashed line is one pellet. The portion denoted with the dashed line is a junction of pellets. The dashed line draws a hexagon, which means that the pellet has a hexagonal shape. Note that the shape of the pellet is not always a regular hexagon but is a non-regular hexagon in many cases.

In FIG. 38E, a dotted line denotes a portion between a region where a lattice arrangement is well aligned and another region where a lattice arrangement is well aligned, and a dashed line denotes the direction of the lattice arrangement. A clear crystal grain boundary cannot be observed even in the vicinity of the dotted line. When a lattice point in the vicinity of the dotted line is regarded as a center and surrounding lattice points are joined, a distorted hexagon can be formed. That is, a lattice arrangement is distorted so that formation of a crystal grain boundary is inhibited. This is probably because the CAAC-OS can tolerate distortion owing to a low density of the atomic arrangement in an a-b plane direction, an interatomic bond distance changed by substitution of a metal element, and the like.

As described above, the CAAC-OS has c-axis alignment, its pellets (nanocrystals) are connected in an a-b plane direction, and the crystal structure has distortion. For this reason, the CAAC-OS can also be referred to as an oxide semiconductor including a c-axis-aligned a-b-plane-anchored (CAA) crystal.

The CAAC-OS is an oxide semiconductor with high crystallinity. Entry of impurities, formation of defects, or the like might decrease the crystallinity of an oxide semiconductor. This means that the CAAC-OS has small amounts of impurities and defects (e.g., oxygen vacancies).

Note that the impurity means an element other than the main components of the oxide semiconductor, such as hydrogen, carbon, silicon, or a transition metal element. For example, an element (specifically, silicon or the like) having higher strength of bonding to oxygen than a metal element included in an oxide semiconductor extracts oxygen from the oxide semiconductor, which results in disorder of the atomic arrangement and reduced crystallinity of the oxide semiconductor. A heavy metal such as iron or nickel, argon, carbon dioxide, or the like has a large atomic radius (or molecular radius), and thus disturbs the atomic arrangement of the oxide semiconductor and decreases crystallinity.

The characteristics of an oxide semiconductor having impurities or defects might be changed by light, heat, or the like. Impurities contained in an oxide semiconductor might serve as carrier traps or carrier generation sources, for example. For example, oxygen vacancies in an oxide semiconductor might serve as carrier traps or serve as carrier generation sources when hydrogen is captured therein.

A CAAC-OS having small amounts of impurities and oxygen vacancies is an oxide semiconductor with a low carrier density (specifically, lower than $8\times10^{11}/cm^3$, preferably lower than $1\times10^{11}/cm^3$, more preferably lower than $1\times10^{10}/cm^3$, and higher than or equal to $1\times10^{-9}/cm^3$). Such an oxide semiconductor is referred to as a highly purified intrinsic or substantially highly purified intrinsic oxide semiconductor. A CAAC-OS has a low impurity concentration and a low density of defect states. Thus, a CAAC-OS can be referred to as an oxide semiconductor having stable characteristics.

<nc-OS>

Next, an nc-OS is described.

Analysis of an nc-OS by XRD is described. When the structure of an nc-OS is analyzed by an out-of-plane method, a peak indicating orientation does not appear. That is, a crystal of an nc-OS does not have orientation.

Figure 39A:
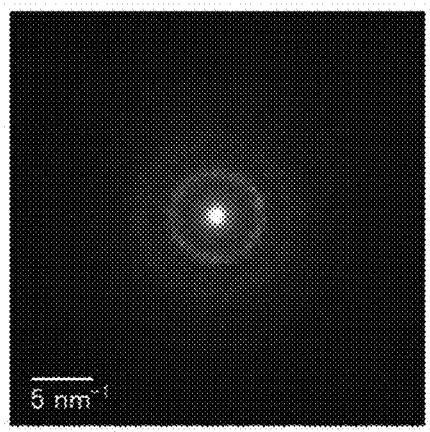
FIGS. 39A to 39D show electron diffraction patterns and a cross-sectional TEM image of an nc-OS.
Figure 39B:
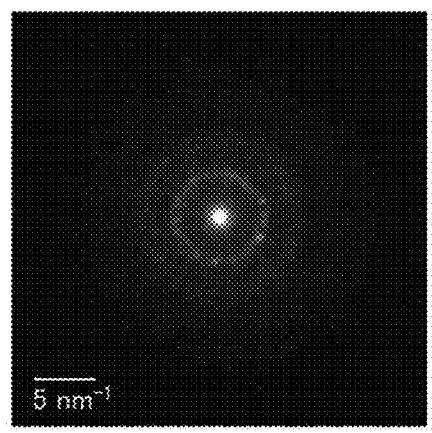

For example, when an electron beam with a probe diameter of 50 nm is incident on a 34-nm-thick region of thinned nc-OS including an InGaZnO$_4$ crystal in a direction parallel to the formation surface, a ring-shaped diffraction pattern (a nanobeam electron diffraction pattern) shown in FIG. 39A is observed. FIG. 39B shows a diffraction pattern obtained when an electron beam with a probe diameter of 1 nm is incident on the same sample. As shown in FIG. 39B, a plurality of spots are observed in a ring-like region. In other words, ordering in an nc-OS is not observed with an electron beam with a probe diameter of 50 nm but is observed with an electron beam with a probe diameter of 1 nm.

Figure 39C:
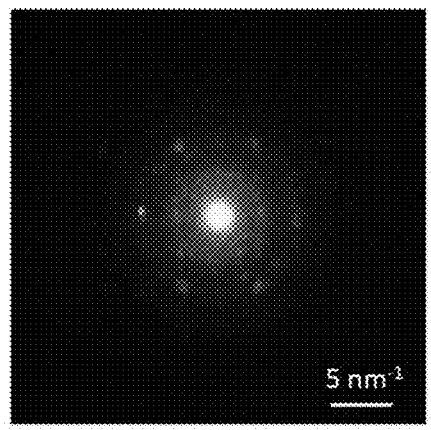

Furthermore, an electron diffraction pattern in which spots are arranged in an approximately hexagonal shape is observed in some cases as shown in FIG. 39C when an electron beam having a probe diameter of 1 nm is incident on a region with a thickness of less than 10 nm. This means that an nc-OS has a well-ordered region, i.e., a crystal, in the range of less than 10 nm in thickness. Note that an electron diffraction pattern having regularity is not observed in some regions because crystals are aligned in various directions.

Figure 39D:
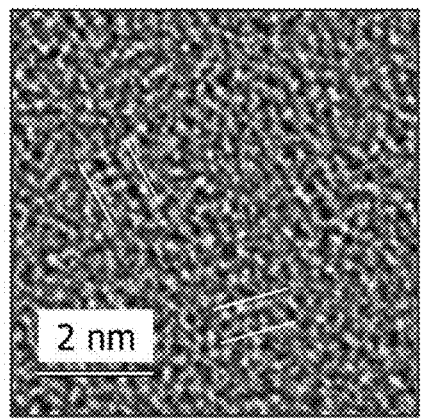

FIG. 39D shows a Cs-corrected high-resolution TEM image of a cross section of an nc-OS observed from the direction substantially parallel to the formation surface. In a high-resolution TEM image, an nc-OS has a region in which a crystal part is observed, such as the part indicated by additional lines in FIG. 39D, and a region in which a crystal part is not clearly observed. In most cases, the size of a crystal part included in the nc-OS is greater than or equal to 1 nm and less than or equal to 10 nm, or specifically, greater than or equal to 1 nm and less than or equal to 3 nm. Note that an oxide semiconductor including a crystal part whose size is greater than 10 nm and less than or equal to 100 nm is sometimes referred to as a microcrystalline oxide semiconductor. In a high-resolution TEM image of the nc-OS, for example, a grain boundary is not clearly observed in some cases. Note that there is a possibility that the origin of the nanocrystal is the same as that of a pellet in a CAAC-OS. Therefore, a crystal part of the nc-OS may be referred to as a pellet in the following description.

As described above, in the nc-OS, a microscopic region (for example, a region with a size greater than or equal to 1 nm and less than or equal to 10 nm, in particular, a region with a size greater than or equal to 1 nm and less than or equal to 3 nm) has a periodic atomic arrangement. There is no regularity of crystal orientation between different pellets in the nc-OS. Thus, the orientation of the whole film is not ordered. Accordingly, the nc-OS cannot be distinguished from an a-like OS or an amorphous oxide semiconductor, depending on an analysis method.

Since there is no regularity of crystal orientation between the pellets (nanocrystals) as mentioned above, the nc-OS can also be referred to as an oxide semiconductor including random aligned nanocrystals (RANC) or an oxide semiconductor including non-aligned nanocrystals (NANC).

The nc-OS is an oxide semiconductor that has high regularity as compared with an amorphous oxide semiconductor. Therefore, the nc-OS has a lower density of defect states than an a-like OS and an amorphous oxide semiconductor. Note that there is no regularity of crystal orientation between different pellets in the nc-OS. Therefore, the nc-OS has a higher density of defect states than the CAAC-OS.

<a-Like OS>

An a-like OS has a structure between those of the nc-OS and the amorphous oxide semiconductor.

Figure 40A:
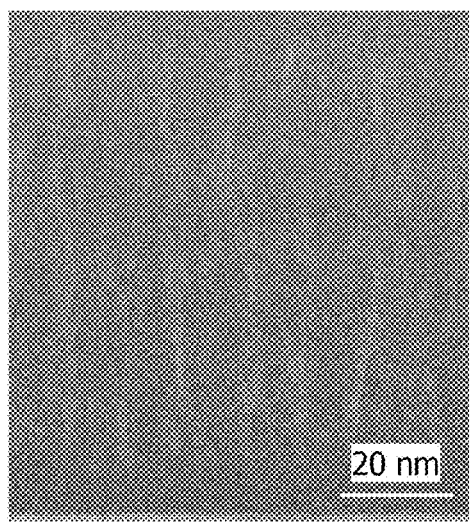
FIGS. 40A and 40B are cross-sectional TEM images of an a-like OS.
Figure 40B:
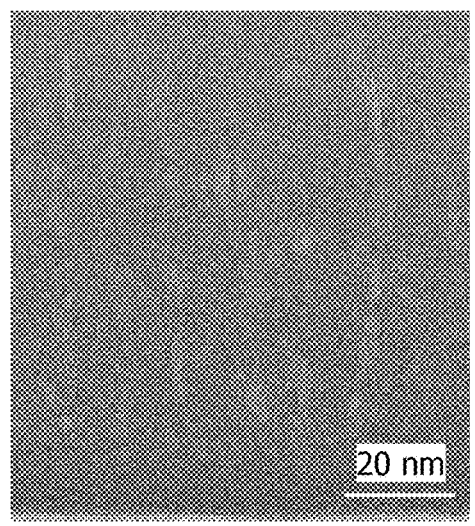

FIGS. 40A and 40B are high-resolution cross-sectional TEM images of an a-like OS. FIG. 40A is the high-resolution cross-sectional TEM image of the a-like OS at the start of the electron irradiation. FIG. 40B is the high-resolution cross-sectional TEM image of a-like OS after the electron (e⁻) irradiation at $4.3 \times 10^8$ e⁻/nm². FIGS. 40A and 40B show that stripe-like bright regions extending vertically are observed in the a-like OS from the start of the electron irradiation. It can be also found that the shape of the bright region changes after the electron irradiation. Note that the bright region is presumably a void or a low-density region.

The a-like OS has an unstable structure because it contains a void. To verify that an a-like OS has an unstable structure as compared with a CAAC-OS and an nc-OS, a change in structure caused by electron irradiation is described below.

An a-like OS, an nc-OS, and a CAAC-OS are prepared as samples. Each of the samples is an In—Ga—Zn oxide.

First, a high-resolution cross-sectional TEM image of each sample is obtained. The high-resolution cross-sectional TEM images show that all the samples have crystal parts.

It is known that a unit cell of an InGaZnO₄ crystal has a structure in which nine layers including three In—O layers and six Ga—Zn—O layers are stacked in the c-axis direction. The distance between the adjacent layers is equivalent to the lattice spacing on the (009) plane (also referred to as d value). The value is calculated to be 0.29 nm from crystal structural analysis. Accordingly, a portion where the spacing between lattice fringes is greater than or equal to 0.28 nm and less than or equal to 0.30 nm is regarded as a crystal part of InGaZnO₄ in the following description. Each of lattice fringes corresponds to the a-b plane of the InGaZnO₄ crystal.

Figure 41:
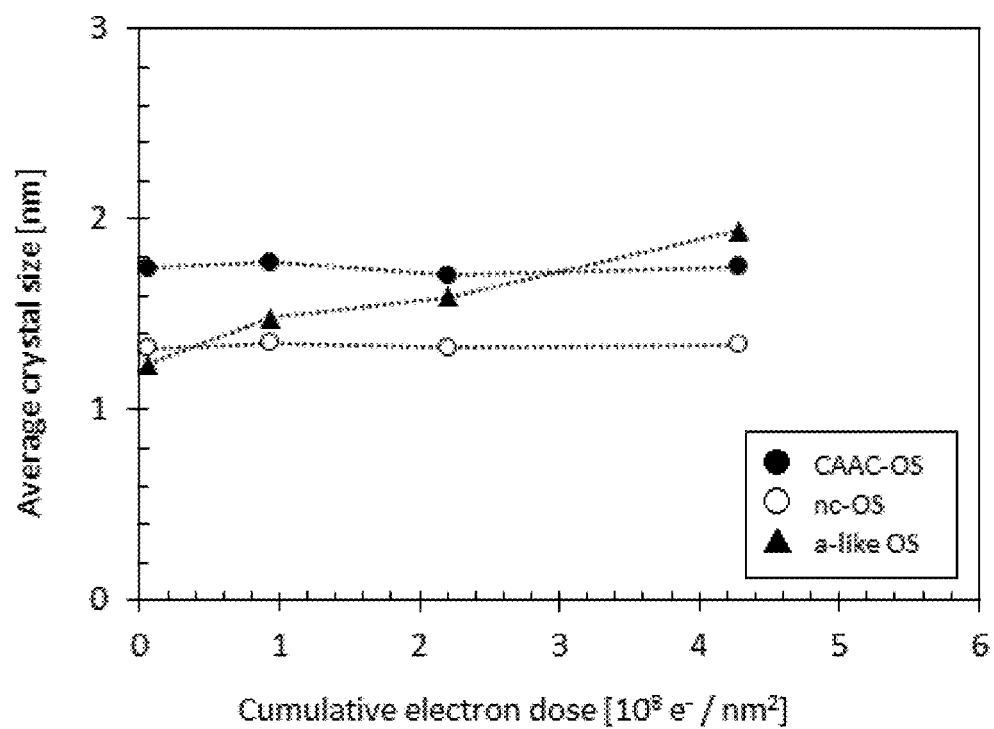
FIG. 41 shows a change of crystal parts of an In—Ga—Zn oxide due to electron irradiation.

FIG. 41 shows change in the average size of crystal parts (at 22 points to 30 points) in each sample. Note that the crystal part size corresponds to the length of a lattice fringe. FIG. 41 indicates that the crystal part size in the a-like OS increases with an increase in the cumulative electron dose in obtaining TEM images, for example. As shown in FIG. 41, a crystal part of approximately 1.2 nm (also referred to as an initial nucleus) at the start of TEM observation grows to a size of approximately 1.9 nm at a cumulative electron (e⁻) dose of $4.2 \times 10^8$ e⁻/nm². In contrast, the crystal part size in the nc-OS and the CAAC-OS shows little change from the start of electron irradiation to a cumulative electron dose of $4.2 \times 10^8$ e⁻/nm². As shown in FIG. 41, the crystal part sizes in an nc-OS and a CAAC-OS are approximately 1.3 nm and approximately 1.8 nm, respectively, regardless of the cumulative electron dose. For the electron beam irradiation and TEM observation, a Hitachi H-9000NAR transmission electron microscope was used. The conditions of electron beam irradiation were as follows: the accelerating voltage was 300 kV; the current density was $6.7 \times 10^5$ e⁻/(nm²·s); and the diameter of irradiation region was 230 nm.

In this manner, growth of the crystal part in the a-like OS is sometimes induced by electron irradiation. In contrast, in the nc-OS and the CAAC-OS, growth of the crystal part is hardly induced by electron irradiation. Therefore, the a-like OS has an unstable structure as compared with the nc-OS and the CAAC-OS.

The a-like OS has a lower density than the nc-OS and the CAAC-OS because it contains a void. Specifically, the density of the a-like OS is higher than or equal to 78.6% and lower than 92.3% of the density of the single crystal oxide semiconductor having the same composition. The density of each of the nc-OS and the CAAC-OS is higher than or equal to 92.3% and lower than 100% of the density of the single crystal oxide semiconductor having the same composition. Note that it is difficult to deposit an oxide semiconductor having a density of lower than 78% of the density of the single crystal oxide semiconductor.

For example, in the case of an oxide semiconductor having an atomic ratio of In:Ga:Zn=1:1:1, the density of single crystal InGaZnO₄ with a rhombohedral crystal structure is 6.357 g/cm³. Accordingly, in the case of the oxide semiconductor having an atomic ratio of In:Ga:Zn=1:1:1, the density of the a-like OS is higher than or equal to 5.0 g/cm³ and lower than 5.9 g/cm³. For example, in the case of the oxide semiconductor having an atomic ratio of In:Ga:Zn=1:1:1, the density of each of the nc-OS and the CAAC-OS is higher than or equal to 5.9 g/cm³ and lower than 6.3 g/cm³.

Note that in the case where an oxide semiconductor having a certain composition does not exist in a single crystal structure, single crystal oxide semiconductors with different compositions are combined at an adequate ratio, which makes it possible to calculate density equivalent to that of a single crystal oxide semiconductor with the desired composition. The density of a single crystal oxide semiconductor having the desired composition can be calculated using a weighted average according to the combination ratio of the single crystal oxide semiconductors with different compositions. Note that it is preferable to use as few kinds of single crystal oxide semiconductors as possible to calculate the density.

As described above, oxide semiconductors have various structures and various properties. Note that an oxide semiconductor may be a stacked layer including two or more films of an amorphous oxide semiconductor, an a-like OS, an nc-OS, and a CAAC-OS, for example.

The structures described in this embodiment can be used in appropriate combination with any of the structures described in the other embodiments.

Embodiment 5

In this embodiment, examples of a package and a module each including an image sensor chip will be described. For the image sensor chip, the structure of an imaging device of one embodiment of the present invention can be used.

Figure 42A:
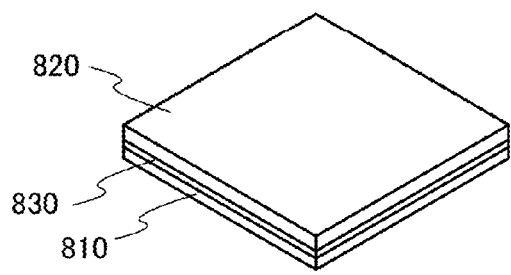
FIGS. 42A to 42D are perspective views and a cross-sectional view of a package including an imaging device.

FIG. 42A is an external perspective view showing the top surface side of a package including an image sensor chip. The package includes a package substrate 810 to which an image sensor chip 850 is fixed, a cover glass 820, an adhesive 830 for bonding the package substrate 810 and the cover glass 820 to each other, and the like.

Figure 42B:
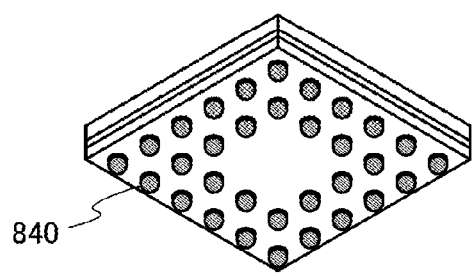

FIG. 42B is an external perspective view showing the bottom surface side of the package. On the bottom surface of the package, ball grid array (BGA) including solder balls as bumps 840 is formed. Although BGA is employed here, land grid array (LGA), pin grid array (PGA), or the like may be alternatively employed.

Figure 42C:
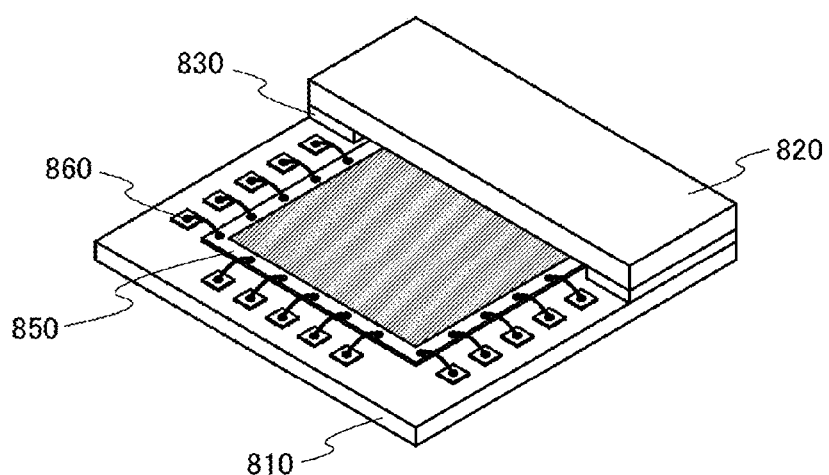
Figure 42D:
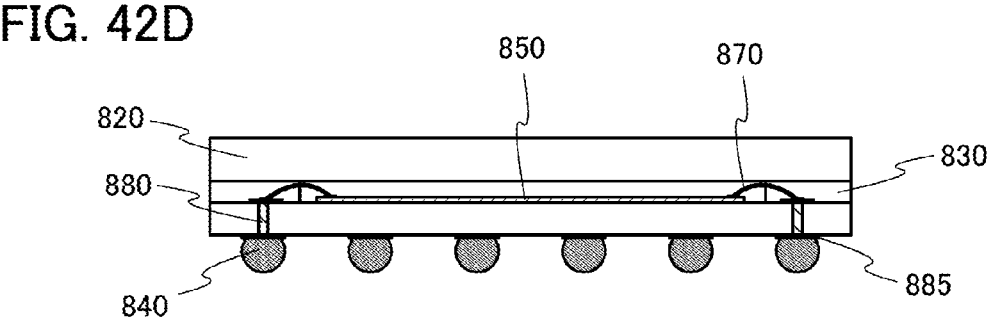

FIG. 42C is a perspective view of the package, in which the cover glass 820 and the adhesive 830 are partly illustrated. FIG. 42D is a cross-sectional view of the package. Electrode pads 860 are formed over the package substrate 810, and electrically connected to the bumps 840 through through-holes 880 and lands 885. The electrode pads 860 are electrically connected to electrodes of the image sensor chip 850 through wires 870.

FIG. 43A is an external perspective view showing the top surface side of a camera module in which an image sensor chip is mounted on a package with a built-in lens. The camera module includes a package substrate 811 to which an image sensor chip 851 is fixed, a lens cover 821, a lens 835, and the like. Furthermore, an IC chip 890 having functions of a driver circuit, a signal conversion circuit, and the like of an imaging device is provided between the package substrate 811 and the image sensor chip 851. Thus, the IC chip can function as a system in package (SiP).

FIG. 43B is an external perspective view showing the bottom surface side of the camera module. On the bottom surface and four side surfaces of the package substrate 811, mounting lands 841 are provided; this structure can be called a quad flat no-lead package (QFN). Although QFN is employed here, quad flat package (QFP), the above BGA, or the like may be alternatively employed.

FIG. 43C is a perspective view of the module, in which the lens cover 821 and the lens 835 are partly illustrated. FIG. 43D is a cross-sectional view of the camera module. The lands 841 are partly used as the electrode pads 861. The electrode pads 861 are electrically connected to electrodes of the image sensor chip 851 and the IC chip 890 through wires 871.

The image sensor chip can be easily mounted on the package having the above structure, and can be incorporated into a variety of semiconductor devices and electronic devices.

The structures described in this embodiment can be used in appropriate combination with any of the structures described in the other embodiments.

Embodiment 6

An imaging device of one embodiment of the present invention and an electronic device including the imaging device can be used for display devices, personal computers, or image reproducing devices provided with recording media (typically, devices that reproduce the content of recording media such as digital versatile discs (DVDs) and have displays for displaying the reproduced images). Furthermore, as electronic devices that can include the imaging device of one embodiment of the present invention and the electronic device including the imaging device, cellular phones, game machines (including portable game machines), portable information terminals, e-book readers, cameras such as video cameras and digital still cameras, goggle-type displays (head mounted displays), navigation systems, audio reproducing devices (e.g., car audio systems and digital audio players), copiers, facsimiles, printers, multifunction printers, automated teller machines (ATM), vending machines, and the like can be given. FIGS. 44A to 44F illustrate specific examples of these electronic devices.

Figure 44A:
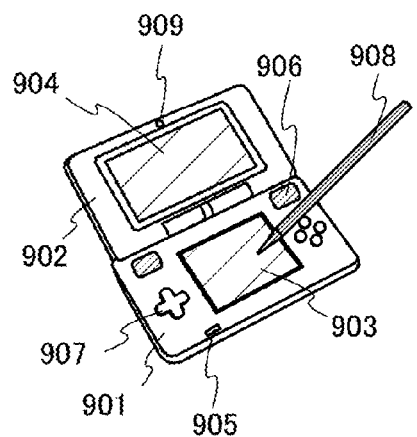
FIGS. 44A to 44F illustrate electronic devices.

FIG. 44A illustrates a portable game machine, which includes housings 901 and 902, display portions 903 and 904, a microphone 905, speakers 906, an operation key 907, a stylus 908, a camera 909, and the like. Although the portable game machine in FIG. 44A has the two display portions 903 and 904, the number of display portions included in the portable game machine is not limited to two. The imaging device of one embodiment of the present invention can be used for the camera 909.

Figure 44B:
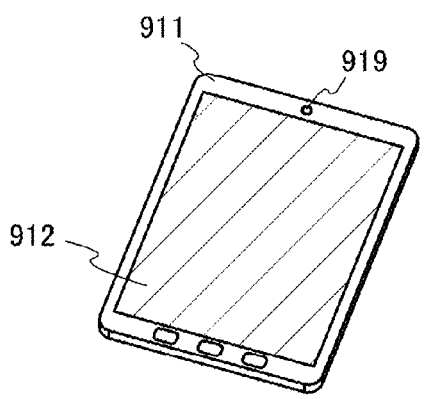

FIG. 44B illustrates a portable information terminal, which includes a first housing 911, a display portion 912, a camera 919, and the like. The touch panel function of the display portion 912 enables input and output of information. The imaging device of one embodiment of the present invention can be used for the camera 919.

Figure 44C:
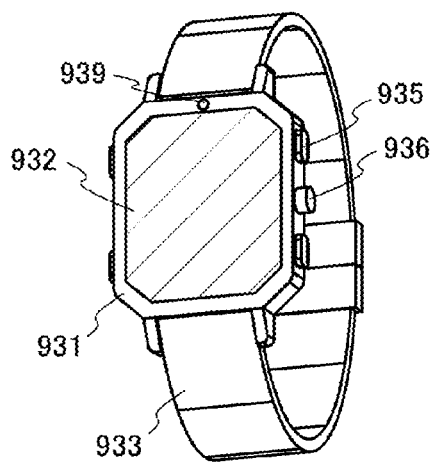

FIG. 44C illustrates a wrist-watch-type information terminal, which includes a housing 931, a display portion 932, a wristband 933, operation buttons 935, a winder 936, a camera 939, and the like. The display portion 932 may be a touch panel. The imaging device of one embodiment of the present invention can be used for the camera 939.

Figure 44D:
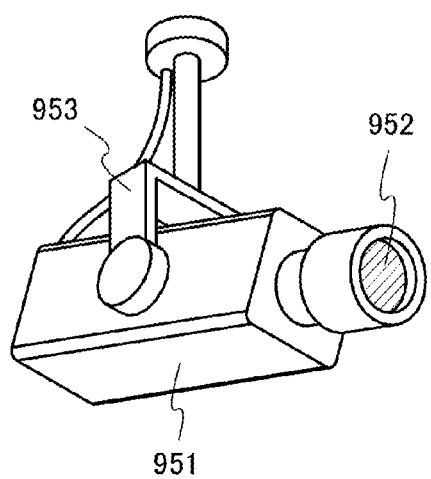

FIG. 44D illustrates a monitoring camera, which includes a housing 951, a lens 952, a support portion 953, and the like. The imaging device of one embodiment of the present invention can be provided in a focus position of the lens 952.

Figure 44E:
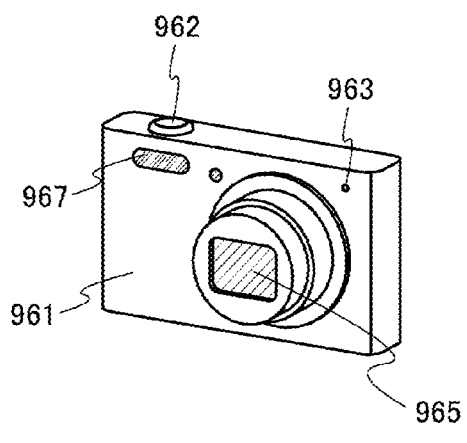

FIG. 44E illustrates a digital camera, which includes a housing 961, a shutter button 962, a microphone 963, a light-emitting portion 967, a lens 965, and the like. The imaging device of one embodiment of the present invention can be provided in a focus position of the lens 965.

Figure 44F:
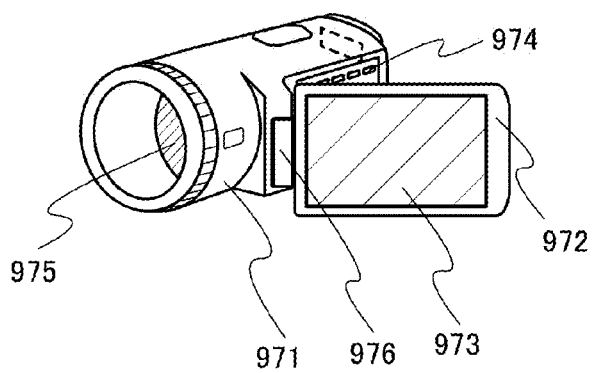

FIG. 44F illustrates a video camera, which includes a first housing 971, a second housing 972, a display portion 973, operation keys 974, a lens 975, a joint 976, and the like. The operation keys 974 and the lens 975 are provided for the first housing 971, and the display portion 973 is provided for the second housing 972. The first housing 971 and the second housing 972 are connected to each other with the joint 976, and an angle between the first housing 971 and the second housing 972 can be changed with the joint 976. Images displayed on the display portion 973 may be switched in accordance with the angle between the first housing 971 and the second housing 972 at the joint 976. The imaging device of one embodiment of the present invention can be provided in a focus position of the lens 975.

This embodiment can be combined with any of the other embodiments in this specification as appropriate.

This application is based on Japanese Patent Application serial no. 2015-088480 filed with Japan Patent Office on Apr. 23, 2015, the entire contents of which are hereby incorporated by reference.

What is claimed is:

1. An imaging device comprising: pixels arranged in a matrix; and an Analog digital (A/D) converter circuit, wherein the A/D converter circuit comprises: a first circuit; a second circuit; a third circuit; and a fourth circuit, wherein the pixels are electrically connected to the first circuit, wherein the first circuit, the second circuit, the third circuit, and the fourth circuit are each configured to receive and send a high-level potential signal or a low-level potential signal, wherein the first circuit is configured to stop operating in response to a first signal, wherein the first circuit is configured to make a comparison between a second signal output from one of the pixels and a third signal serving as a reference potential signal and then output a fourth signal, wherein the second circuit is configured to output a seventh signal determined by a combination of the fourth signal, a fifth signal for controlling the fourth circuit, and a sixth signal for controlling the second circuit, wherein the third circuit is configured to stop outputting a clock signal in response to the seventh signal, and wherein the fourth circuit is configured to perform counting in response to the clock signal and output data of the counting.

2. The imaging device according to claim 1,
   wherein the first circuit is a comparator circuit, and
   wherein the fourth circuit is a counter circuit.

3. The imaging device according to claim 1,
   wherein the pixels are each configured to hold first imaging data and to obtain differential data between the first imaging data and second imaging data.

4. The imaging device according to claim 1,
   wherein the first circuit operates when the first signal has a high-level potential, and the first circuit stops operating when the first signal has a low-level potential.

5. The imaging device according to claim 1,
   wherein the fourth signal output from the first circuit has a high-level potential when the first signal has the high-level potential and the second signal has a higher potential than the third signal, wherein the fourth signal output from the first circuit has a low-level potential when the first signal has the high-level potential and the second signal has a lower potential than the third signal, and wherein the fourth signal output from the first circuit has the low-level potential when the first signal has the low-level potential.

6. The imaging device according to claim 1, wherein the seventh signal output from the second circuit has a high-level potential when the sixth signal has a high-level potential and the fifth signal and the fourth signal each have a high-level potential or each have a low-level potential, wherein the seventh signal output from the second circuit has a low-level potential when the sixth signal has the high-level potential, one of the fifth signal and the fourth signal has the high-level potential, and the other of the fifth signal and the fourth signal has the low-level potential, and wherein the seventh signal output from the second circuit has the low-level potential when the sixth signal has a low-level potential.

7. The imaging device according to claim 1, wherein the sixth signal has the low-level potential when the first signal has the low-level potential.

8. The imaging device according to claim 1, wherein the third circuit is configured to output the clock signal when the seventh signal has the high-level potential, and wherein the third circuit is configured to stop outputting the clock signal when the seventh signal has the low-level potential.

9. The imaging device according to claim 1, wherein the fourth circuit performs an addition operation when the fifth signal has the high-level potential, and wherein the fourth circuit performs a subtraction operation when the fifth signal has the low-level potential.

10. The imaging device according to claim 1, wherein each of the pixels comprises:
   a first transistor;
   a second transistor;
   a third transistor;
   a fourth transistor;
   a fifth transistor;
   a first capacitor;
   a second capacitor; and
   a photoelectric conversion element, wherein one of electrodes of the photoelectric conversion element is electrically connected to one of a source electrode and a drain electrode of the first transistor, wherein the other of the source electrode and the drain electrode of the first transistor is electrically connected to one of a source electrode and a drain electrode of the second transistor, wherein the other of the source electrode and the drain electrode of the first transistor is electrically connected to one of electrodes of the first capacitor, wherein the other of the electrodes of the first capacitor is electrically connected to one of a source electrode and a drain electrode of the third transistor, wherein the other of the electrodes of the first capacitor is electrically connected to a gate electrode of the fourth transistor, wherein the other of the electrodes of the first capacitor is electrically connected to one of electrodes of the second capacitor, wherein one of a source electrode and a drain electrode of the fourth transistor is electrically connected to one of a source electrode and a drain electrode of the fifth transistor, and wherein the other of the source electrode and the drain electrode of the fifth transistor is electrically connected to the first circuit.

11. The imaging device according to claim 10, wherein the first transistor, the second transistor, the third transistor, the fourth transistor, and the fifth transistor each include an oxide semiconductor in an active layer, wherein the oxide semiconductor contains In, Zn, and M, and wherein M is Al, Ti, Ga, Sn, Y, Zr, La, Ce, Nd, or Hf.

12. The imaging device according to claim 10, wherein the photoelectric conversion element includes selenium or a compound containing selenium in a photoelectric conversion layer.

13. An electronic device comprising:
the imaging device according to claim 1; and
a display device.

14. An imaging device comprising:
a pixel; and
an Analog digital (A/D) converter circuit,
wherein the A/D converter circuit comprises:
   a first circuit;
   a second circuit;
   a third circuit; and
   a fourth circuit, wherein the pixel is electrically connected to the first circuit, wherein the first circuit is configured to stop operating in response to a first signal, wherein the first circuit is configured to output a fourth signal in response to a second signal output from the pixel and a third signal serving as a reference potential signal, wherein the second circuit is configured to output a seventh signal in response to the fourth signal, a fifth signal for controlling the fourth circuit, and a sixth signal for controlling the second circuit, wherein the third circuit is configured to stop outputting a clock signal in response to the seventh signal, and wherein the fourth circuit is configured to perform counting in response to the clock signal and output data of the counting.

15. The image device according to claim 14, wherein the first circuit is a comparator circuit, and wherein the fourth circuit is a counter circuit.

* * * * *